(12) United States Patent
Su et al.

(10) Patent No.: US 12,238,398 B2
(45) Date of Patent: Feb. 25, 2025

(54) IMAGING LENS ASSEMBLY, CAMERA MODULE AND ELECTRONIC DEVICE

(71) Applicant: LARGAN PRECISION CO., LTD., Taichung (TW)

(72) Inventors: Heng-Yi Su, Taichung (TW); Ming-Ta Chou, Taichung (TW); Wen-Yu Tsai, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 119 days.

(21) Appl. No.: 18/313,452

(22) Filed: May 8, 2023

(65) Prior Publication Data
US 2023/0370707 A1 Nov. 16, 2023

Related U.S. Application Data

(60) Provisional application No. 63/341,432, filed on May 13, 2022.

(51) Int. Cl.
*H04N 23/55* (2023.01)
*G02B 1/00* (2006.01)
*G02B 13/00* (2006.01)

(52) U.S. Cl.
CPC ............ *H04N 23/55* (2023.01); *G02B 1/002* (2013.01); *G02B 13/0065* (2013.01); *G02B 2207/101* (2013.01)

(58) Field of Classification Search
CPC .... H04N 23/55; G02B 1/002; G02B 13/0065; G02B 2207/101; G02B 1/118;
(Continued)

(56) References Cited

U.S. PATENT DOCUMENTS 6,127,674 A * 10/2000 Shinzaki ............ G06V 40/1324
250/227.28
7,862,223 B2 * 1/2011 Hsu ...................... G02B 3/0043
362/618
(Continued)

FOREIGN PATENT DOCUMENTS

CN 107290806 A 10/2017
JP H11320743 A 11/1999
(Continued)

*Primary Examiner* — Twyler L Haskins
*Assistant Examiner* — Angel L Garces-Rivera
(74) *Attorney, Agent, or Firm* — McClure, Qualey & Rodack, LLP

(57) ABSTRACT

An imaging lens assembly includes optical elements and a light path folding mechanism. The light path folding mechanism is disposed on the optical axis to fold an optical axis at least once, and includes a light folding element, a light blocking structure and a nanostructure layer. The light folding element includes a reflecting surface, an incident surface and an exit surface. The reflecting surface is configured to fold an incident light path towards an exit light path. The light blocking structure is disposed on at least one of the incident surface and the exit surface, and includes a main light blocking portion located on a peripheral portion closest to the optical axis on a cross section passing through the optical axis. The nanostructure layer is continuously distributed over at least one of the incident surface and the exit surface and the main light blocking portion.

33 Claims, 50 Drawing Sheets

(58) Field of Classification Search
CPC ...... G02B 5/005; G02B 13/0055; G02B 1/00;
G02B 1/04; G03B 11/00; G03B 30/00
See application file for complete search history.

(56) References Cited

U.S. PATENT DOCUMENTS

| | | |
|---|---|---|
| 8,547,639 B2 | 10/2013 | Watanabe |
| 8,747,991 B2 | 6/2014 | Ohyanagi et al. |
| 9,809,714 B2 | 11/2017 | Kubota |
| 9,864,107 B2 | 1/2018 | Momoki |
| 9,946,047 B2 | 4/2018 | Lin et al. |
| 10,228,493 B2 | 3/2019 | Kawasaki |
| 2015/0378058 A1 | 12/2015 | Sonoda et al. |
| 2016/0011415 A1 | 1/2016 | Takada |
| 2020/0073028 A1 | 3/2020 | Shigemitsu et al. |
| 2021/0036265 A1 | 2/2021 | Fleischman |
| 2021/0041765 A1 | 2/2021 | Shigemitsu |
| 2022/0091373 A1 | 3/2022 | Saiga |
| 2022/0294945 A1 | 9/2022 | Zhao et al. |

FOREIGN PATENT DOCUMENTS

| | | |
|---|---|---|
| JP | 2010156893 A | 7/2010 |
| JP | 2012063393 A | 3/2012 |
| JP | 5016872 B2 | 9/2012 |
| JP | 2013114103 A | 6/2013 |
| JP | 5807139 B2 | 11/2015 |
| JP | 2016080865 A | 5/2016 |
| JP | 2019003072 A | 1/2019 |
| TW | M486779 U | 9/2014 |
| TW | 2021009090 | 3/2021 |
| WO | 2021052136 A1 | 3/2021 |

\* cited by examiner

IMAGING LENS ASSEMBLY, CAMERA MODULE AND ELECTRONIC DEVICE

RELATED APPLICATIONS

This application claims priority to U.S. Provisional Application Ser. No. 63/341,432 filed May 13, 2022, which is herein incorporated by reference.

BACKGROUND

Technical Field

The present disclosure relates to an imaging lens assembly and a camera module. More particularly, the present disclosure relates to an imaging lens assembly and a camera module applicable to portable electronic devices.

Description of Related Art

In recent years, portable electronic devices have developed rapidly. For example, intelligent electronic devices and tablets have been filled in the lives of modern people, and camera modules and imaging lens assemblies mounted on portable electronic devices have also prospered. However, as technology advances, the quality requirements of the imaging lens assembly are becoming higher and higher. Therefore, an imaging lens assembly, which can reduce the reflecting light to maintain the clear image, needs to be developed.

SUMMARY

According to one aspect of the present disclosure, an imaging lens assembly includes a plurality of optical elements and a light path folding mechanism. An optical axis passes through the optical elements. The light path folding mechanism is disposed on the optical axis to fold the optical axis at least once, and includes at least one light folding element, a light blocking structure and a nanostructure layer. The light folding element includes a reflecting surface, an incident surface and an exit surface. The reflecting surface is configured to fold an incident light path of the light folding element towards an exit light path. The incident surface is disposed on an object side of the reflecting surface, and the incident light path passes through the incident surface. The exit surface is disposed on an image side of the reflecting surface, and the exit light path passes through the exit surface. The light blocking structure is disposed on at least one of the incident surface and the exit surface of the light folding element, and the light blocking structure includes a main light blocking portion, wherein the main light blocking portion is located on a peripheral portion closest to the optical axis on a cross section passing through the optical axis. The nanostructure layer is continuously distributed over at least one of the incident surface and the exit surface of the light folding element and the main light blocking portion of the light blocking structure, and the nanostructure layer has a plurality of irregular ridged convexs. The main light blocking portion of the light blocking structure surrounds the optical axis to define a light through area. An average height of the nanostructure layer is between 90 nm and 350 nm.

According to one aspect of the present disclosure, a camera module includes the imaging lens assembly of the aforementioned aspect.

According to one aspect of the present disclosure, an electronic device includes the camera module of the aforementioned aspect and an image sensor, wherein the image sensor is disposed on an image surface of the camera module.

According to one aspect of the present disclosure, an imaging lens assembly includes a plurality of optical elements and a light path folding mechanism. An optical axis passes through the optical elements. The light path folding mechanism is disposed on the optical axis to fold the optical axis at least once, and includes a light folding element, a light blocking structure and a nanostructure layer. The light folding element includes at least two reflecting surfaces, an incident surface and an exit surface. The reflecting surfaces are configured to fold an incident light path of the light folding element towards an exit light path. The incident surface is disposed on an object side of one of the reflecting surfaces, and the incident light path passes through the incident surface. The exit surface is disposed on an image side of the other one of the reflecting surfaces, and the exit light path passes through the exit surface. The light blocking structure is disposed on at least one of the incident surface and the exit surface of the light folding element, and the light blocking structure includes a main light blocking portion, wherein the main light blocking portion is located on a peripheral portion closest to the optical axis on a cross section passing through the optical axis. The nanostructure layer is continuously distributed over at least one of the incident surface and the exit surface of the light folding element and the main light blocking portion of the light blocking structure, and the nanostructure layer has a plurality of irregular ridged convexs. The main light blocking portion of the light blocking structure surrounds the optical axis to define a light through area. An average height of the nanostructure layer is between 90 nm and 350 nm.

BRIEF DESCRIPTION OF THE DRAWINGS

FIG. 1O is another scanning electron microscope image of a cross section of the light folding element according to the 3rd example of the 1st embodiment in FIG. 1M.

DETAILED DESCRIPTION

Figure 1A:
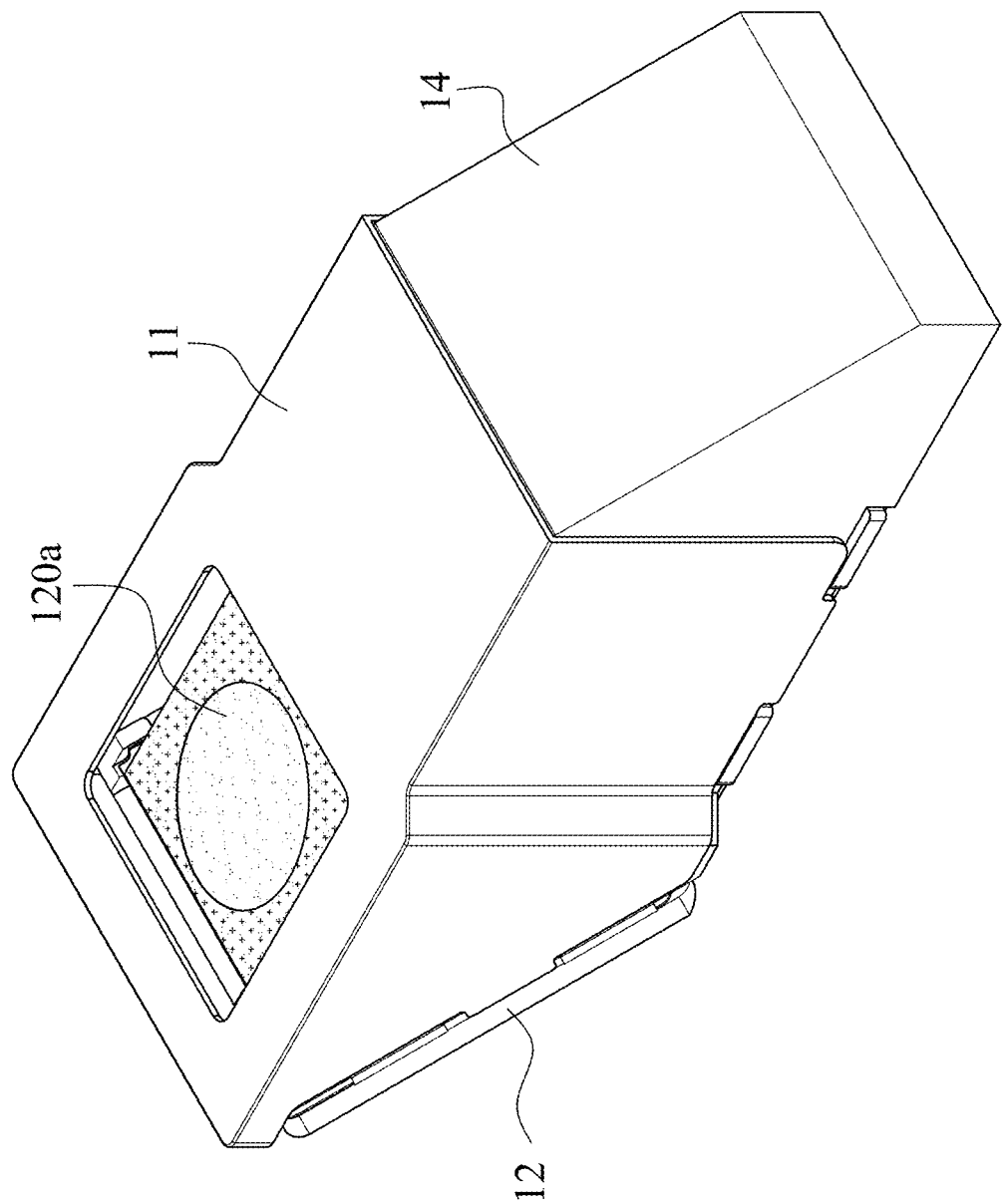
FIG. 1A is a three dimensional view of a camera module according to the 1st embodiment of the present disclosure.

The present disclosure provides an imaging lens assembly, the imaging lens assembly includes a plurality of optical elements and a light path folding mechanism, wherein an optical axis passes through the optical elements, and the light path folding mechanism is disposed on the optical axis to fold the optical axis at least once. The light path folding mechanism includes a light folding element, a light blocking structure and a nanostructure layer. The light folding element includes a reflecting surface, an incident surface and an exit surface, wherein the reflecting surface is configured to fold an incident light path of the light folding element towards an exit light path, the incident surface is disposed on an object side of the reflecting surface, the incident light path passes through the incident surface, the exit surface is disposed on an image side of the reflecting surface, and the exit light path passes through the exit surface. The light blocking structure is disposed on at least one of the incident surface and the exit surface of the light folding element, and the light blocking structure includes a main light blocking portion, wherein the main light blocking portion is located on a peripheral portion closest to the optical axis on a cross section passing through the optical axis. The nanostructure layer is continuously distributed over at least one of the incident surface and the exit surface of the light folding element and the main light blocking portion of the light blocking structure, and the nanostructure layer has a plurality of irregular ridged convexs. The main light blocking portion of the light blocking structure surrounds the optical axis to define a light through area. An average height of the nanostructure layer is between 90 nm and 350 nm. Hence, the reflection of the light on the main light blocking portion can be reduced by disposing the nanostructure layer on the main light blocking portion of the light blocking structure so as to keep the image clear.

In detail, the light blocking structure can be the black ink spraying layer formed via the epoxy resin-based quick drying ink, the blackened coating layer via the chemical vaper deposition, the photoresistive coating layer or the light blocking sheet composed of the black polyethylene terephthalate (PET) material, but the present disclosure is not limited thereto. Furthermore, when the nanostructure layer is observed from the cross section, the nanostructure layer has the irregular ridged convexs with the shape of wide bottom and narrow top like a mountain ridge so as to gradually decrease the equivalent refractive index from the bottom to the top of the nanostructure layer for damaging and reducing the reflecting light.

A surface of the nanostructure layer has a plurality of pore structures, and a portion of the light folding element or a portion of the light blocking structure is exposed via the pore structures, wherein the portion of the light folding element or the portion of the light blocking structure, which is exposed, is contacted with the air.

A number of the reflecting surface can be at least two, wherein the incident surface is disposed on an object side of one of the reflecting surfaces, and the exit surface is disposed on an image side of the other one of the reflecting surfaces. In detail, the light folding element can be composed by bonding or assembling the plurality of light folding elements, but the present disclosure is not limited thereto. By choosing the light folding element with the proper refractive index, the plurality of reflecting surfaces can totally reflect the imaging light inside the light folding element.

The light path folding mechanism can be configured to fold the optical axis at least four times. Therefore, the aforementioned disposition can be corresponding to the optical design of the long focal length so as to obtain the effect of compact size of the imaging lens assembly. Moreover, a number of the reflecting surfaces can be four, and two of the reflecting surfaces of the light folding element are parallel to each other, wherein each of the two reflecting surfaces parallel to each other includes a reflecting optical film, and the reflecting optical film can include a silver atom layer. Further, another two of the reflecting surfaces of the light folding element can be configured to make the optical axis totally reflect inside the light folding element. Therefore, the optical property of the total reflection inside the single light folding element can be equal to the optical property of multiple of the light folding elements folding the optical axis so as to reduce the manufacturing cost.

The light blocking structure can be disposed on both of the incident surface and the exit surface of the light folding element. Therefore, the light blocking structure with the better light blocking range can be obtained so as to enhance the light blocking efficiency of the stray light.

The light folding element can further include a connecting structure layer, wherein the connecting structure layer is disposed between the nanostructure layer and at least one of the incident surface and the exit surface of the light folding element. The light folding element can be tightly connected to the nanostructure layer via the connecting structure layer so as to obtain the higher structural stability. Furthermore, the nanostructure layer can be disposed on the topmost of the connecting structure layer, the connecting structure layer can be composed of a plurality of film layers, which are alternately stacked, with different refractive indexes, and the connecting structure layer can include at least one silicon oxide ($SiO_2$) film or at least one titanium oxide ($TiO_2$) film. The surface of the nanostructure layer has the plurality of pore structures, and a portion of the connecting structure layer is exposed via the pore structures, wherein the portion of the connecting structure layer, which is exposed, is contacted with the air.

The connecting structure layer can be further disposed between the nanostructure layer and the light blocking structure. In particular, the light blocking structure can be tightly connected to the nanostructure layer via the connecting structure layer so as to obtain the higher structural stability.

A number of the light folding element can be two, and the light path folding mechanism is configured to fold the optical axis twice, wherein the reflecting surfaces of the light folding elements can be parallel to each other. Therefore, the aforementioned disposition can be corresponding to the optical design with the long focal length so as to obtain the effect of the compact size of the imaging lens assembly.

The number of the light folding elements can be three, and the light path folding mechanism is configured to fold the optical axis three times, wherein two of the reflecting surfaces of the light folding elements can be vertical to each other. Therefore, the aforementioned disposition can be corresponding to the optical design with the long focal length so as to obtain the effect of the compact size of the imaging lens assembly.

Each of the light folding elements can include a connecting surface, and the connecting surface is connected to the reflecting surfaces, the incident surface and the exit surface. In particular, the surfaces except for the reflecting surfaces, the incident surface and the exit surface can be defined as the connecting surfaces, and the connecting surface can be composed by bonding or assembling the plurality of light folding elements, but the present disclosure is not limited thereto.

The connecting surface of each of the light folding elements can include at least one gate trace, and each of the light folding elements can include a step structure. Therefore, the aforementioned structure is favorable for recognizing the border range of the light through area and the light blocking area. Moreover, the light through area near the step structure can be recessed or protruding relative to the light blocking area, but the present disclosure is not limited thereto.

The light folding elements can be made of a plastic material. Therefore, the weight of the light folding elements can be reduced, and the lightweight of the imaging lens assembly can be further obtained. Or, the light folding elements can be made of a glass material. Therefore, the light folding elements have the more stable optical property with regard to the temperature effect.

A peripheral thickness of the main light blocking portion can be between 0.4 um and 50 um. Therefore, the aforementioned disposition can be corresponding to the condition of the thickness of the light blocking structure formed by the different methods so as to cooperate the different requirements of the optical design for enhancing the design margin.

The average height of the nanostructure layer can be between 125 nm and 300 nm. By the aforementioned setting range of the height of the nanostructure layer, the better anti-reflecting effect can be simultaneously taken into consideration under the premise that the image quality is not affected. Further, the average height of the nanostructure layer can be between 195 nm and 255 nm. When the average height of the nanostructure layer is close to 200 nm, the better anti-reflecting effect can be obtained for the incident light with the specific condition, but the present disclosure is not limited thereto. Moreover, the nanostructure layer can include an aluminum oxide ($Al_2O_3$).

An abbe number of each of the light folding elements can be between 40 and 65. The optical aberration can be reduced by the light folding element with the optical property of the low dispersion so as to enhance the image quality.

Each of the aforementioned features of the imaging lens assembly can be utilized in various combinations for achieving the corresponding effects.

The present disclosure provides a camera module, which includes the aforementioned imaging lens assembly.

The present disclosure provides an electronic device, which includes the aforementioned camera module and an image sensor. The image sensor is disposed on an image surface of the camera module.

According to the aforementioned embodiment, specific embodiments and examples are provided, and illustrated via figures.

1st Embodiment

Figure 1B:
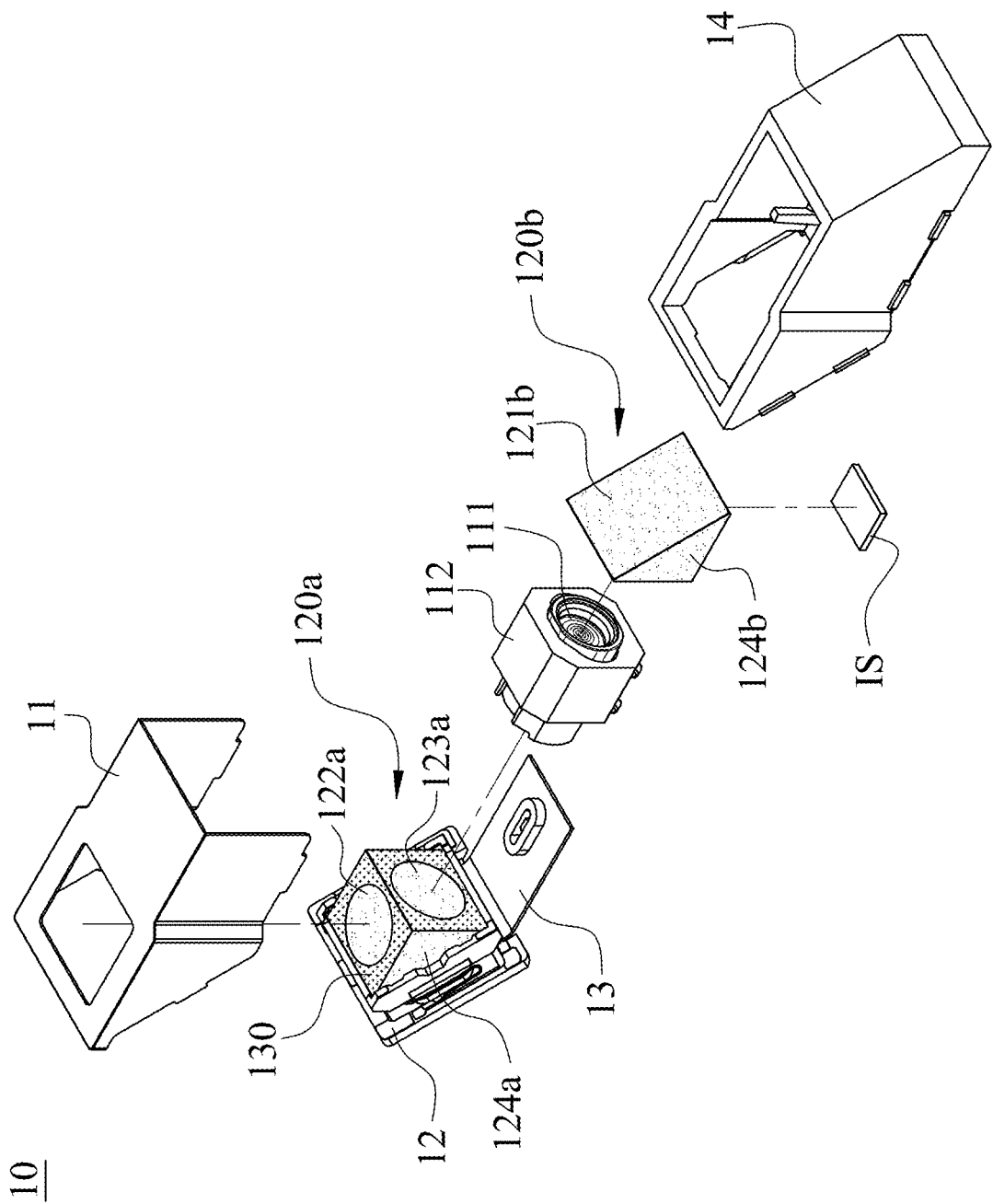
FIG. 1B is an exploded view of the camera module according to the 1st embodiment in FIG. 1A.
Figure 1C:
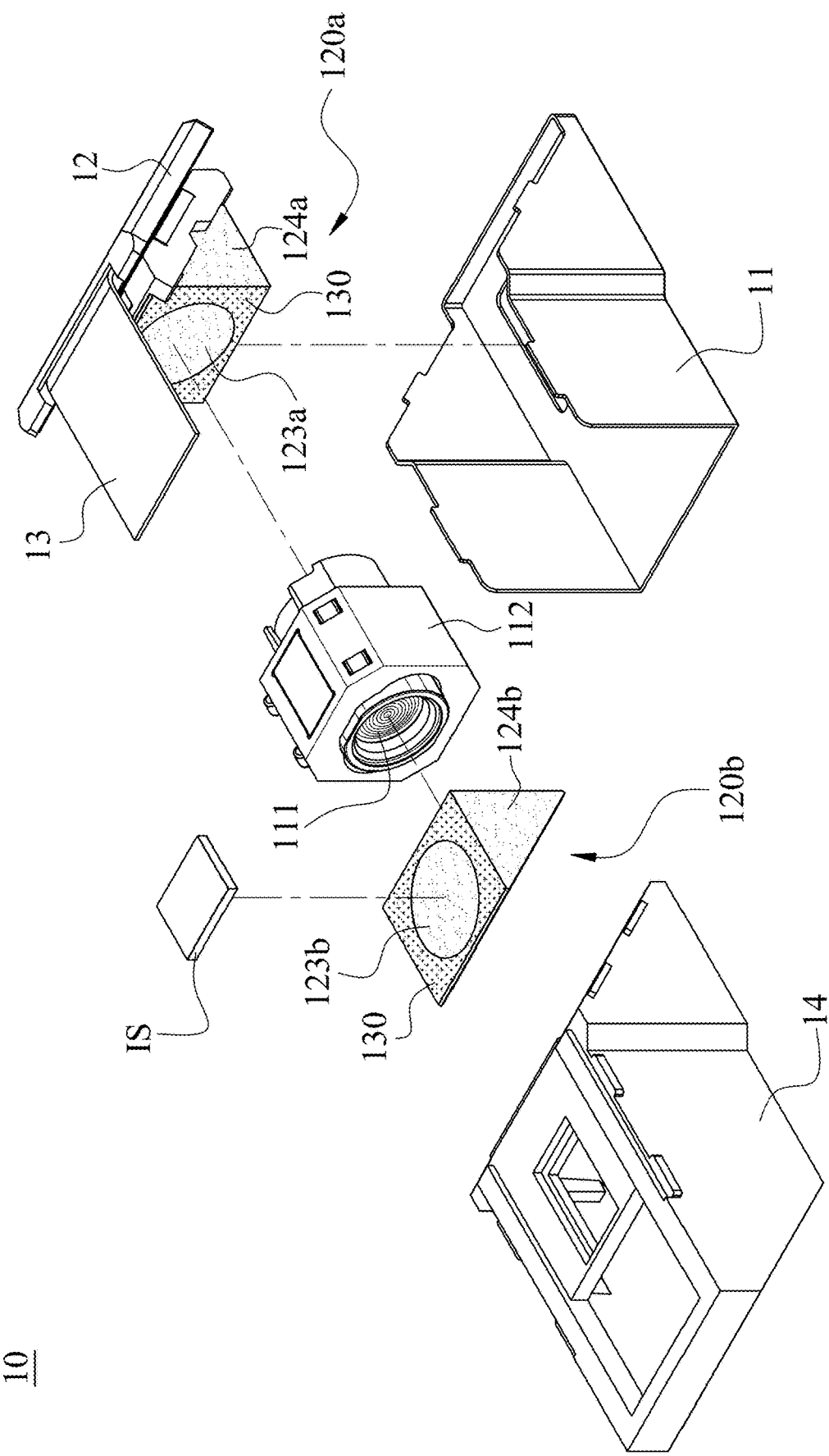
FIG. 1C is another exploded view of the camera module according to the 1st embodiment in FIG. 1A.
Figure 1D:
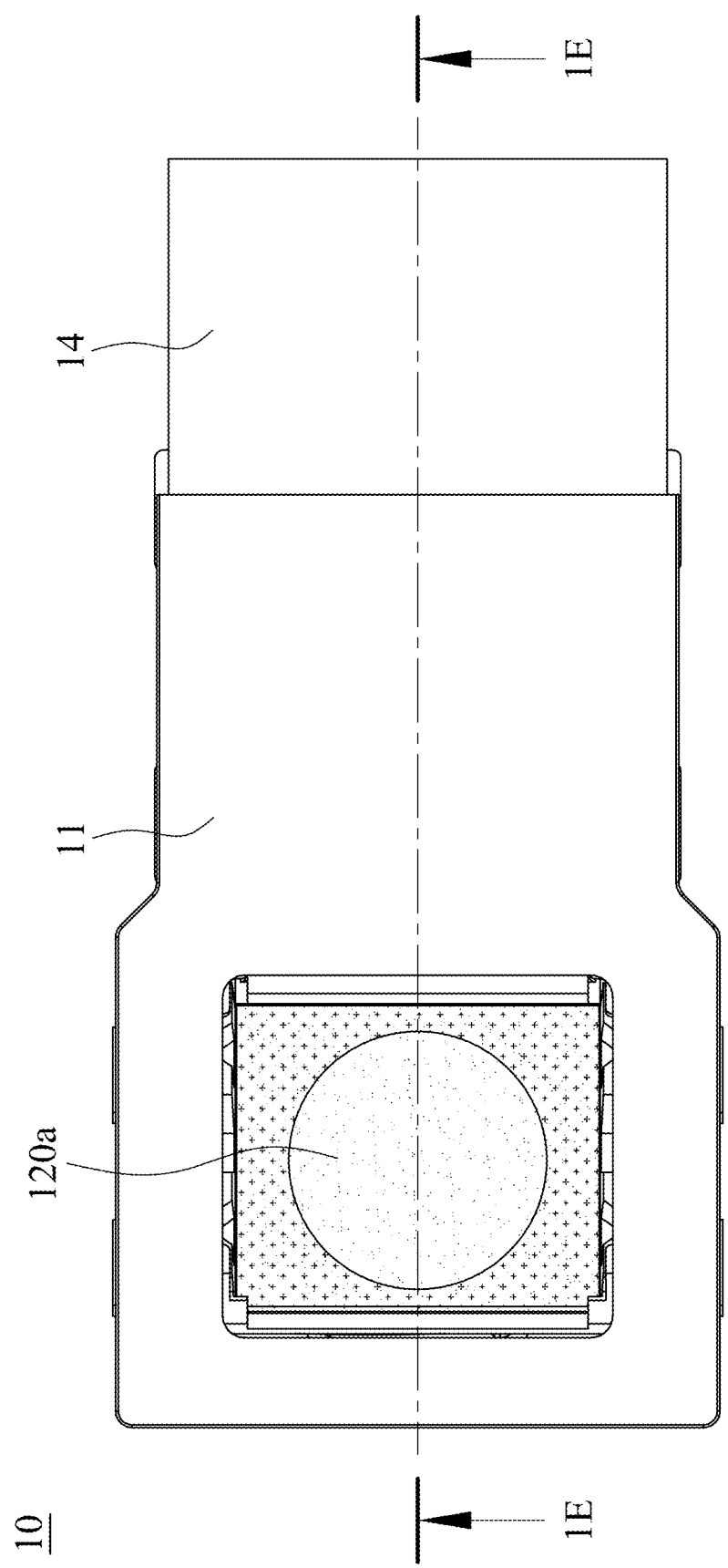
FIG. 1D is a top view of the camera module according to the 1st embodiment in FIG. 1A.
Figure 1E:
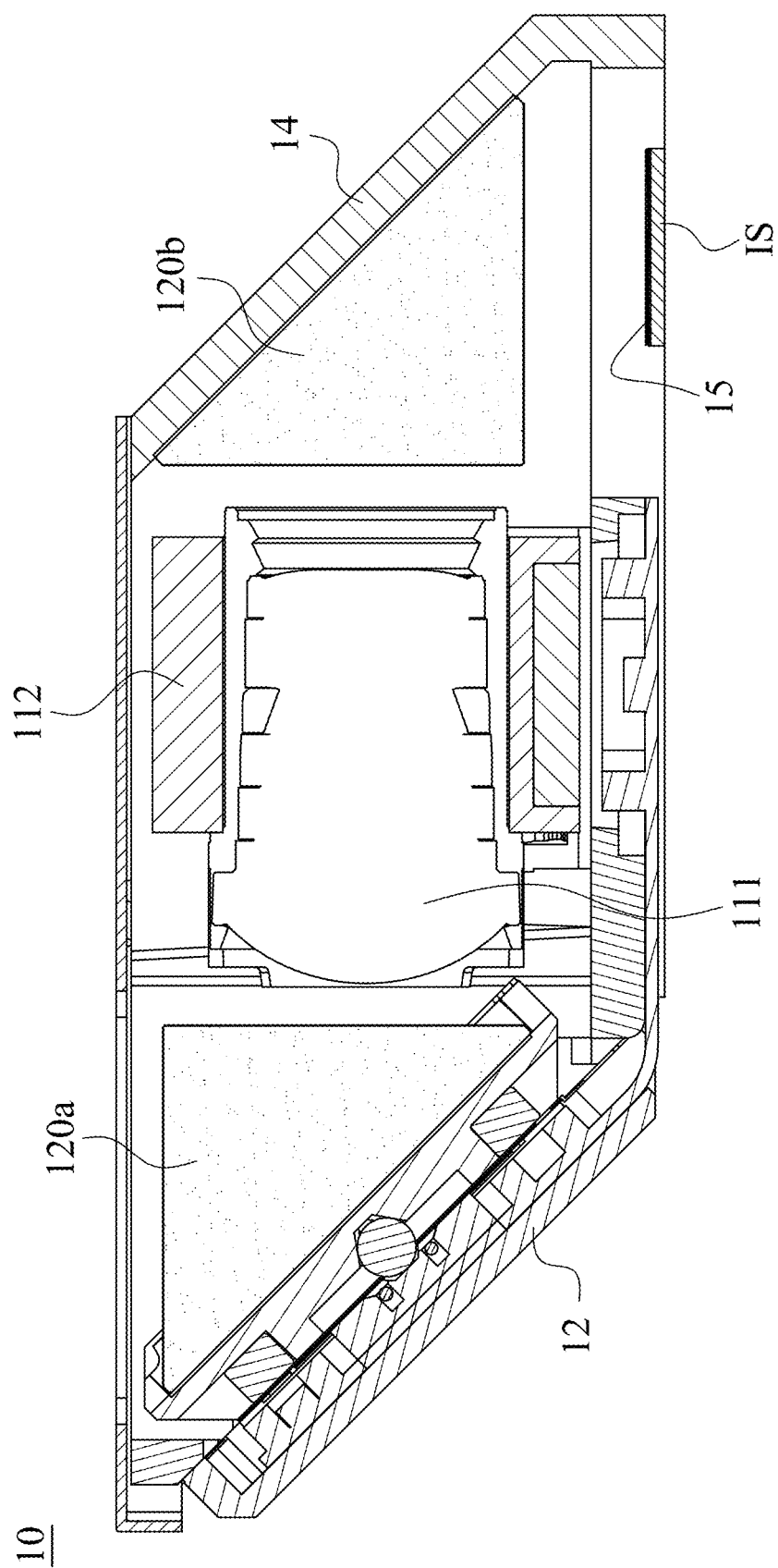
FIG. 1E is a cross-sectional view of the camera module along a 1E-1E line in FIG. 1D.

FIG. 1A is a three dimensional view of a camera module 10 according to the 1st embodiment of the present disclosure. FIG. 1B is an exploded view of the camera module 10 according to the 1st embodiment in FIG. 1A. FIG. 1C is another exploded view of the camera module 10 according to the 1st embodiment in FIG. 1A. FIG. 1D is a top view of the camera module 10 according to the 1st embodiment in FIG. 1A. FIG. 1E is a cross-sectional view of the camera module 10 along a 1E-1E line in FIG. 1D. In FIGS. 1A to 1E, the camera module 10 includes a cover 11, a driving element 12, a circuit board 13, a carrier 14 and an imaging lens assembly (its reference numeral is omitted), wherein the camera module 10 can be applied to an electronic device (not shown), and an image sensor IS of the electronic device is disposed on an image surface 15 of the camera module 10. In particular, the cover 11 is disposed on a side of the carrier 14, the imaging lens assembly is disposed in the carrier 14, and the driving element 12 and the circuit board 13 are disposed on another side of the carrier 14, wherein the driving element 12 is configured to drive the imaging lens assembly.

Figure 1F:
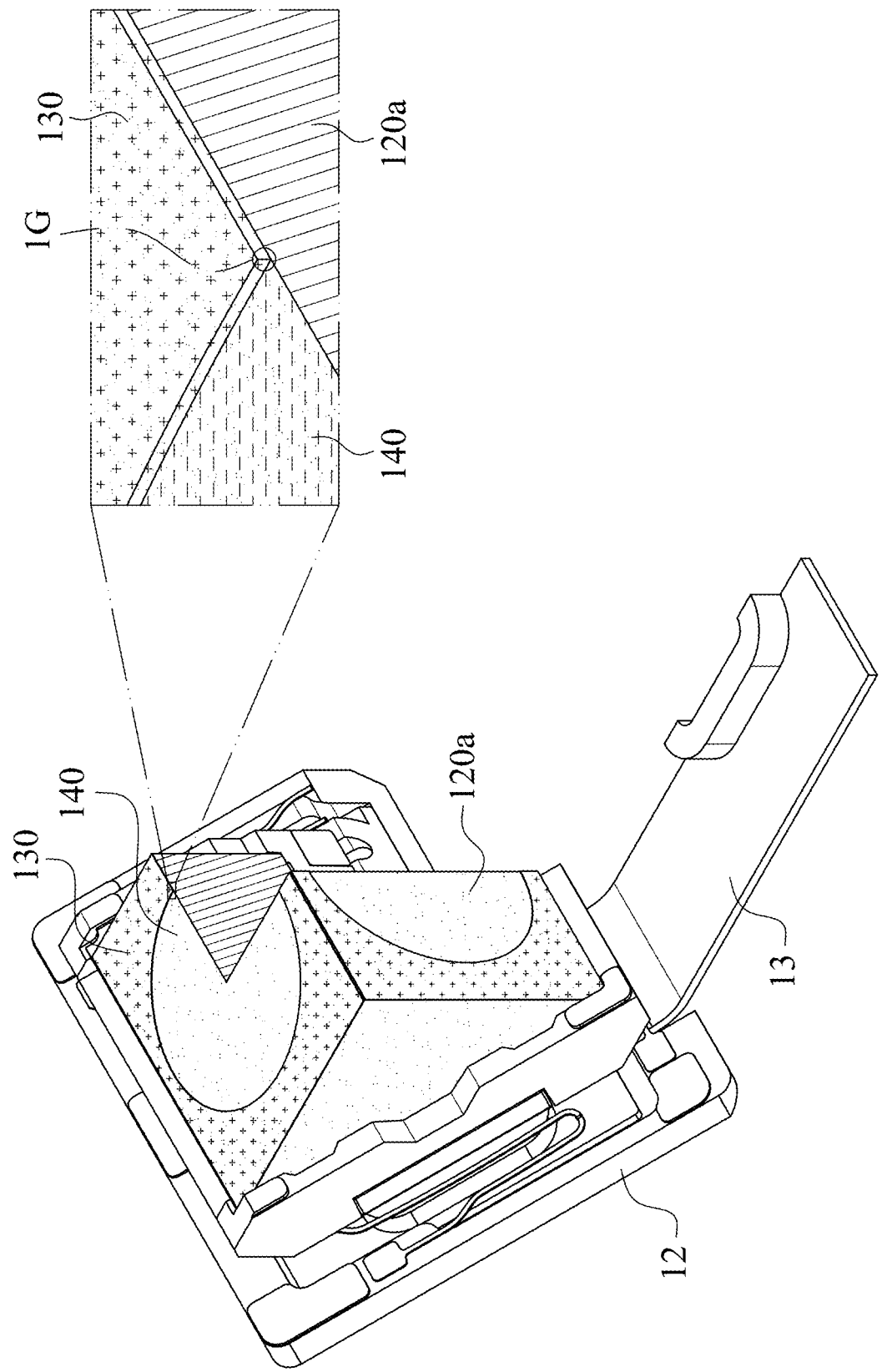
FIG. 1F is a partial cross section of the camera module according to the 1st embodiment in FIG. 1A.
Figure 1G:
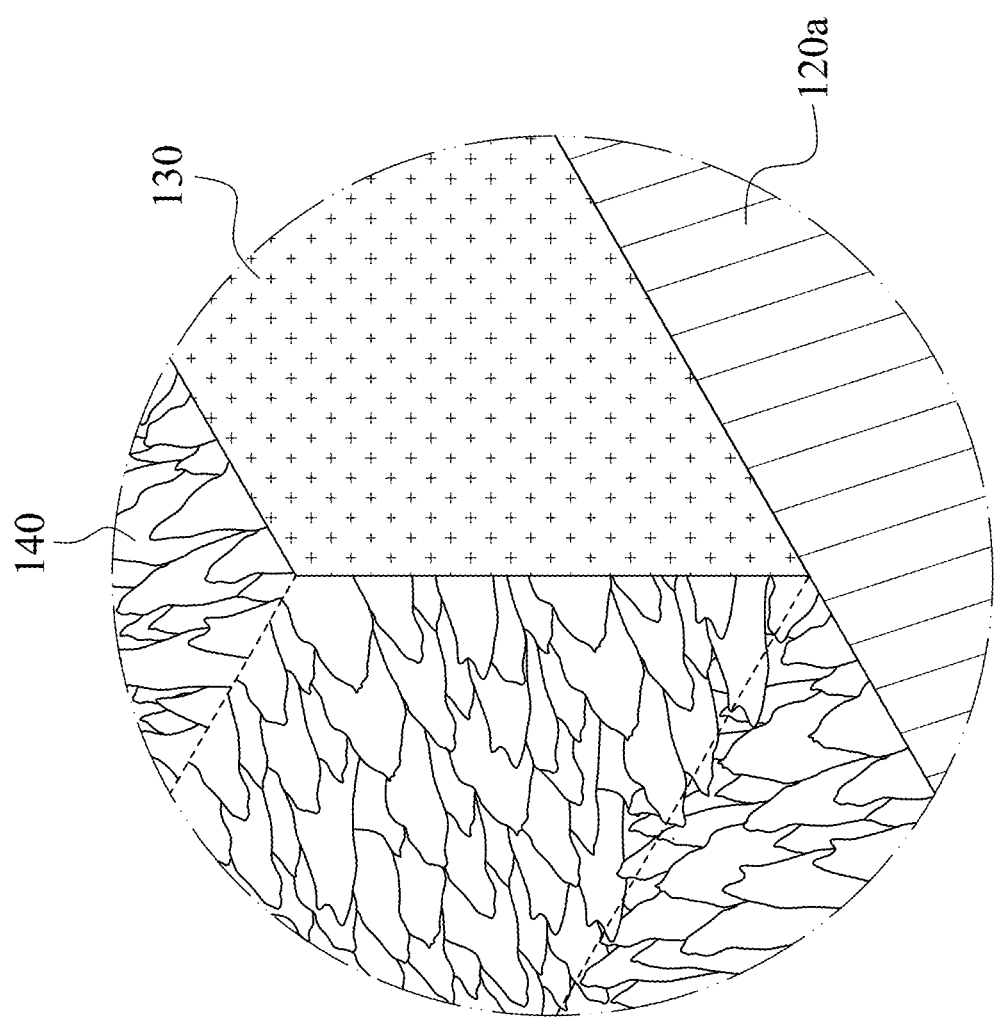
FIG. 1G is a partial enlarged view of the light folding element according to the 1st embodiment in FIG. 1F.
Figure 1H:
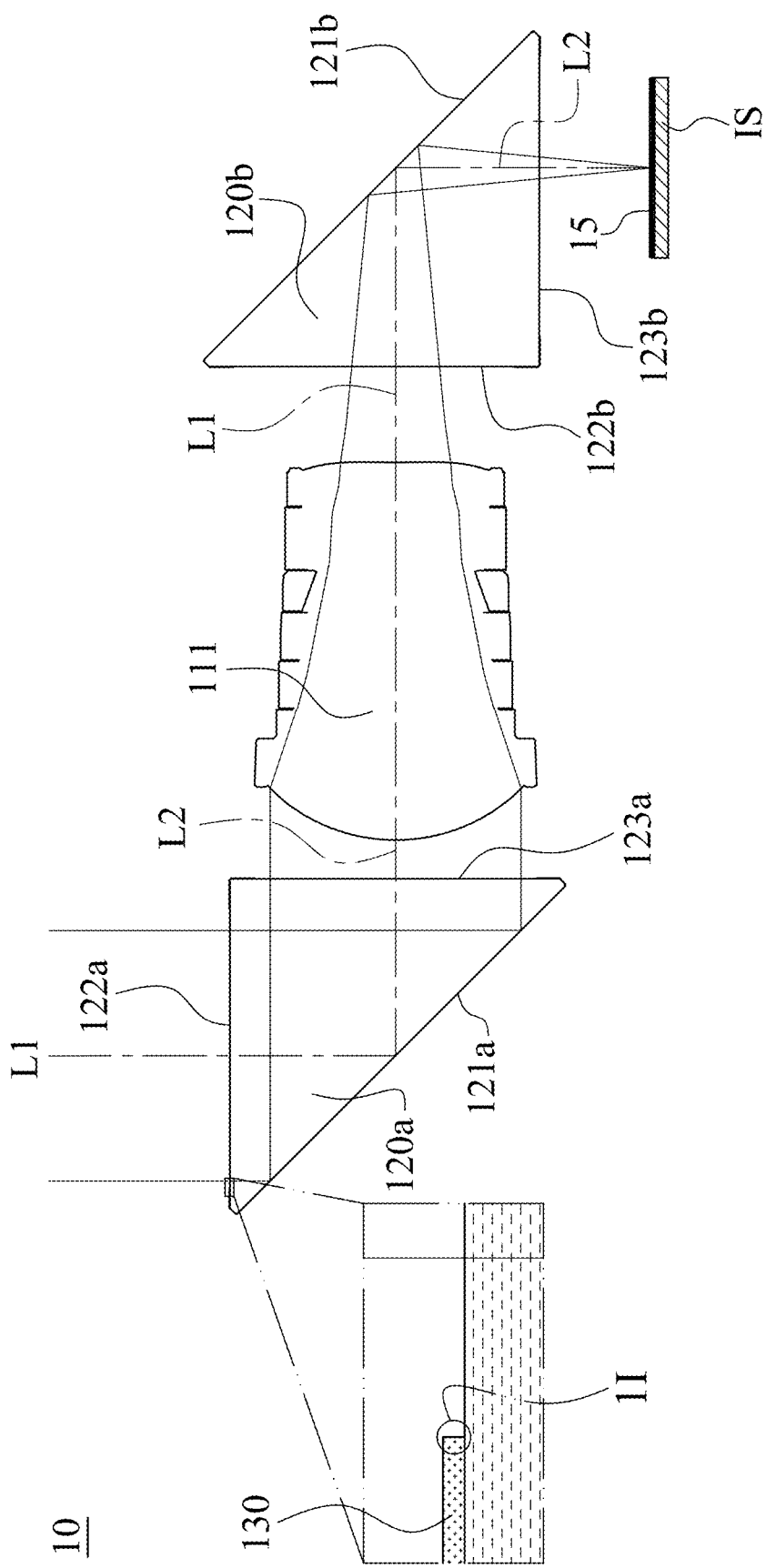
FIG. 1H is a partial schematic view of the camera module according to the 1st embodiment in FIG. 1A.

FIG. 1F is a partial cross section of the camera module 10 according to the 1st embodiment in FIG. 1A. FIG. 1G is a partial enlarged view of the light folding element 120a according to the 1st embodiment in FIG. 1F. FIG. 1H is a partial schematic view of the camera module 10 according to the 1st embodiment in FIG. 1A. In FIGS. 1A to 1H, the imaging lens assembly includes a plurality of optical elements 111, a lens barrel 112 and a light path folding mechanism (its reference numeral is omitted), wherein an optical axis (its reference numeral is omitted) passes through the optical elements 111, the light path folding mechanism is disposed on the optical axis to fold the optical axis at least once, and the optical elements 111 are disposed in the lens barrel 112. Moreover, the light path folding mechanism includes two light folding elements 120a, 120b, a light blocking structure 130 and a nanostructure layer 140, wherein a number of the light folding elements 120a, 120b is two, and the light path folding mechanism is configured to fold the optical axis twice so as to correspond to the optical design with the long focal length for obtaining the effect of the compact size of the imaging lens assembly. Further, each of the light folding elements 120a, 120b can be made of a plastic material so as to reduce the weight of the light folding elements 120a, 120b, and the lightweight of the camera module 10 can be further obtained. Or, each of the light folding elements 120a, 120b can be made of a glass material so as to obtain the more stable optical property with regard to the temperature effect.

In FIGS. 1B, 1C and 1H, the light folding element 120a includes a reflecting surface 121a, an incident surface 122a, an exit surface 123a and a connecting surface 124a, and the light folding element 120b includes a reflecting surface 121b, an incident surface 122b, an exit surface 123b and a connecting surface 124b. The reflecting surface 121a is configured to fold an incident light path L1 of the light folding element 120a towards an exit light path L2; the incident surface 122a is disposed on an object side of the reflecting surface 121a, and the incident light path L1 passes through the incident surface 122a; the exit surface 123a is disposed on an image side of the reflecting surface 121a, and the exit light path L2 passes through the exit surface 123a; the connecting surface 124a is connected to the reflecting surface 121a, the incident surface 122a and the exit surface 123a. The reflecting surface 121b is configured to fold an incident light path L1 of the light folding element 120b towards an exit light path L2; the incident surface 122b is disposed on an object side of the reflecting surface 121b, and the incident light path L1 passes through the incident surface 122b; the exit surface 123b is disposed on an image side of the reflecting surface 121b, and the exit light path L2 passes through the exit surface 123b; the connecting surface 124b is connected to the reflecting surface 121b, the incident surface 122b and the exit surface 123b. Moreover, the optical axis is parallel to the exit light path L2 of the light folding element 120a and the incident light path L1 of the light folding element 120b, and the reflecting surface 121a of the light folding element 120a and the reflecting surface 121b of the light folding element 120b are parallel to each other.

In detail, the light blocking structure 130 is disposed on all of the incident surface 122a and the exit surface 123a of the light folding element 120a and the incident surface 122b and the exit surface 123b of the light folding element 120b. Therefore, the light blocking structure 130 with the better light blocking range can be obtained so as to enhance the light blocking efficiency of the stray light.

Further, an abbe number of each of the light folding elements 120a, 120b is between 40 and 65.

Figure 1I:
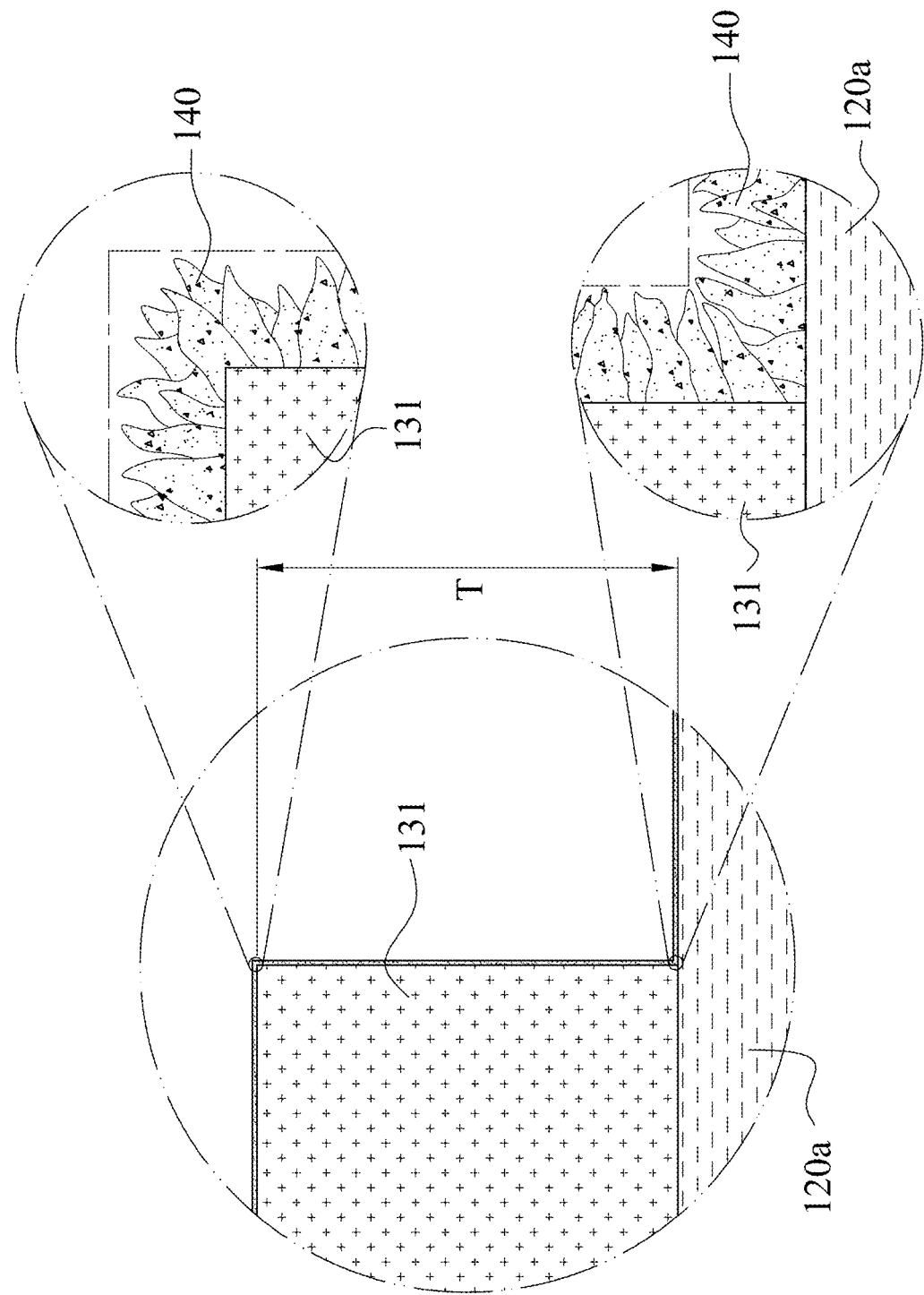
FIG. 1I is a partial enlarged view of the light folding element according to the 1st example of the 1st embodiment in FIG. 1H.

FIG. 1I is a partial enlarged view of the light folding element 120a according to the 1st example of the 1st embodiment in FIG. 1H. In FIG. 1I, the light blocking structure 130 includes a main light blocking portion 131, wherein the main light blocking portion 131 is located on a peripheral portion closest to the optical axis on a cross section passing through the optical axis, and the main light blocking portion 131 of the light blocking structure 130 surrounds the optical axis to define a light through area. In particular, the light blocking structure 130 can be the black ink spraying layer formed via the epoxy resin-based quick drying ink, the blackened coating layer via the chemical vaper deposition, the photoresistive coating layer or the light blocking sheet composed of the black PET material, but the present disclosure is not limited thereto.

Figure 1K:
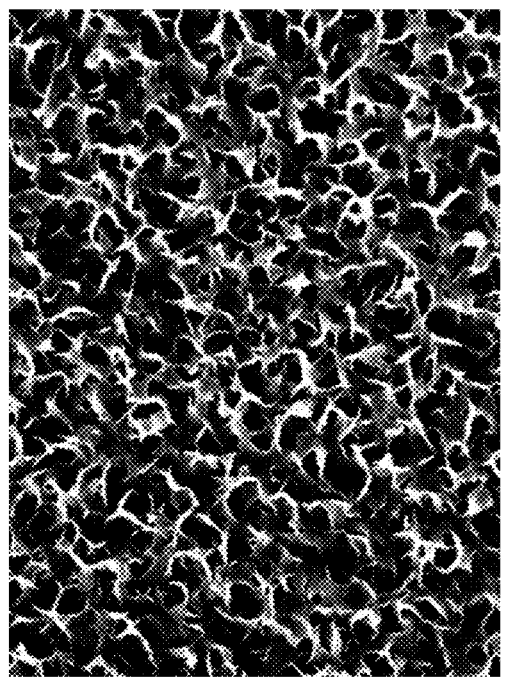
FIG. 1K is another scanning electron microscope image of the nanostructure layer according to the 1st example of the 1st embodiment in FIG. 1I.
Figure 1J:
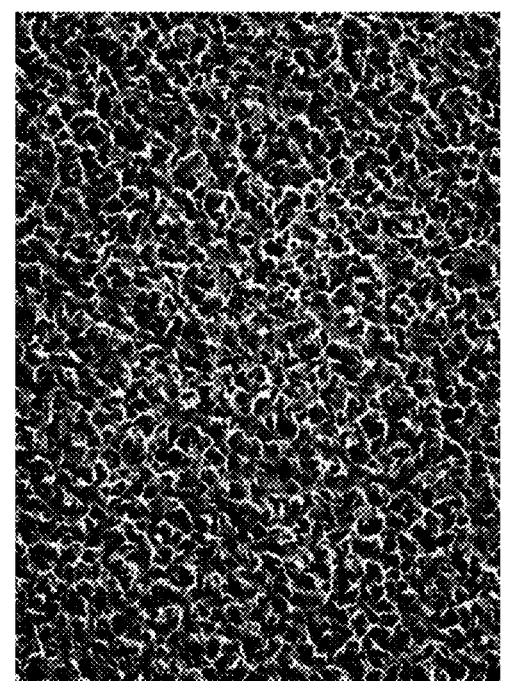
FIG. 1J is a scanning electron microscope image of the nanostructure layer according to the 1st example of the 1st embodiment in FIG. 1I.

FIG. 1J is a scanning electron microscope image of the nanostructure layer 140 according to the 1st example of the 1st embodiment in FIG. 1I. FIG. 1K is another scanning electron microscope image of the nanostructure layer 140 according to the 1st example of the 1st embodiment in FIG. 1I. In FIGS. 1J and 1K, by observing vertically the distribution of the nanostructure layer 140 on the light folding element 120a via the scanning electron microscope, the nanostructure layer 140 is continuously distributed over the incident surface 122a and the exit surface 123a of the light folding element 120a and the main light blocking portion 131 of the light blocking structure 130, and the nanostructure layer 140 has a plurality of irregular ridged convexs. Hence, the reflection of the light on the main light blocking portion 131 can be reduced by disposing the nanostructure layer 140 on the main light blocking portion 131 of the light blocking structure 130 so as to keep the image clear. In particular, the nanostructure layer 140 includes an aluminum oxide, a surface of the nanostructure layer 140 has a plurality of pore structures, and a portion of the light folding element 120a or a portion of the light blocking structure 130 is exposed via the pore structures, wherein the portion of the light folding element 120a or the portion of the light blocking structure 130, which is exposed, is contacted with the air.

In FIG. 1I, a peripheral thickness T of the main light blocking portion 131 is 18 um.

Figure 1L:
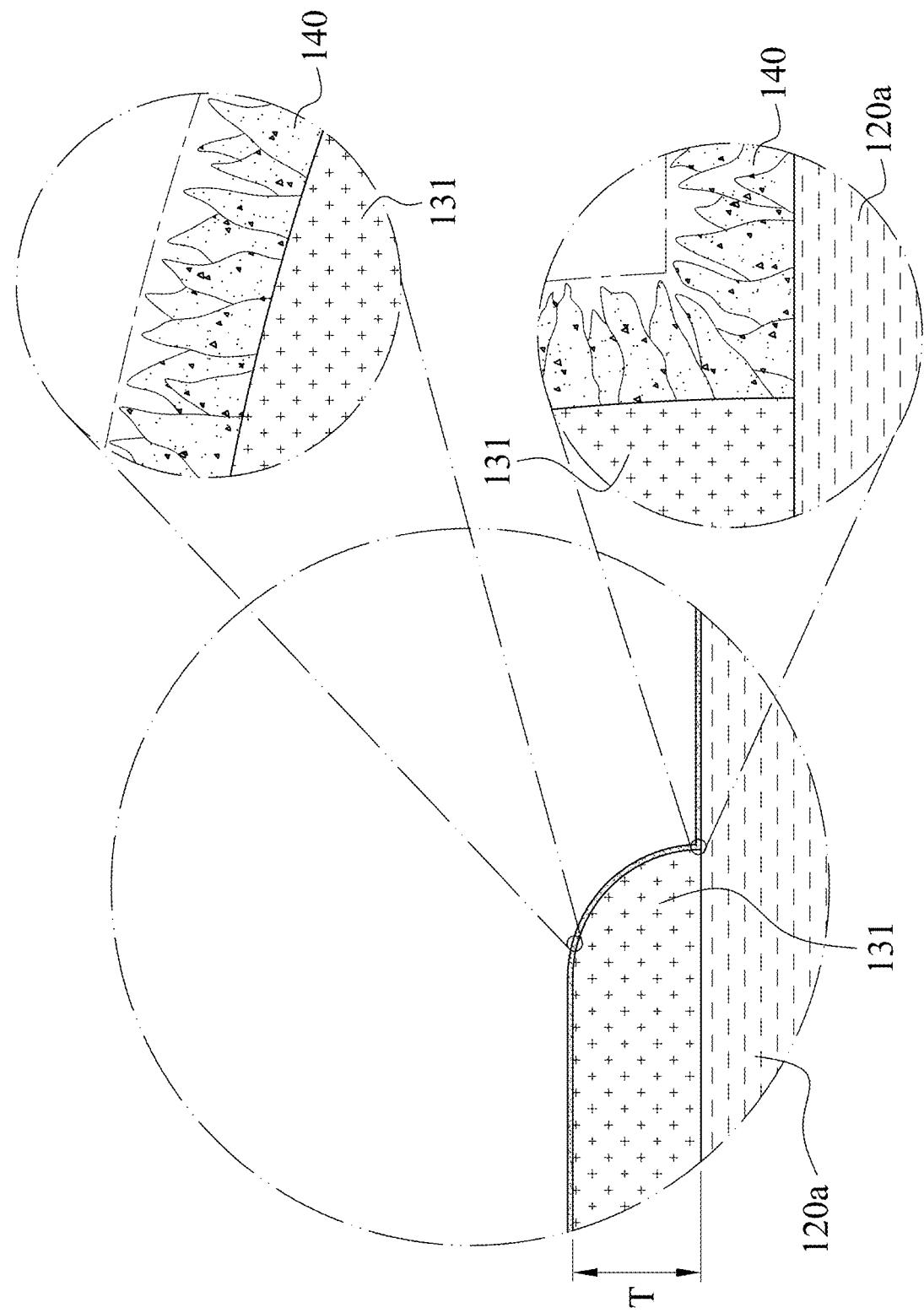
FIG. 1L is a partial enlarged view of the light folding element according to the 2nd example of the 1st embodiment in FIG. 1H.

FIG. 1L is a partial enlarged view of the light folding element 120a according to the 2nd example of the 1st embodiment in FIG. 1H. In FIG. 1L, a periphery of the light blocking structure 130 is arc-shaped, and a peripheral thickness T of the main light blocking portion 131 is 5 um.

Figure 1M:
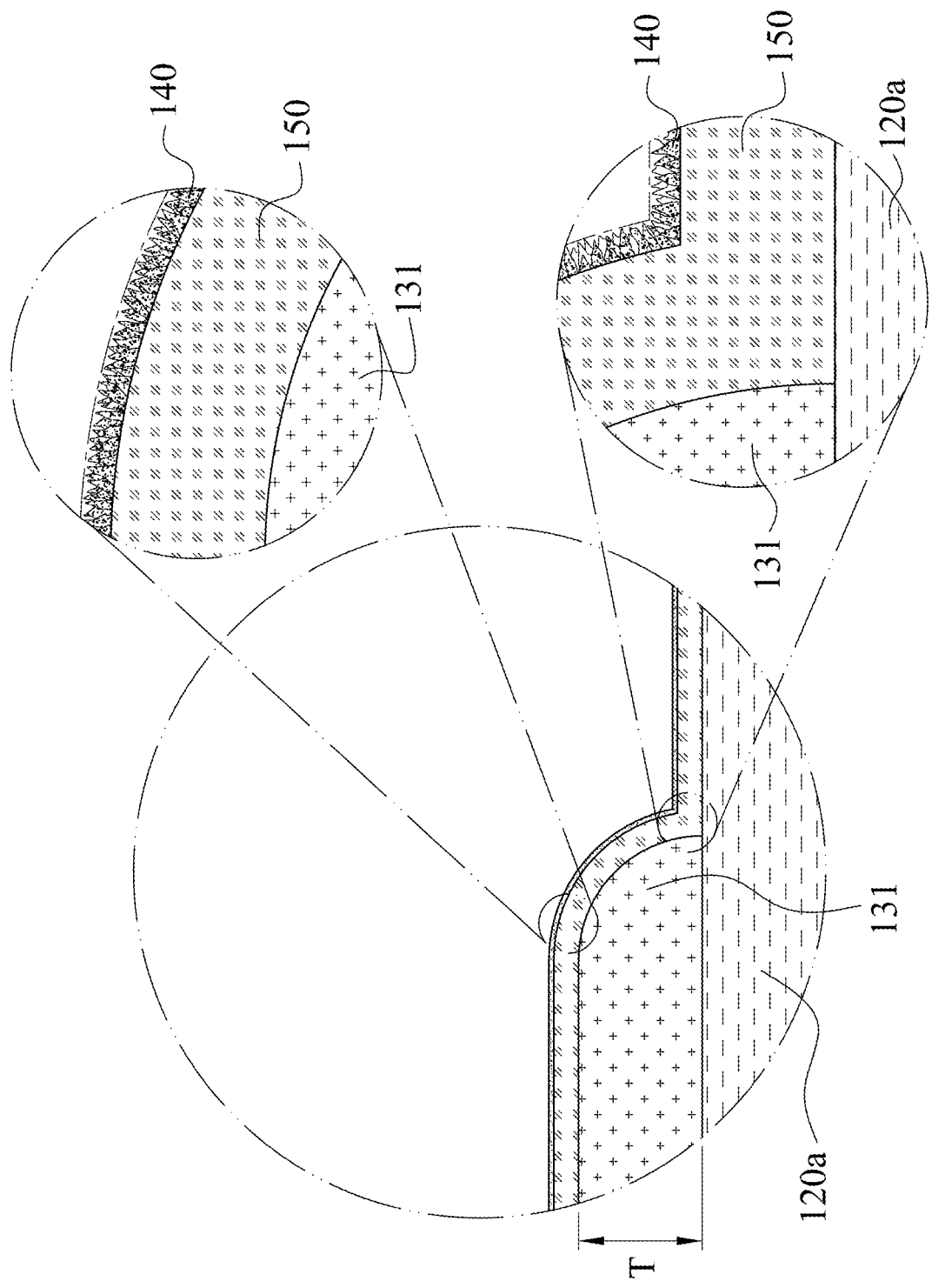
FIG. 1M is a partial enlarged view of the light folding element according to the 3rd example of the 1st embodiment in FIG. 1H.

FIG. 1M is a partial enlarged view of the light folding element 120a according to the 3rd example of the 1st embodiment in FIG. 1H. In FIG. 1M, the light folding element 120a can further include a connecting structure layer 150, wherein the connecting structure layer 150 is disposed between the nanostructure layer 140 and the incident surface 122a of the light folding element 120a, and the connecting structure layer 150 is further disposed between the nanostructure layer 140 and the light blocking structure 130. In particular, the light folding element 120a can be tightly connected to the nanostructure layer 140 via the connecting structure layer 150, and the light blocking structure 130 can be tightly connected to the nanostructure layer 140 via the connecting structure layer 150 so as to obtain the higher structural stability. Furthermore, the nanostructure layer 140 can be disposed on the topmost of the connecting structure layer 150. A portion of the connecting structure layer 150 is exposed via the pore structures of the surface of the nanostructure layer 140, wherein the portion of the connecting structure layer 150, which is exposed, is contacted with the air.

In FIG. 1M, a periphery of the light blocking structure 130 is arc-shaped, and a peripheral thickness T of the main light blocking portion 131 is 5 um.

Figure 1N:
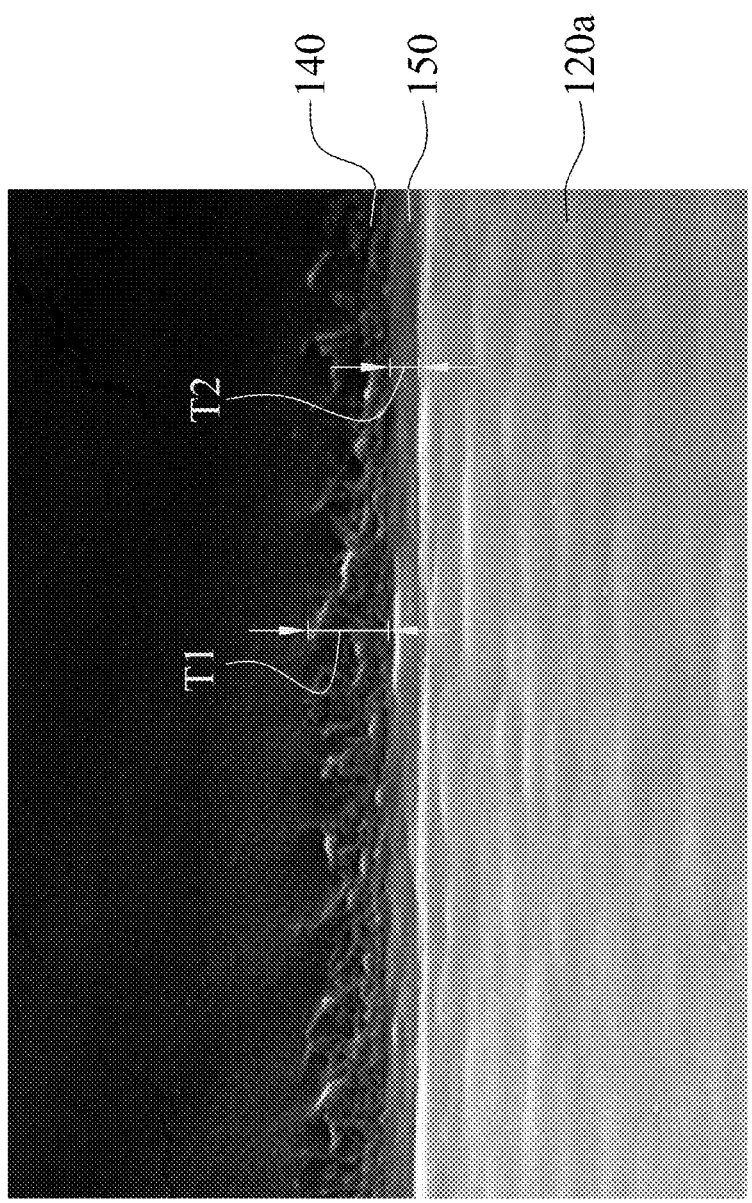
FIG. 1N is a scanning electron microscope image of a cross section of the light folding element according to the 3rd example of the 1st embodiment in FIG. 1M.
Figure 10:
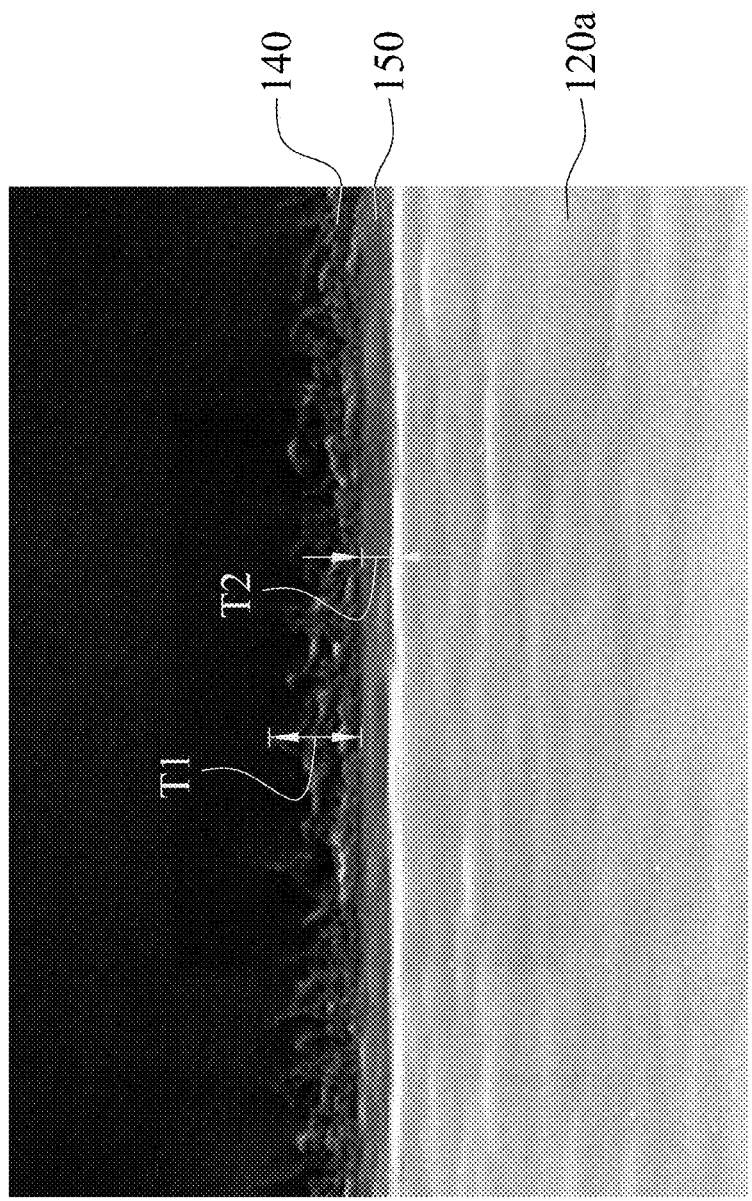
Figure 1P:
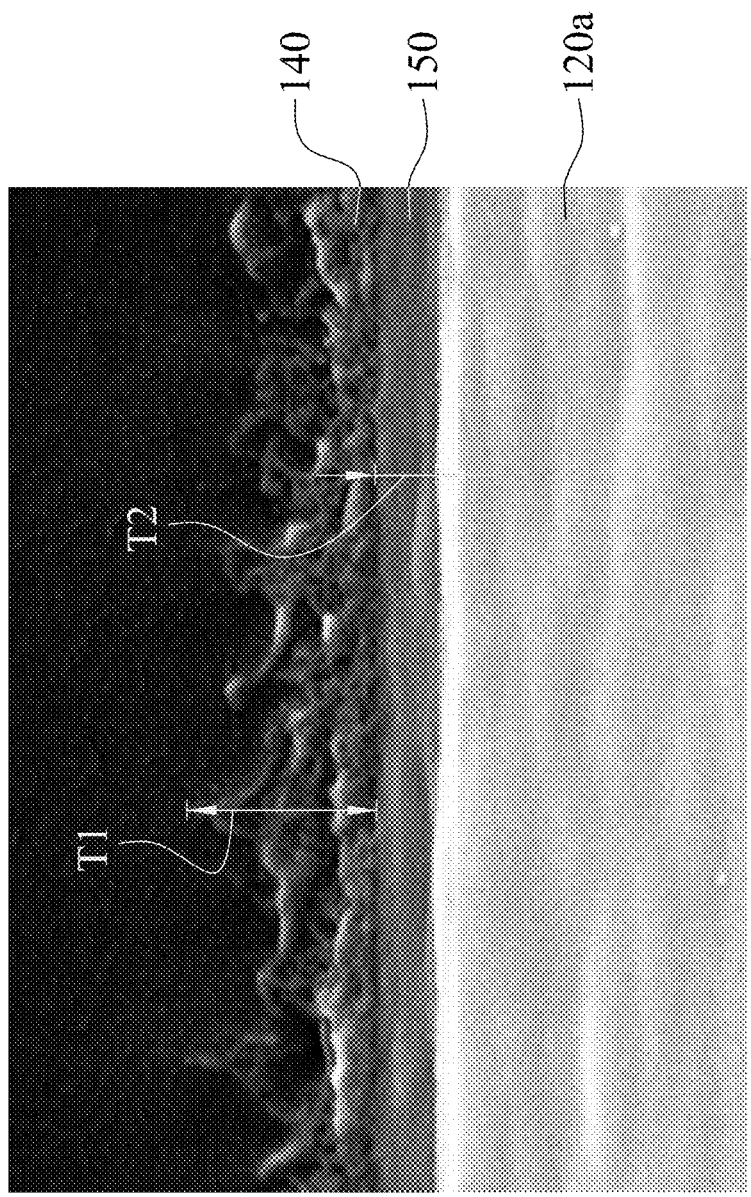
FIG. 1P is another scanning electron microscope image of a cross section of the light folding element according to the 3rd example of the 1st embodiment in FIG. 1M.

FIG. 1N is a scanning electron microscope image of a cross section of the light folding element 120a according to the 3rd example of the 1st embodiment in FIG. 1M. FIG. 1O is another scanning electron microscope image of a cross section of the light folding element 120a according to the 3rd example of the 1st embodiment in FIG. 1M. FIG. 1P is another scanning electron microscope image of a cross section of the light folding element 120a according to the 3rd example of the 1st embodiment in FIG. 1M. In FIGS. 1N to 1P, observing the cross section of the light folding element 120a via the scanning electron microscope image, the cross section of the light folding element 120a from top to bottom is the nanostructure layer 140, the connecting structure layer 150 and the surface of the light folding element 120a in sequence, wherein a height T1 of the nanostructure layer 140 in FIG. 1N is 200.3 nm, and a thickness T2 of the connecting structure layer 150 in FIG. 1N is 73.68 nm; a height T1 of the nanostructure layer 140 in FIG. 1O is 232.7 nm, and a thickness T2 of the connecting structure layer 150 in FIG. 1O is 76.62 nm; a height T1 of the nanostructure layer 140 in FIG. 1P is 247.4 nm, and a thickness T2 of the connecting structure layer 150 in FIG. 1P is 75.15 nm, wherein an average height of the nanostructure layer 140 is 226.8 nm.

Moreover, in FIGS. 1N to 1P, when the nanostructure layer 140 is observed, the nanostructure layer 140 has the irregular ridged convexs with the shape of wide bottom and narrow top like a mountain ridge so as to gradually decrease the equivalent refractive index from the bottom to the top of the nanostructure layer 140 for damaging and reducing the reflecting light.

Figure 1Q:
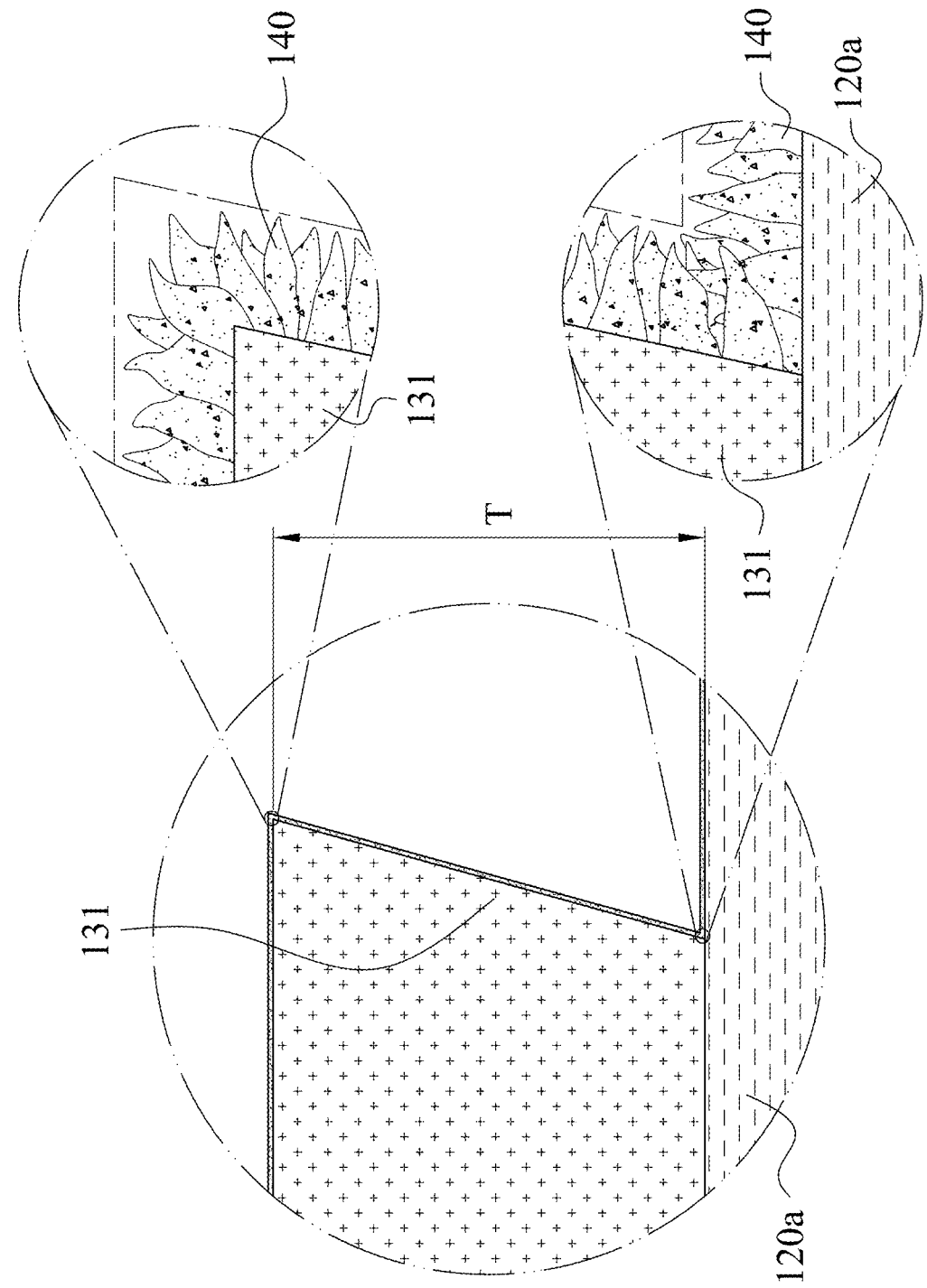
FIG. 1Q is a partial enlarged view of the light folding element according to the 4th example of the 1st embodiment in FIG. 1H.

FIG. 1Q is a partial enlarged view of the light folding element 120a according to the 4th example of the 1st embodiment in FIG. 1H. In FIG. 1Q, a peripheral thickness T of the main light blocking portion 131 is 18 um.

It should be mentioned that the cross-shaped pattern and the dot pattern in FIGS. 1A to 1I, 1L to 1M and 1Q are configured to indicate the range of the light blocking structure 130 and the range of the nanostructure layer 140, respectively.

2nd Embodiment

Figure 2A:
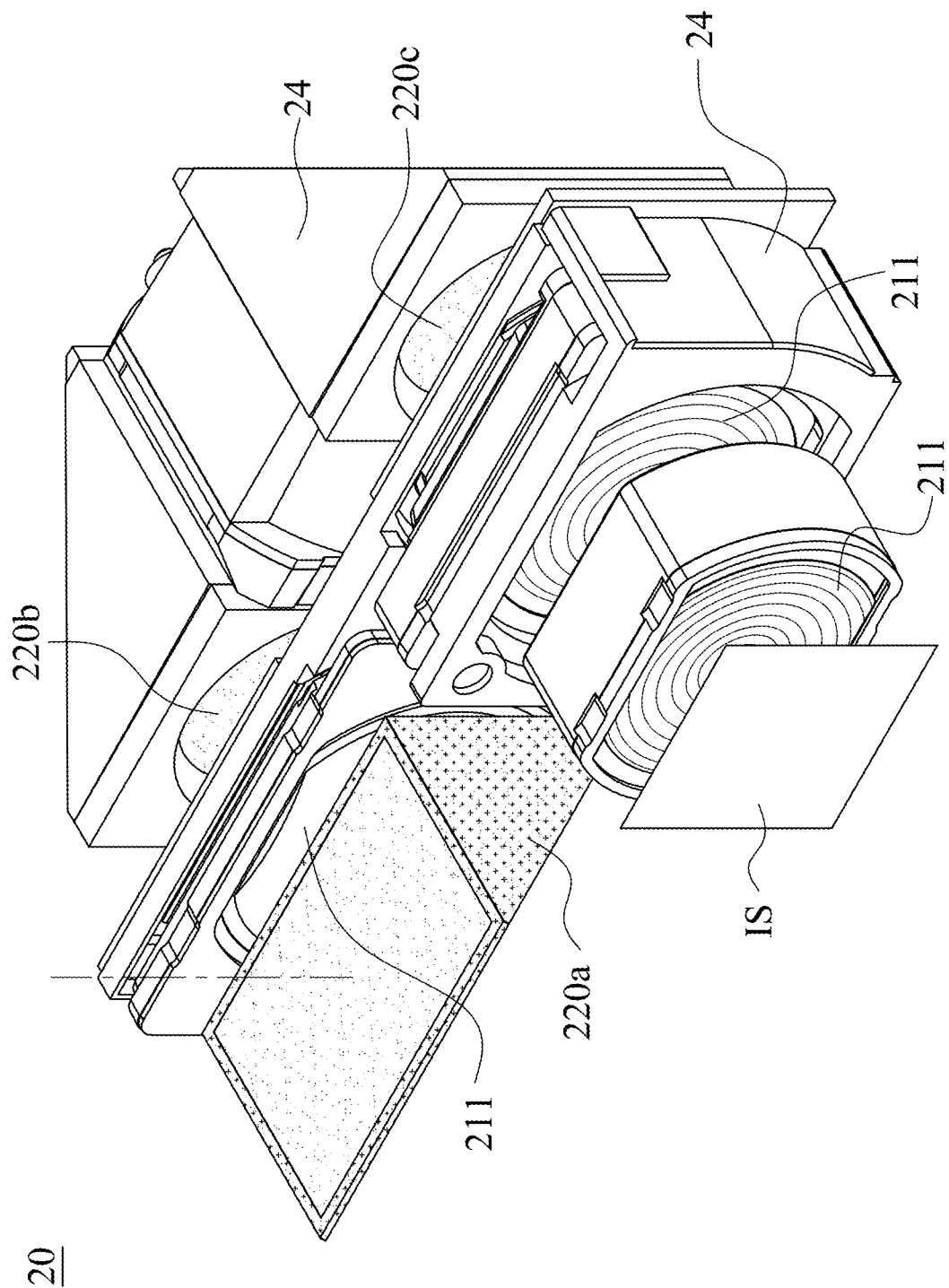
FIG. 2A is a three dimensional view of a camera module according to the 2nd embodiment of the present disclosure.
Figure 2B:
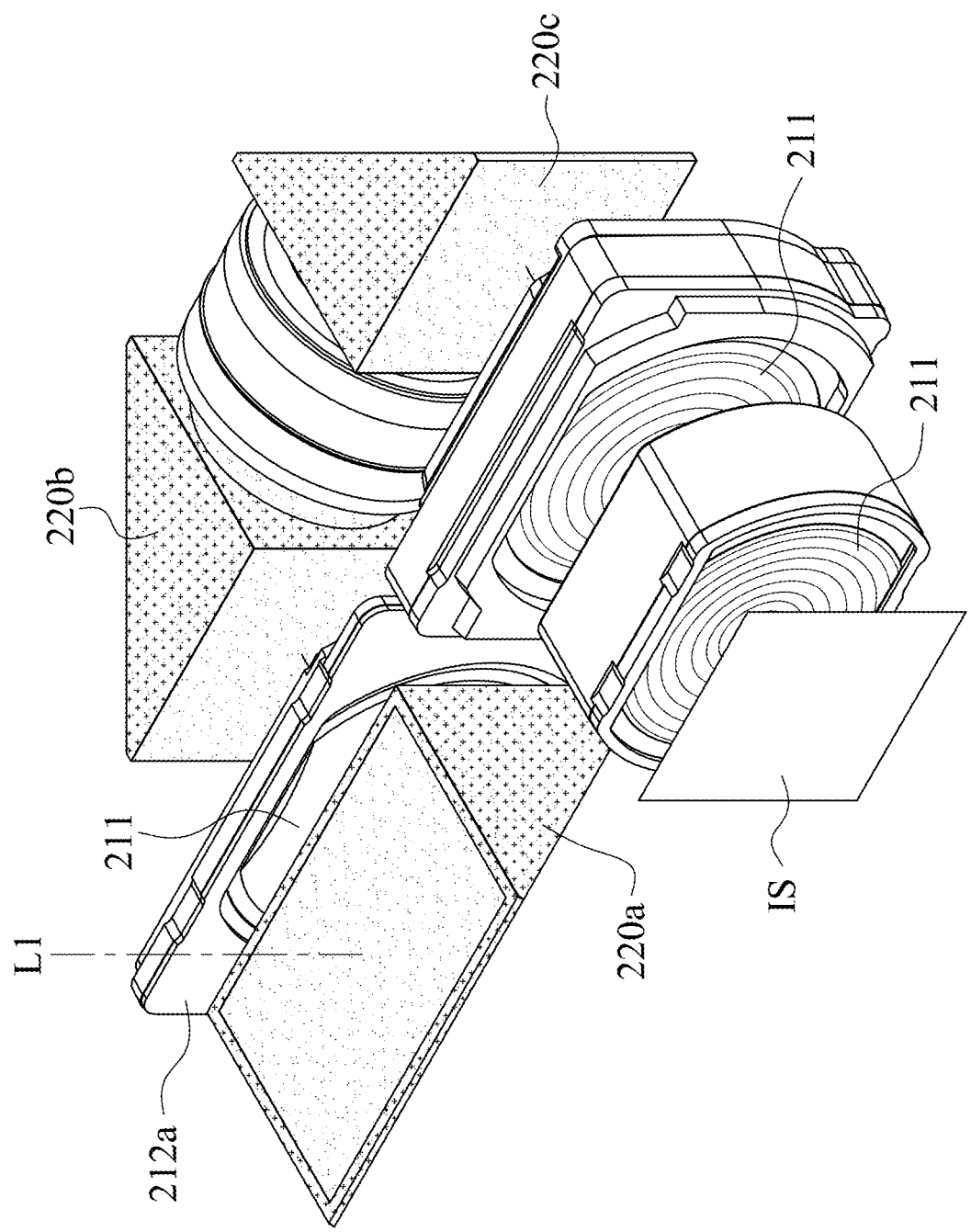
FIG. 2B is a partial three dimensional view of the camera module according to the 2nd embodiment in FIG. 2A.
Figure 2C:
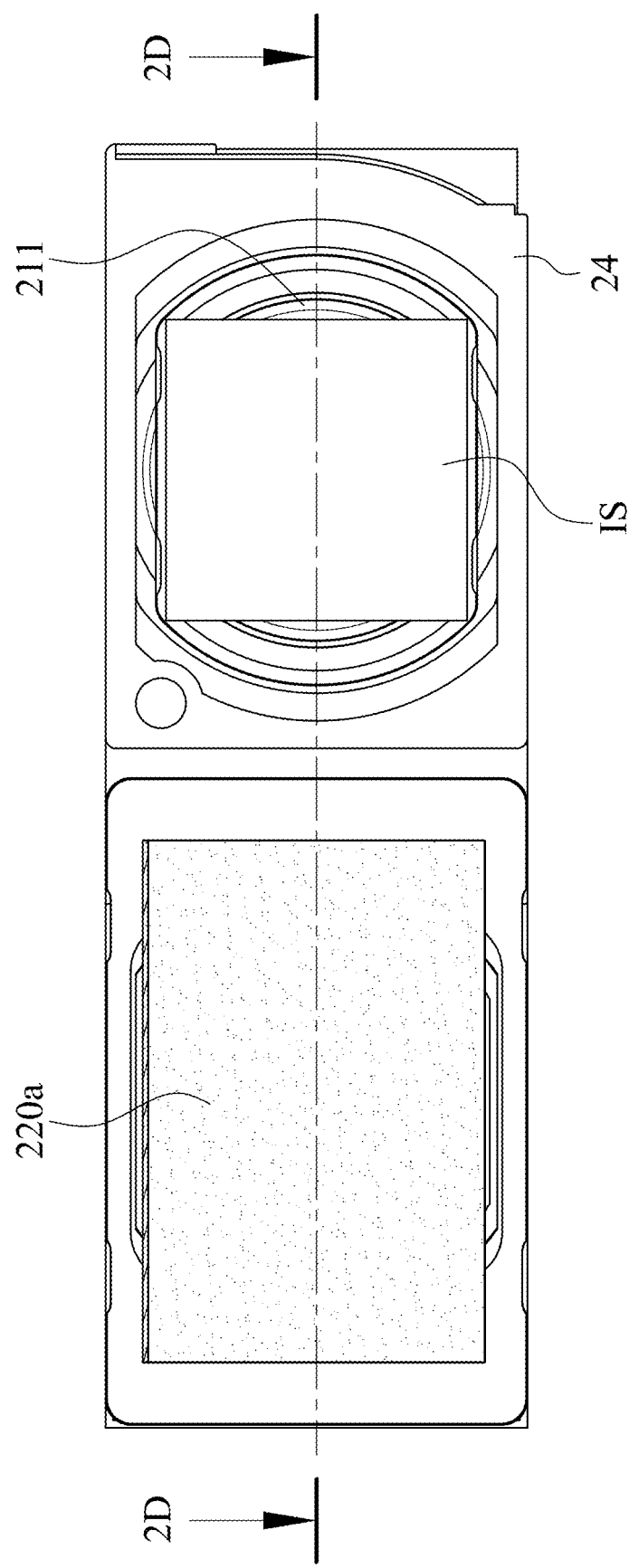
FIG. 2C is a top view of the camera module according to the 2nd embodiment in FIG. 2A.
Figure 2D:
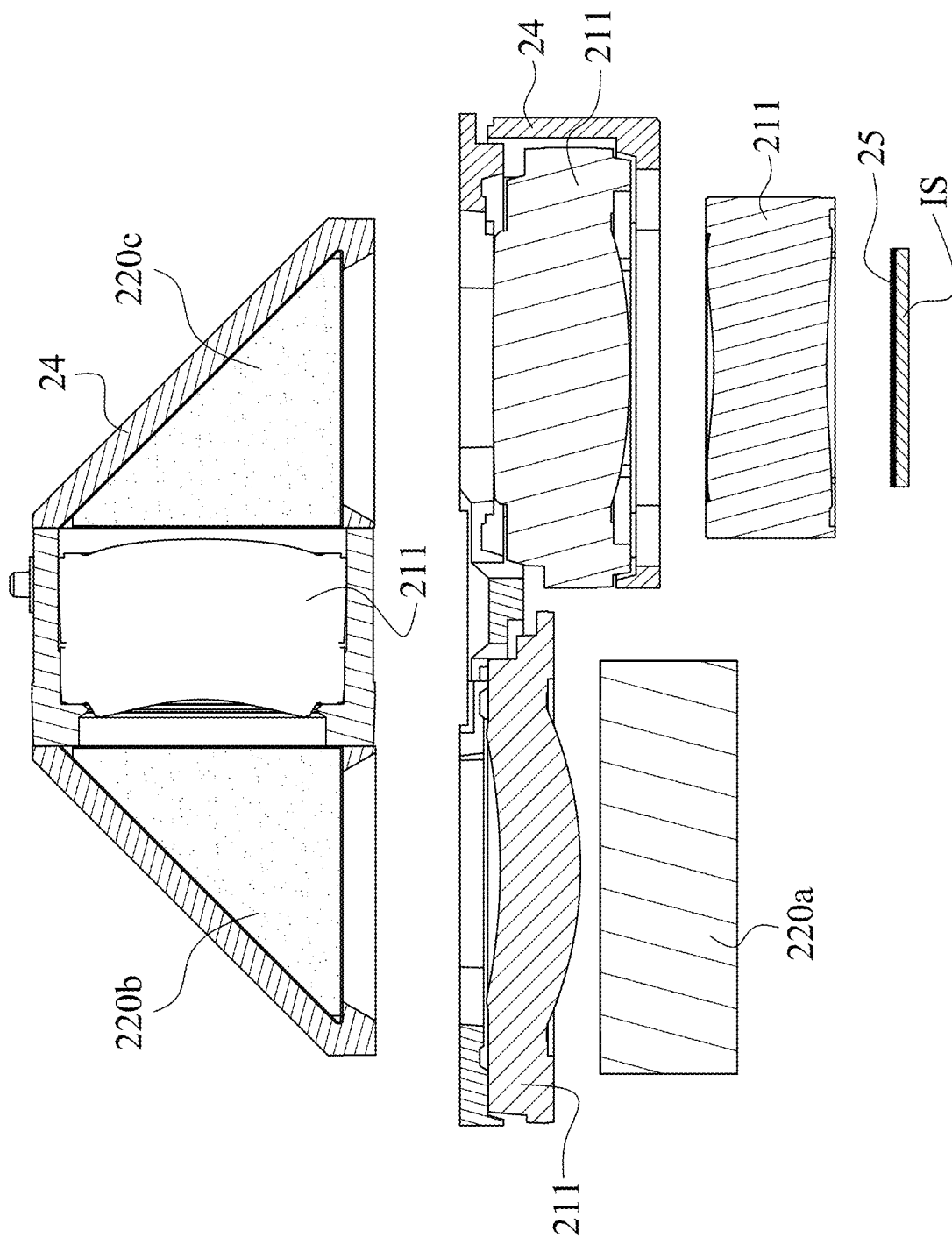
FIG. 2D is a cross-sectional view of the camera module along a 2D-2D line in FIG. 2C.

FIG. 2A is a three dimensional view of a camera module 20 according to the 2nd embodiment of the present disclosure. FIG. 2B is a partial three dimensional view of the camera module 20 according to the 2nd embodiment in FIG. 2A. FIG. 2C is a top view of the camera module 20 according to the 2nd embodiment in FIG. 2A. FIG. 2D is a cross-sectional view of the camera module 20 along a 2D-2D line in FIG. 2C. In FIGS. 2A to 2D, the camera module 20 includes a plurality of carriers 24 and an imaging lens assembly (its reference numeral is omitted), wherein the camera module 20 can be applied to an electronic device (not shown), and an image sensor IS of the electronic device is disposed on an image surface 25 of the camera module 20.

Figure 2E:
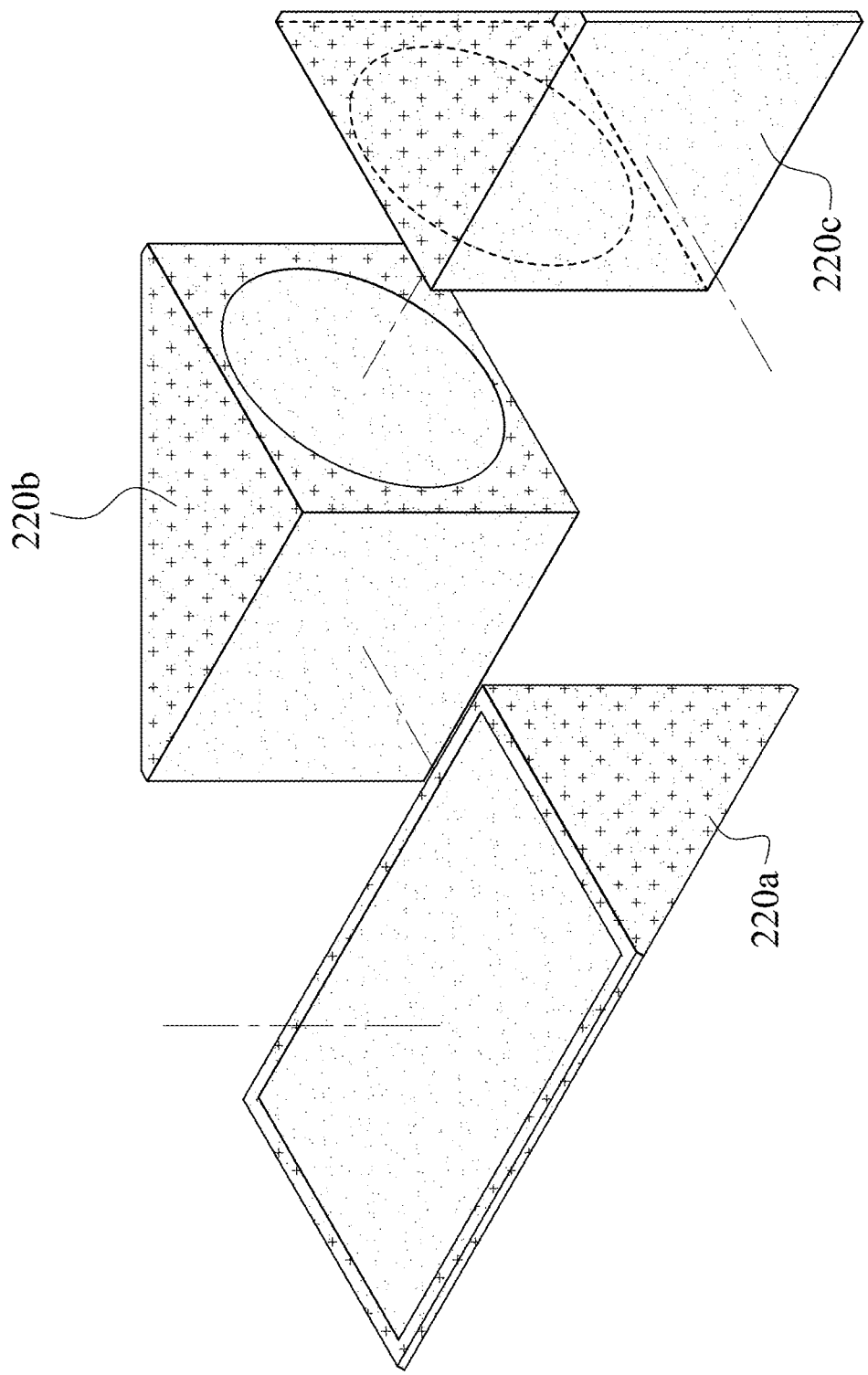
FIG. 2E is a three dimensional view of light folding elements according to the 2nd embodiment in FIG. 2A.
Figure 2F:
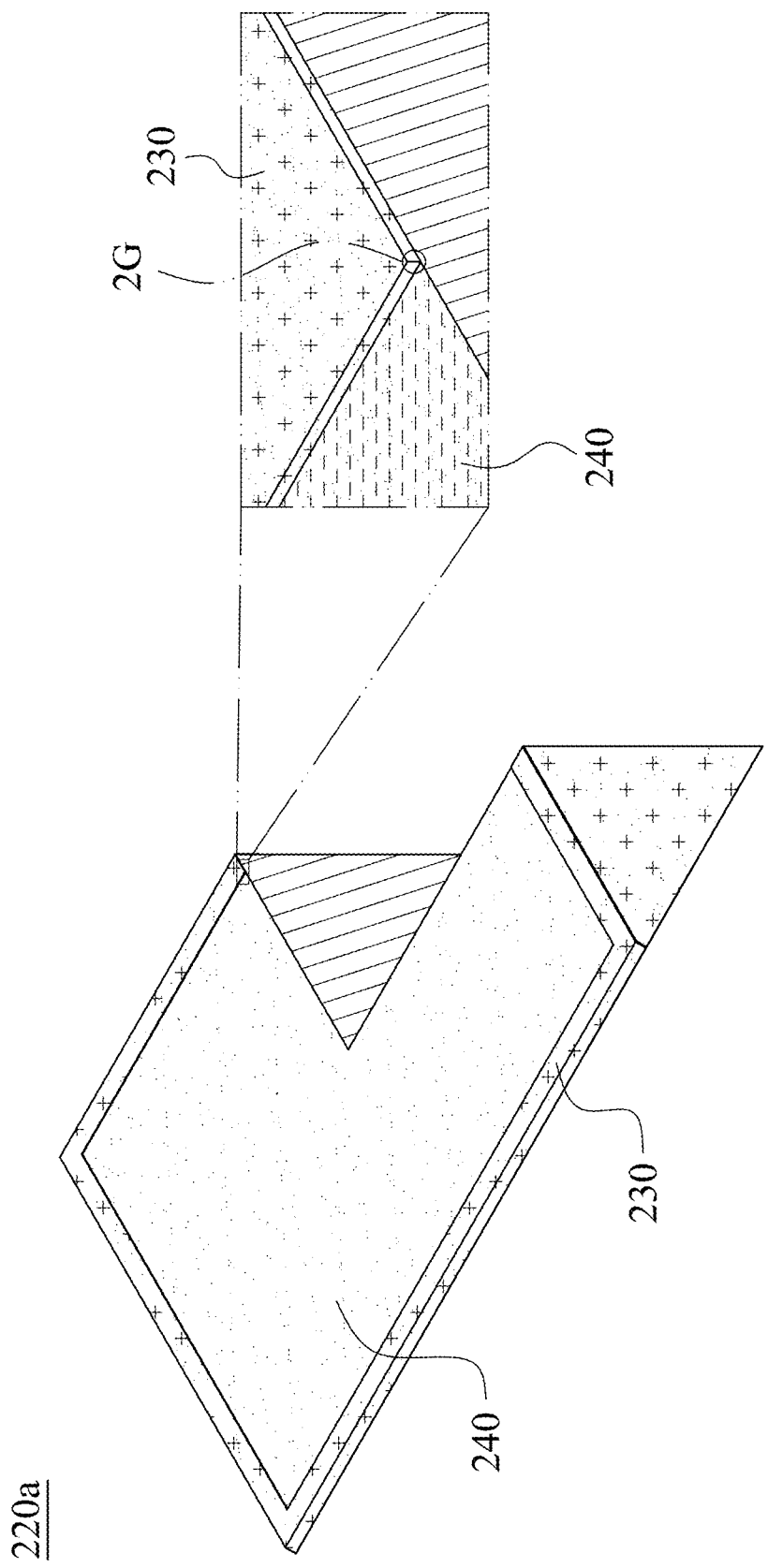
FIG. 2F is a partial cross section of the light folding element according to the 2nd embodiment in FIG. 2E.
Figure 2G:
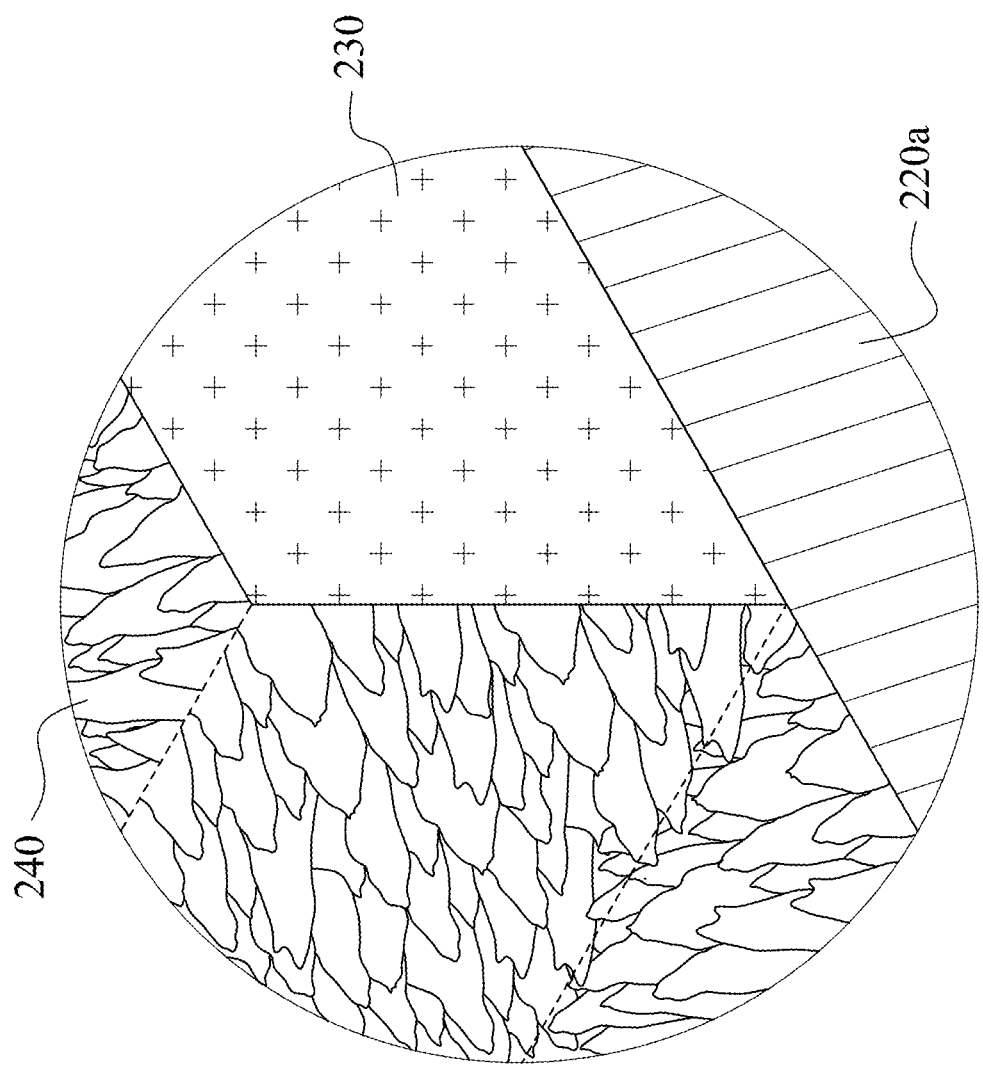
FIG. 2G is a partial enlarged view of the light folding element according to the 2nd embodiment in FIG. 2F.
Figure 2H:
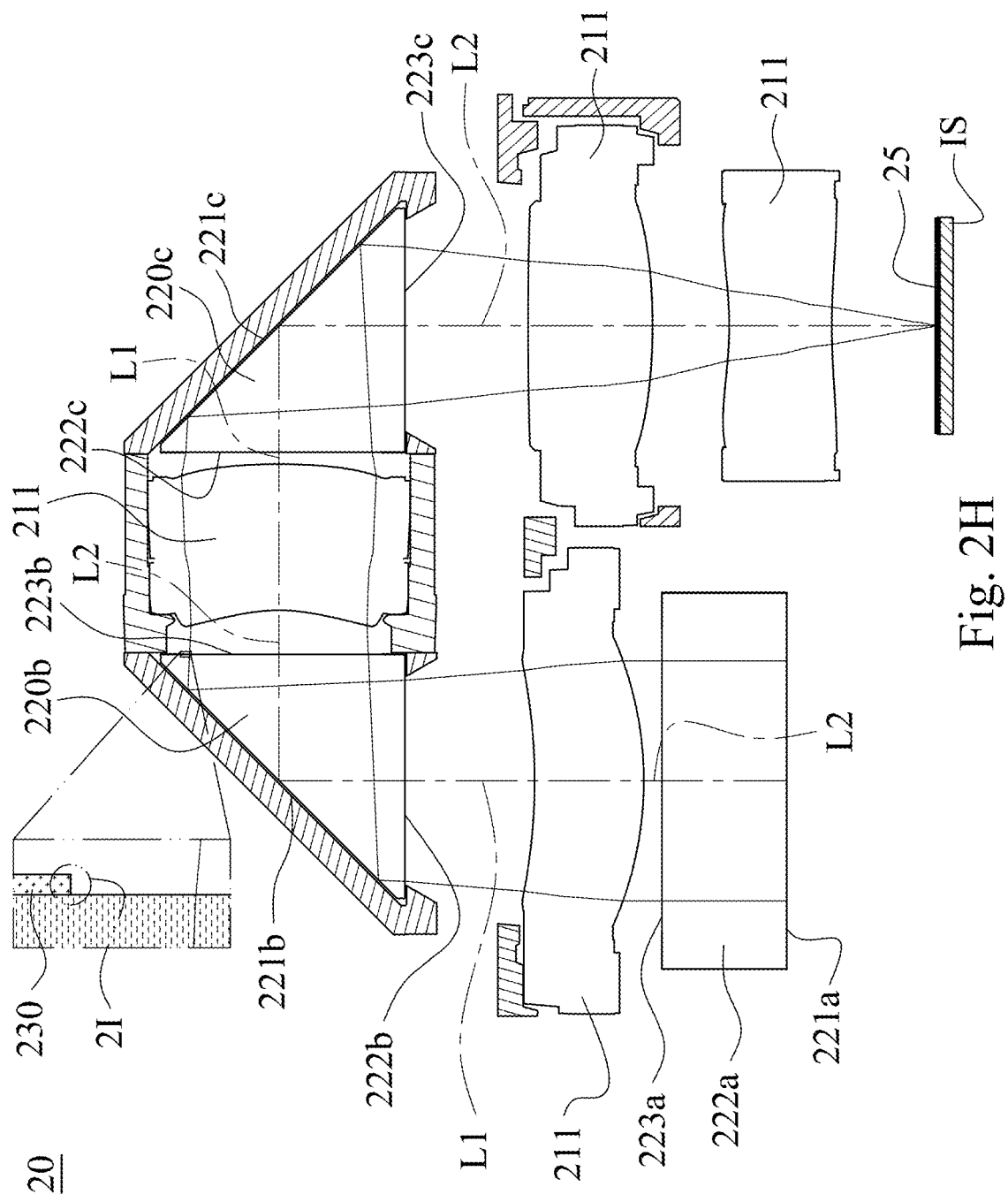
FIG. 2H is a partial schematic view of the camera module according to the 2nd embodiment in FIG. 2A.

FIG. 2E is a three dimensional view of light folding elements 220a, 220b, 220c according to the 2nd embodiment in FIG. 2A. FIG. 2F is a partial cross section of the light folding element 220a according to the 2nd embodiment in FIG. 2E. FIG. 2G is a partial enlarged view of the light folding element 220a according to the 2nd embodiment in FIG. 2F. FIG. 2H is a partial schematic view of the camera module 20 according to the 2nd embodiment in FIG. 2A. In FIGS. 2A to 2H, the imaging lens assembly includes a plurality of optical elements 211 and a light path folding mechanism (its reference numeral is omitted), wherein an optical axis (its reference numeral is omitted) passes through the optical elements 211, the light path folding mechanism is disposed on the optical axis to fold the optical axis at least once. Moreover, the light path folding mechanism includes three light folding elements 220a, 220b, 220c, a light blocking structure 230 and a nanostructure layer 240, and the carriers 24 are configured to accommodate the optical elements 211 and the light folding elements 220b, 220c, wherein a number of the light folding elements 220a, 220b, 220c is three, and the light path folding mechanism is configured to fold the optical axis three times so as to correspond to the optical design with the long focal length for obtaining the effect of the compact size of the imaging lens assembly.

In FIG. 2H, the light folding element 220a includes a reflecting surface 221a, an incident surface 222a, an exit surface 223a and a connecting surface (its reference numeral is omitted), the light folding element 220b includes a reflecting surface 221b, an incident surface 222b, an exit surface 223b and a connecting surface (its reference numeral is omitted), and the light folding element 220c includes a reflecting surface 221c, an incident surface 222c, an exit surface 223c and a connecting surface (its reference numeral is omitted). The reflecting surface 221a is configured to fold an incident light path L1 of the light folding element 220a towards an exit light path L2; the incident surface 222a is disposed on an object side of the reflecting surface 221a, and the incident light path L1 passes through the incident surface 222a; the exit surface 223a is disposed on an image side of the reflecting surface 221a, and the exit light path L2 passes through the exit surface 223a; the connecting surface is connected to the reflecting surface 221a, the incident surface 222a and the exit surface 223a. The reflecting surface 221b is configured to fold an incident light path L1 of the light folding element 220b towards an exit light path L2; the incident surface 222b is disposed on an object side of the reflecting surface 221b, and the incident light path L1 passes through the incident surface 222b; the exit surface 223b is disposed on an image side of the reflecting surface 221b, and the exit light path L2 passes through the exit surface 223b; the connecting surface is connected to the reflecting surface 221b, the incident surface 222b and the exit surface 223b. The reflecting surface 221c is configured to fold an incident light path L1 of the light folding element 220c towards an exit light path L2; the incident surface 222c is disposed on an object side of the reflecting surface 221c, and the incident light path L1 passes through the incident surface 222c; the exit surface 223c is disposed on an image side of the reflecting surface 221c, and the exit light path L2 passes through the exit surface 223c; the connecting surface is connected to the reflecting surface 221c, the incident surface 222c and the exit surface 223c. Further, the reflecting surface 221b of the light folding element 220b and the reflecting surface 221c of the light folding element 220c are vertical to each other, and the surfaces except for the reflecting surfaces 221a, 221b, 221c, the incident surfaces 222a, 222b, 222c and the exit surfaces 223a, 223b, 223c can be defined as the connecting surfaces.

In detail, the light blocking structure 230 is disposed on all of the incident surface 222a and the connecting surface of the light folding element 220a, the connecting surface and the exit surface 223b of the light folding element 220b and the connecting surface of the light folding element 220c. Therefore, the light blocking structure 230 with the better light blocking range can be obtained so as to enhance the light blocking efficiency of the stray light.

Figure 2I:
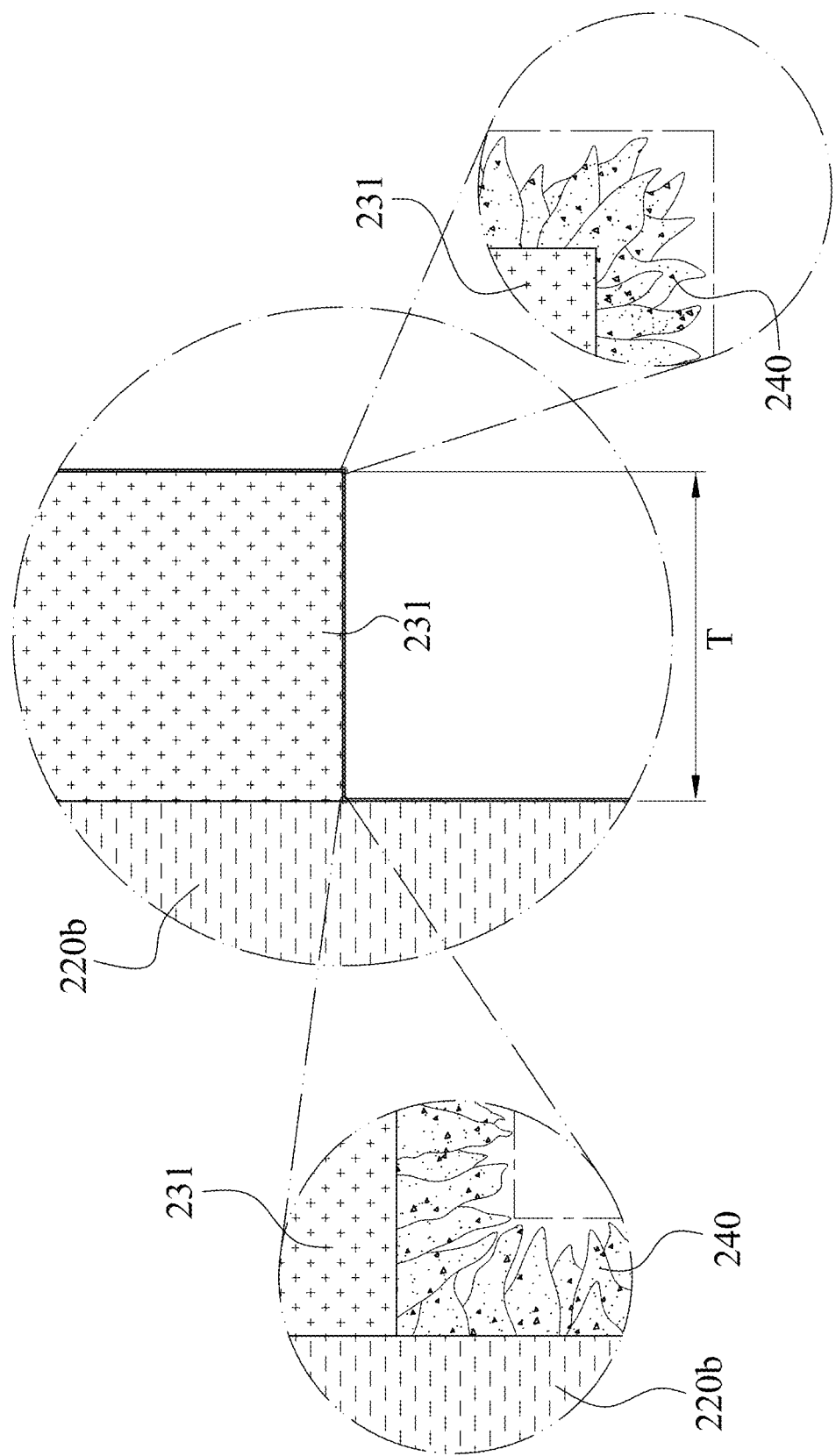
FIG. 2I is a partial enlarged view of the light folding element according to the 1st example of the 2nd embodiment in FIG. 2H.

FIG. 2I is a partial enlarged view of the light folding element 220b according to the 1st example of the 2nd embodiment in FIG. 2H. In FIG. 2I, the light blocking structure 230 includes a main light blocking portion 231, wherein the main light blocking portion 231 is located on a peripheral portion closest to the optical axis on a cross section passing through the optical axis, and the main light blocking portion 231 of the light blocking structure 230 surrounds the optical axis to define a light through area.

Moreover, the nanostructure layer 240 is continuously distributed over the incident surface 222b of the light folding element 220b and the main light blocking portion 231 of the light blocking structure 230, and the nanostructure layer 240 has a plurality of irregular ridged convexs. Hence, the reflection of the light on the main light blocking portion 231 can be reduced by disposing the nanostructure layer 240 on the main light blocking portion 231 of the light blocking structure 230 so as to keep the image clear. In particular, a surface of the nanostructure layer 240 has a plurality of pore structures, and a portion of the light folding element 220b or a portion of the light blocking structure 230 is exposed via the pore structures, wherein the portion of the light folding element 220b or the portion of the light blocking structure 230, which is exposed, is contacted with the air.

In FIG. 2I, a peripheral thickness T of the main light blocking portion 231 is 28 um.

Figure 2J:
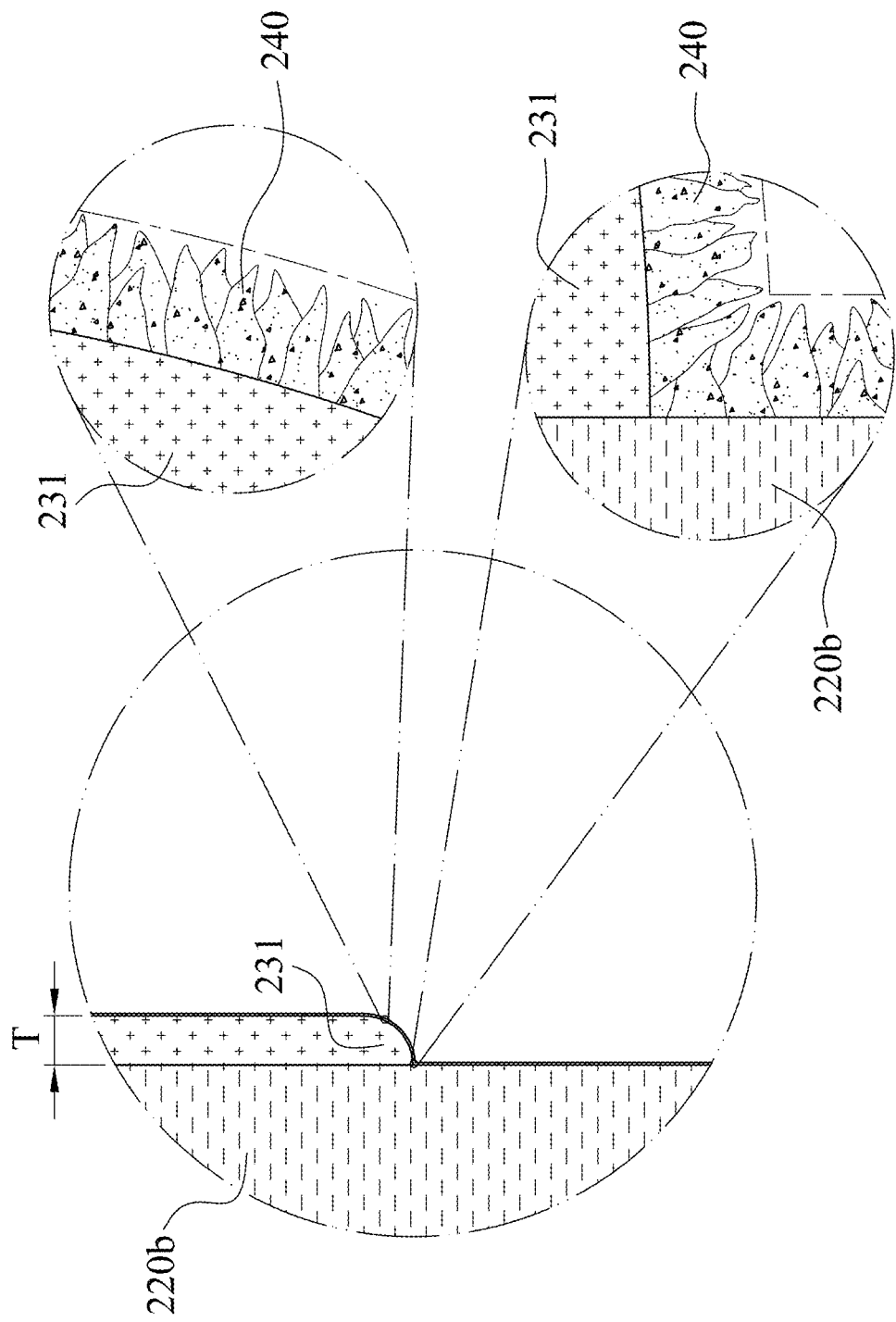
FIG. 2J is a partial enlarged view of the light folding element according to the 2nd example of the 2nd embodiment in FIG. 2H.

FIG. 2J is a partial enlarged view of the light folding element 220b according to the 2nd example of the 2nd embodiment in FIG. 2H. In FIG. 2J, a periphery of the light blocking structure 230 is arc-shaped, and a peripheral thickness T of the main light blocking portion 231 is 4 um.

Figure 2K:
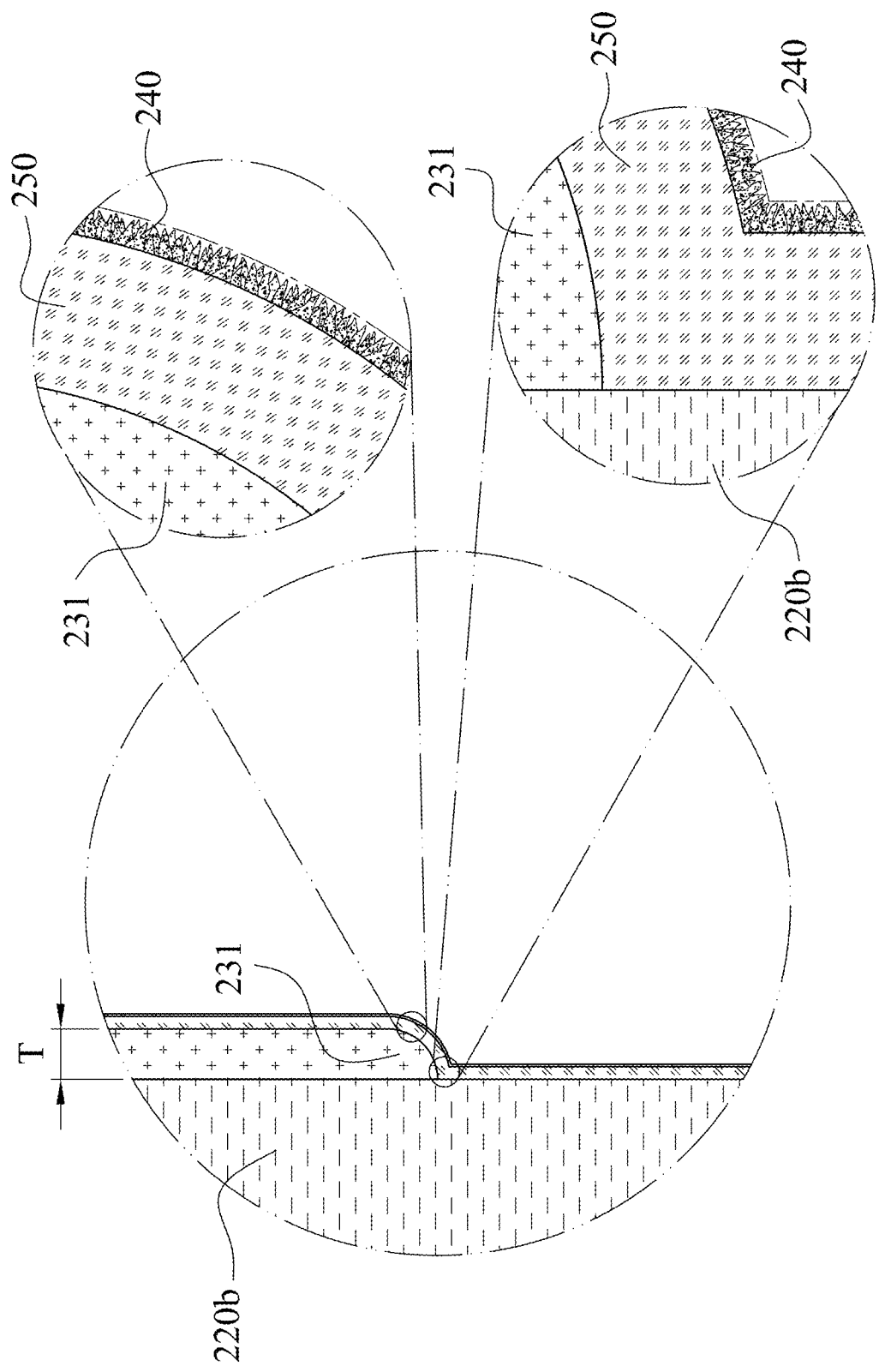
FIG. 2K is a partial enlarged view of the light folding element according to the 3rd example of the 2nd embodiment in FIG. 2H.

FIG. 2K is a partial enlarged view of the light folding element 220b according to the 3rd example of the 2nd embodiment in FIG. 2H. In FIG. 2K, the light folding element 220b can further include a connecting structure layer 250, wherein the connecting structure layer 250 is disposed between the nanostructure layer 240 and the exit surface 223b of the light folding element 220b, and the connecting structure layer 250 is further disposed between the nanostructure layer 240 and the light blocking structure 230. In particular, the light folding element 220b can be tightly connected to the nanostructure layer 240 via the connecting structure layer 250, and the light blocking structure 230 can be tightly connected to the nanostructure layer 240 via the connecting structure layer 250 so as to obtain the higher structural stability. Furthermore, the nanostructure layer 240 can be disposed on the topmost of the connecting structure layer 250. A portion of the connecting structure layer 250 is exposed via the pore structures of the surface of the nanostructure layer 240, wherein the portion of the connecting structure layer 250, which is exposed, is contacted with the air.

In FIG. 2K, a periphery of the light blocking structure 230 is arc-shaped, and a peripheral thickness T of the main light blocking portion 231 is 4 um.

Figure 2L:
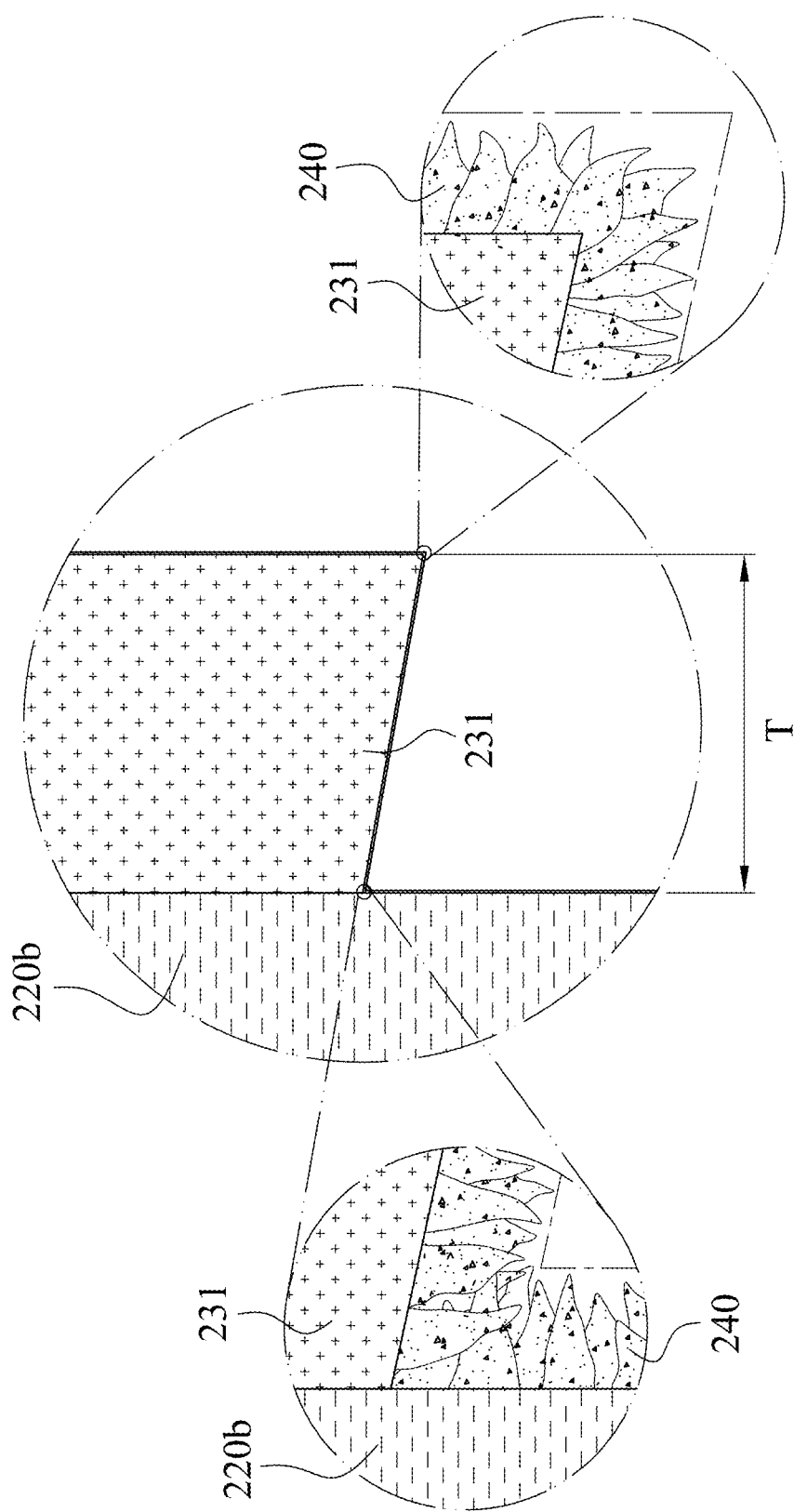
FIG. 2L is a partial enlarged view of the light folding element according to the 4th example of the 2nd embodiment in FIG. 2H.

FIG. 2L is a partial enlarged view of the light folding element 220b according to the 4th example of the 2nd embodiment in FIG. 2H. In FIG. 2L, a peripheral thickness T of the main light blocking portion 231 is 28 um.

It should be mentioned that the cross-shaped pattern and the dot pattern in FIGS. 2A to 2L are configured to indicate the range of the light blocking structure 230 and the range of the nanostructure layer 240, respectively.

3rd Embodiment

Figure 3A:
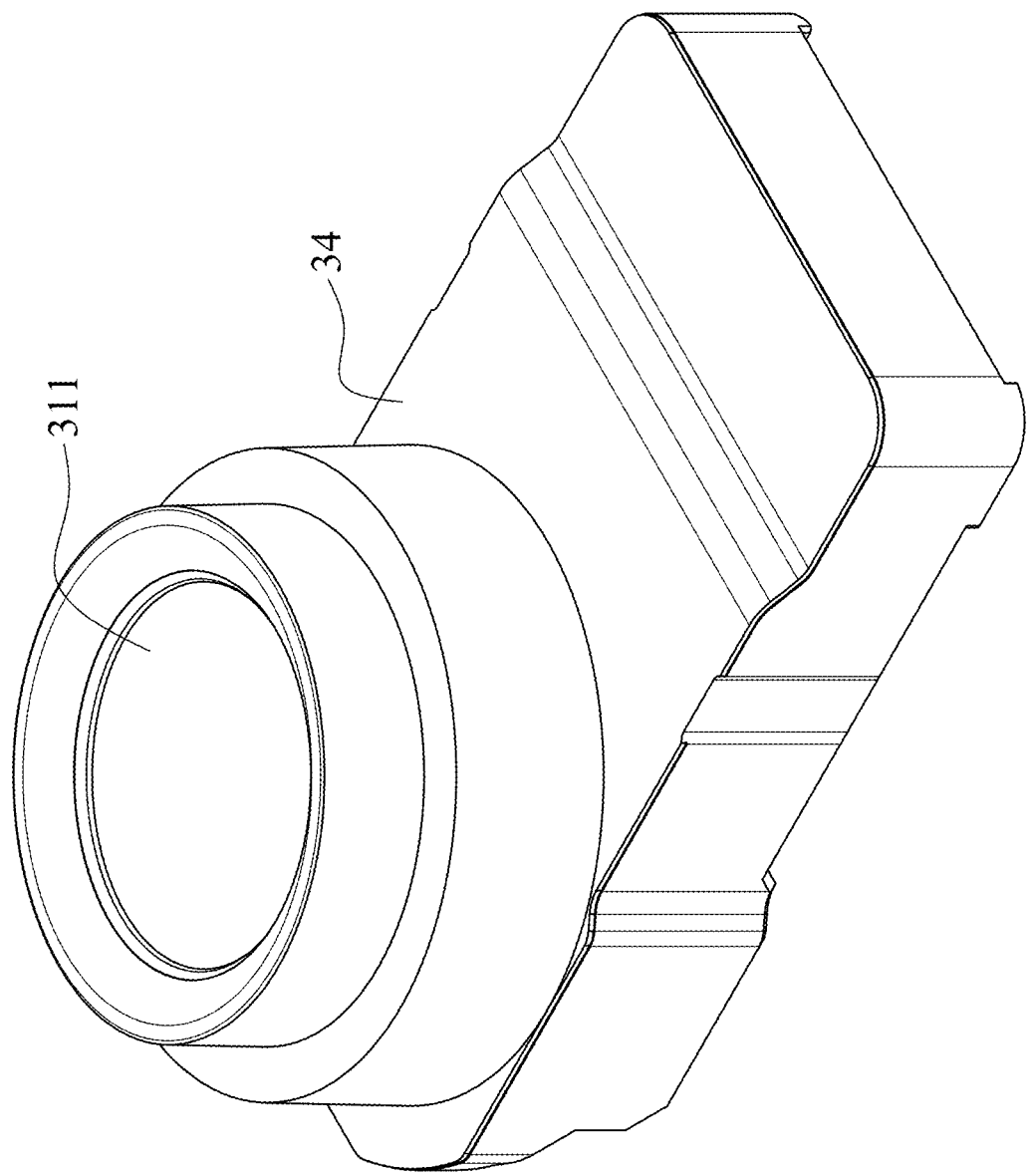
FIG. 3A is a three dimensional view of a camera module according to the 3rd embodiment of the present disclosure.
Figure 3B:
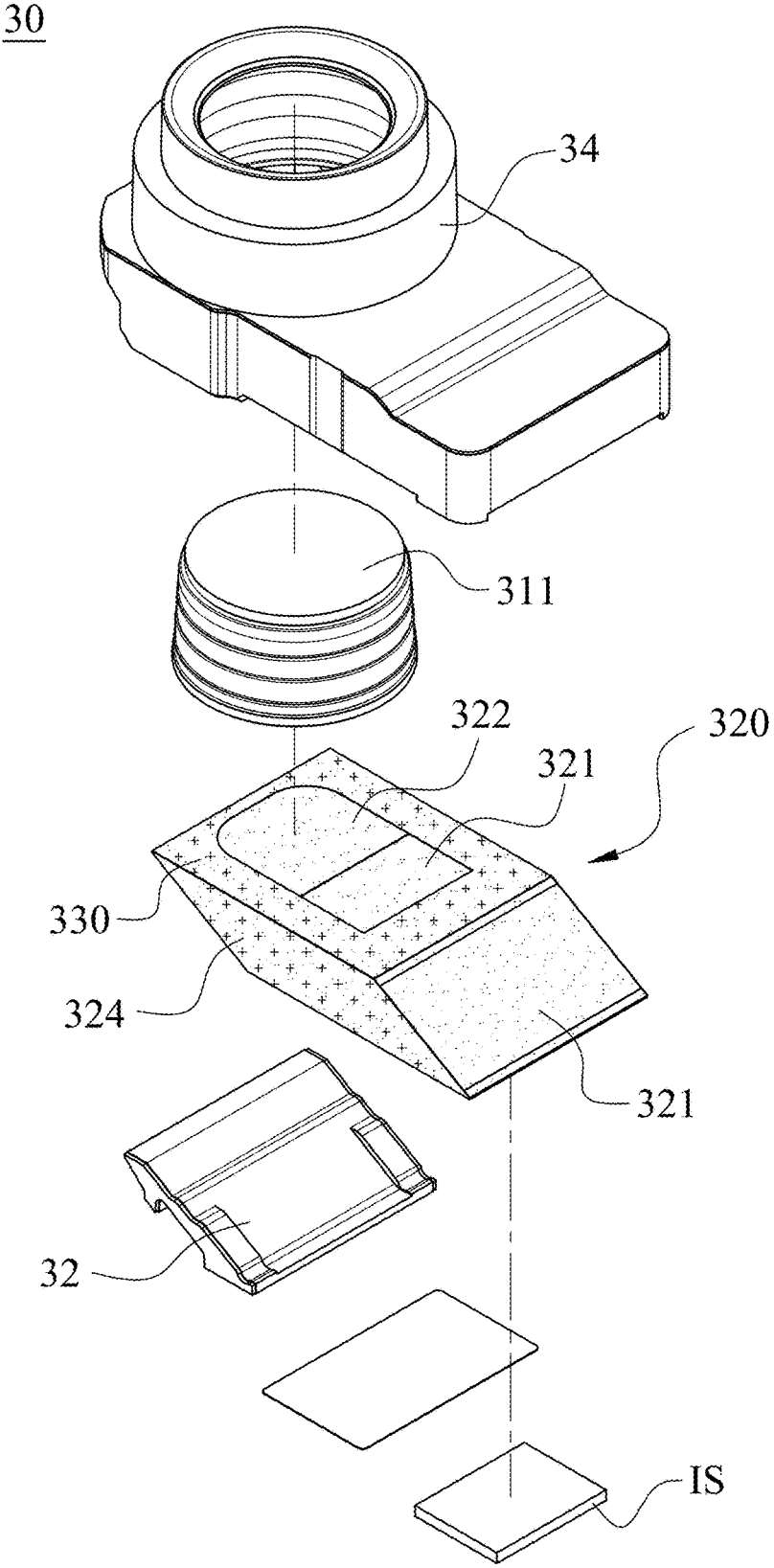
FIG. 3B is an exploded view of the camera module according to the 3rd embodiment in FIG. 3A.
Figure 3C:
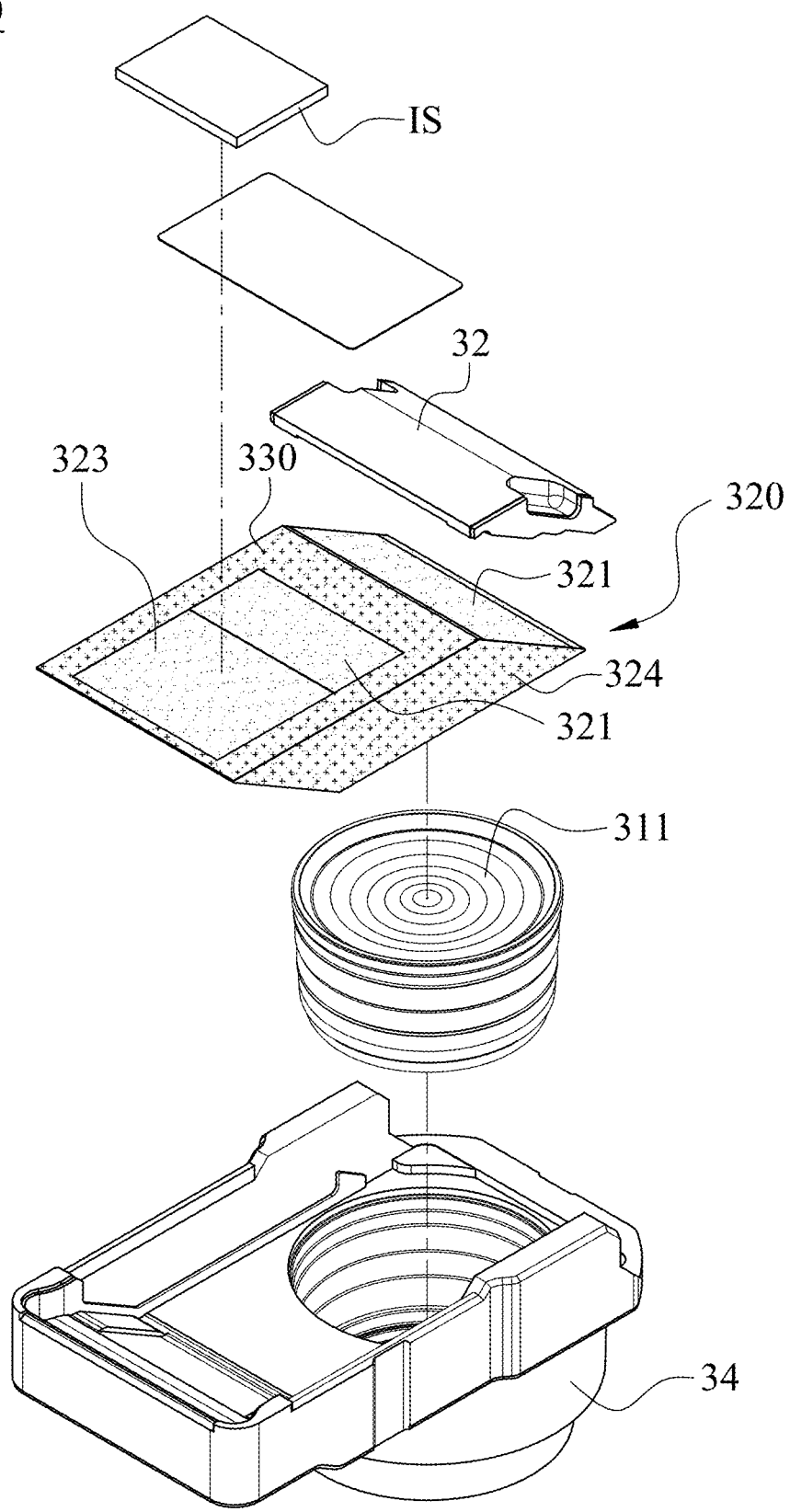
FIG. 3C is another exploded view of the camera module according to the 3rd embodiment in FIG. 3A.
Figure 3D:
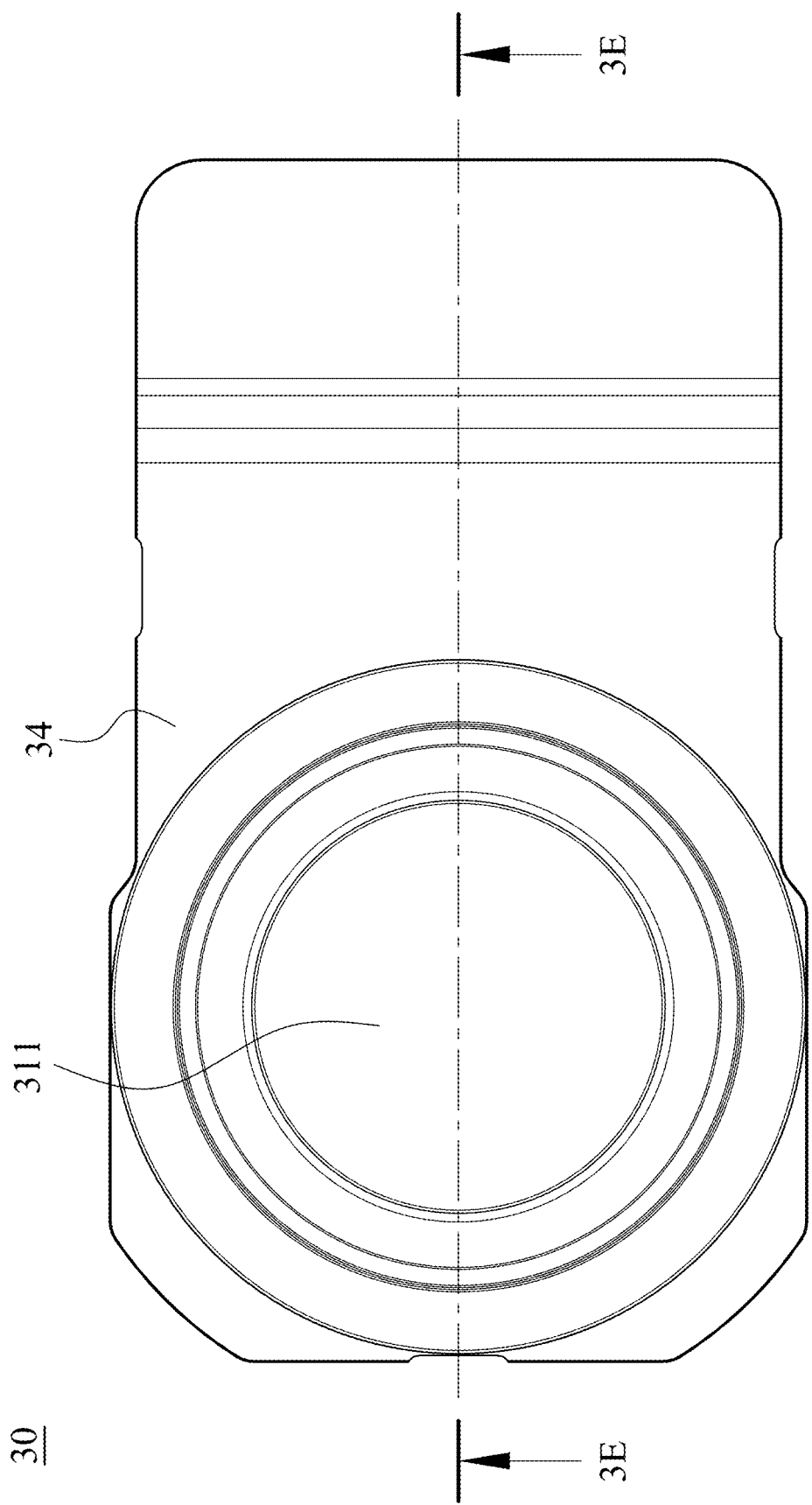
FIG. 3D is a top view of the camera module according to the 3rd embodiment in FIG. 3A.
Figure 3E:
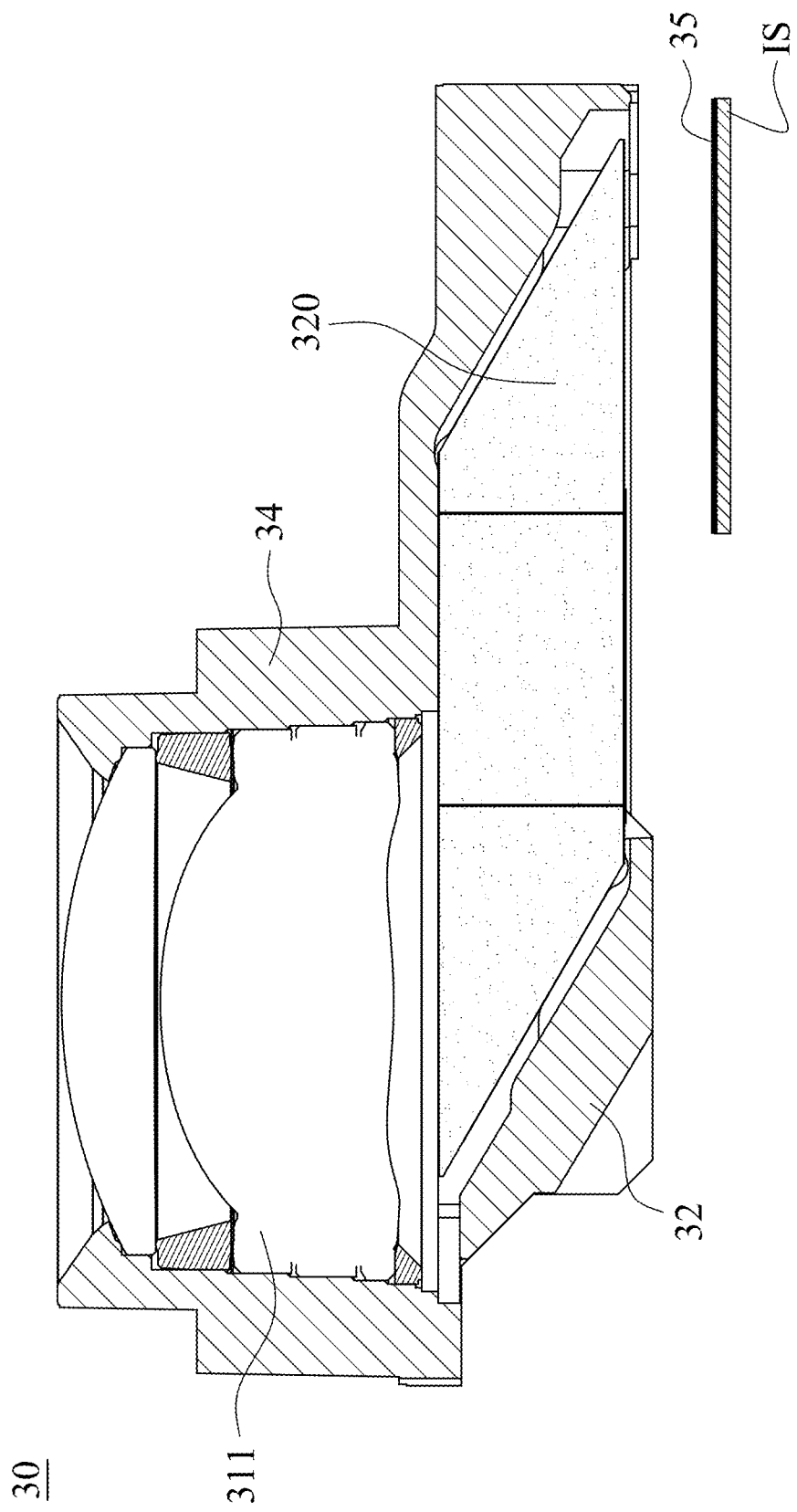
FIG. 3E is a cross-sectional view of the camera module along a 3E-3E line in FIG. 3D.

FIG. 3A is a three dimensional view of a camera module 30 according to the 3rd embodiment of the present disclosure. FIG. 3B is an exploded view of the camera module 30 according to the 3rd embodiment in FIG. 3A. FIG. 3C is another exploded view of the camera module 30 according to the 3rd embodiment in FIG. 3A. FIG. 3D is a top view of the camera module 30 according to the 3rd embodiment in FIG. 3A. FIG. 3E is a cross-sectional view of the camera module 30 along a 3E-3E line in FIG. 3D. In FIGS. 3A to 3E, the camera module 30 includes a supporting element 32, a carrier 34 and an imaging lens assembly (its reference numeral is omitted), wherein the camera module 30 can be applied to an electronic device (not shown), and an image sensor IS of the electronic device is disposed on an image surface 35 of the camera module 30. In particular, the imaging lens assembly is disposed in the carrier 34, and the supporting element 32 is disposed on a side of the carrier 34.

Figure 3F:
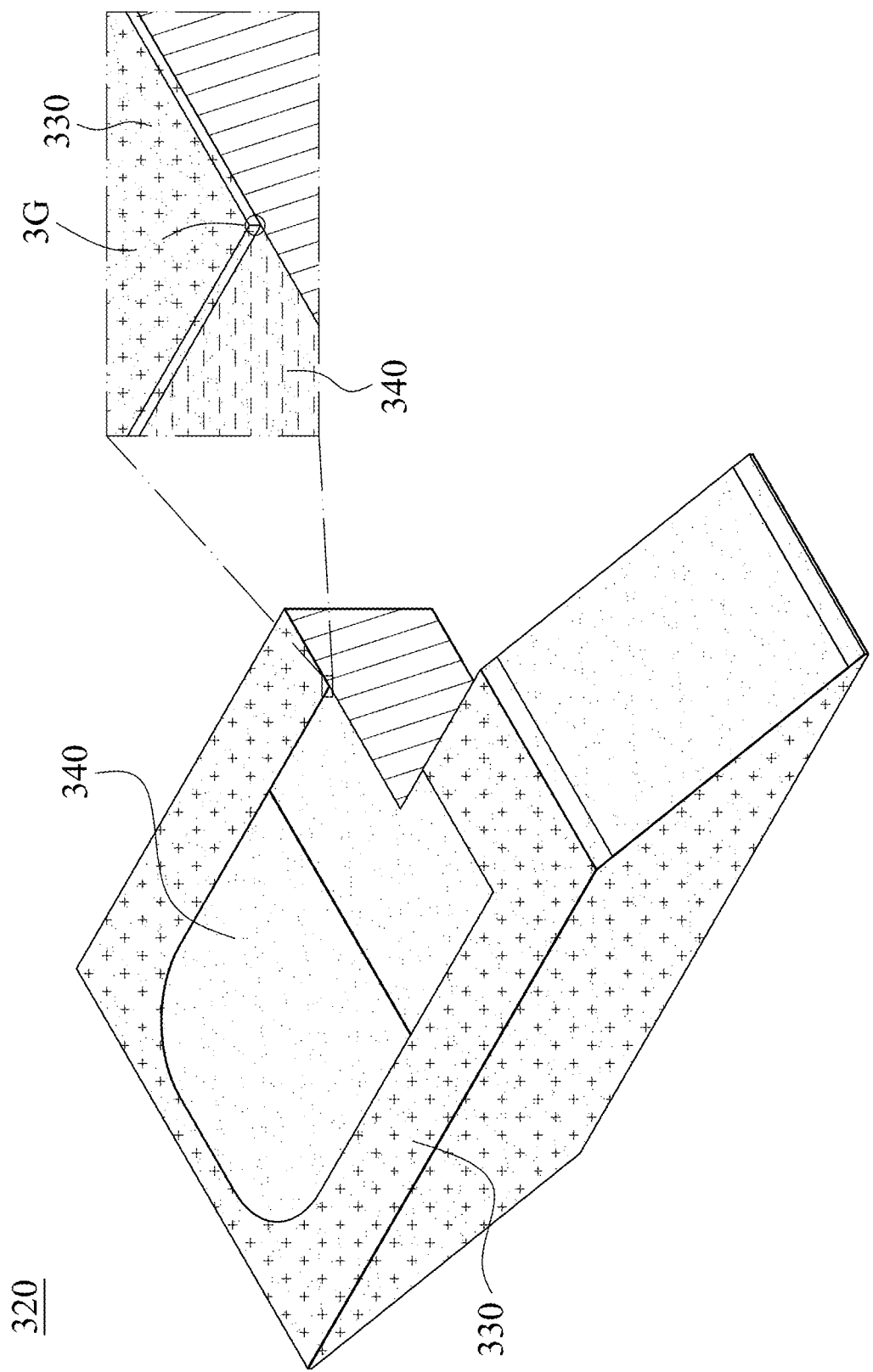
FIG. 3F is a partial cross section of the light folding element according to the 3rd embodiment in FIG. 3A.
Figure 3G:
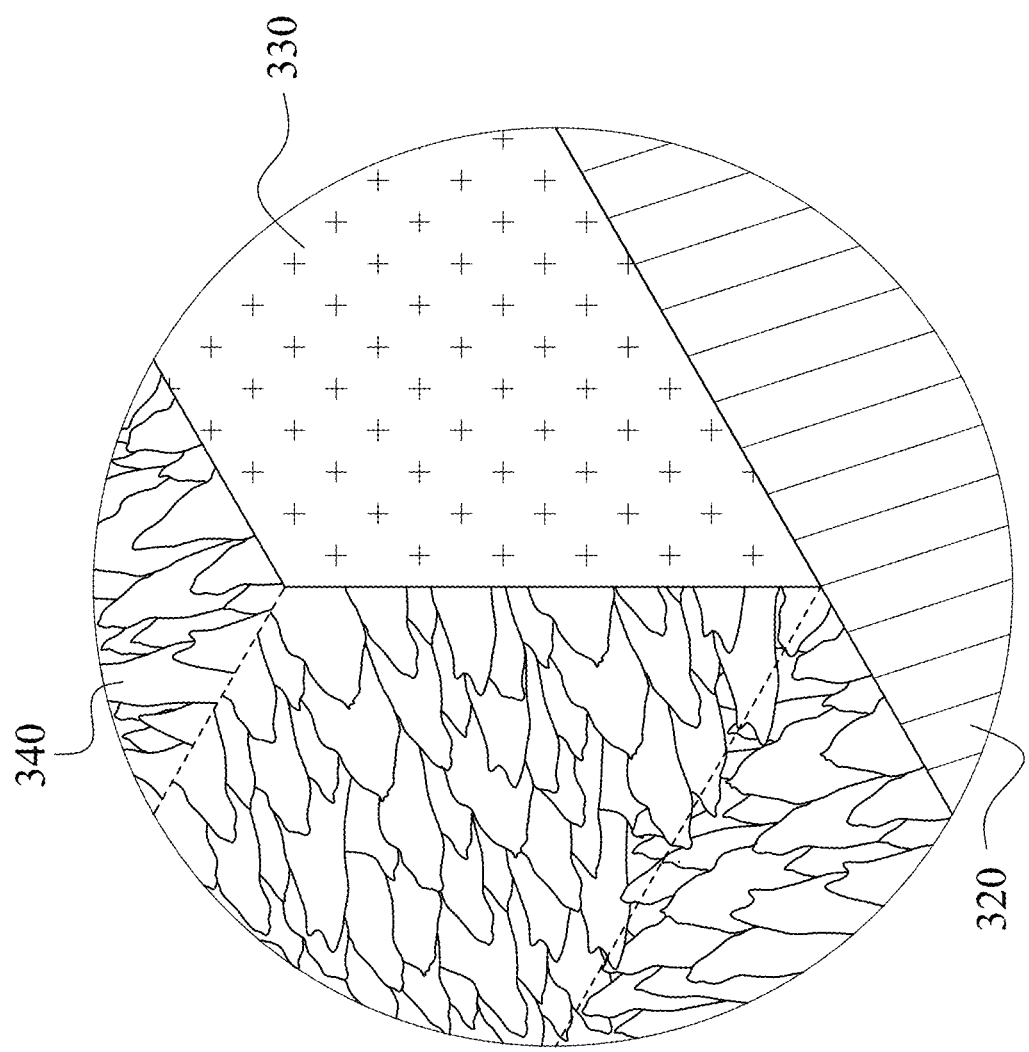
FIG. 3G is a partial enlarged view of the light folding element according to the 3rd embodiment in FIG. 3F.
Figure 3H:
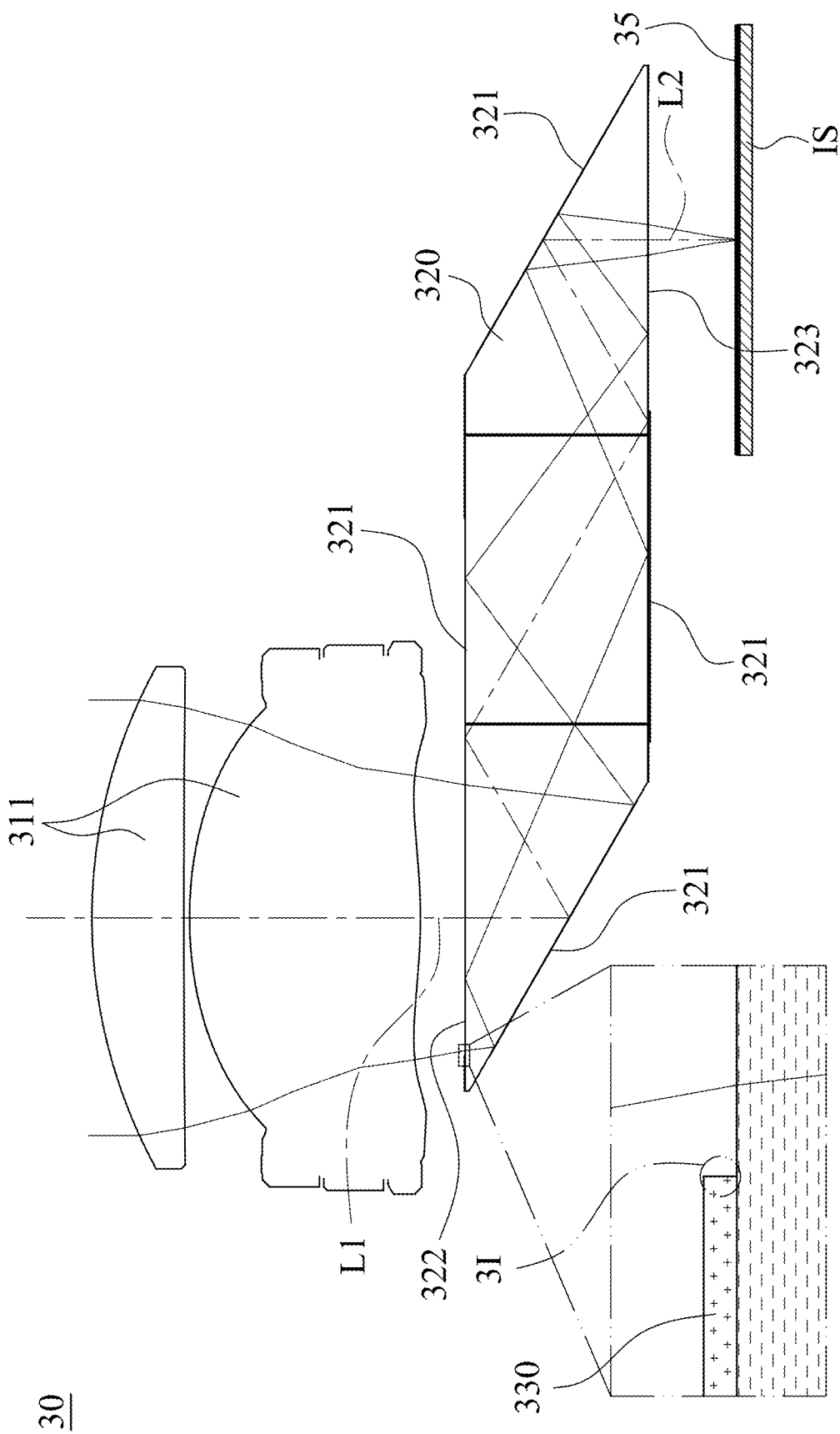
FIG. 3H is a partial schematic view of the camera module according to the 3rd embodiment in FIG. 3A.

FIG. 3F is a partial cross section of the light folding element 320 according to the 3rd embodiment in FIG. 3A. FIG. 3G is a partial enlarged view of the light folding element 320 according to the 3rd embodiment in FIG. 3F. FIG. 3H is a partial schematic view of the camera module 30 according to the 3rd embodiment in FIG. 3A. In FIGS. 3A to 3H, the imaging lens assembly includes a plurality of optical elements 311 and a light path folding mechanism (its reference numeral is omitted), wherein an optical axis (its reference numeral is omitted) passes through the optical elements 311, the light path folding mechanism is disposed on the optical axis to fold the optical axis at least once, and the optical elements 311 are disposed in the carrier 34. Moreover, the light path folding mechanism includes a light folding element 320, a light blocking structure 330 and a nanostructure layer 340, wherein the supporting element 32 is configured to support the light folding element 320.

In FIG. 3H, the light folding element 320 includes a plurality of reflecting surfaces 321, an incident surface 322, an exit surface 323 and a plurality of connecting surfaces 324. The reflecting surfaces 321 are configured to fold an incident light path L1 of the light folding element 320 towards an exit light path L2; the incident surface 322 is disposed on an object side of one of the reflecting surfaces 321, and the incident light path L1 passes through the incident surface 322; the exit surface 323 is disposed on an image side of one of the reflecting surfaces 321, and the exit light path L2 passes through the exit surface 323; the connecting surfaces 324 are connected to the reflecting surfaces 321, the incident surface 322 and the exit surface 323. By choosing the light folding element 320 with the proper refractive index, the plurality of reflecting surfaces 321 can totally reflect the imaging light inside the light folding element 320. Further, the optical axis is parallel to the incident light path L1 of the light folding element 320.

In particular, the light path folding mechanism can be configured to fold the optical axis at least four times. Therefore, the aforementioned disposition can be corresponding to the optical design of the long focal length so as to obtain the effect of compact size of the imaging lens assembly. Moreover, a number of the reflecting surfaces 321 can be four, two of the reflecting surfaces 321 of the light folding element 320 are parallel to each other, another two of the reflecting surfaces 321 of the light folding element 320 are configured to make the optical axis totally reflect inside the light folding element 320, and two of the reflecting surfaces 321 of the light folding element 320 and the incident surface 322 and the exit surface 323 are located in the common plane, respectively. Therefore, the optical property of the total reflection inside the single light folding element 320 can be equal to the optical property of multiple of the light folding elements folding the optical axis so as to reduce the manufacturing cost. Moreover, each of the two reflecting surfaces 321 parallel to each other can include a reflecting optical film (not shown), and the reflecting optical film can include a silver atom layer.

In detail, the light blocking structure 330 is disposed on all of the incident surface 322, the exit surface 323, the reflecting surfaces 321, which are located in the common plane with the incident surface 322 and the exit surface 323, and the connecting surfaces 324 of the light folding element 320. Therefore, the light blocking structure 330 with the better light blocking range can be obtained so as to enhance the light blocking efficiency of the stray light.

Figure 3I:
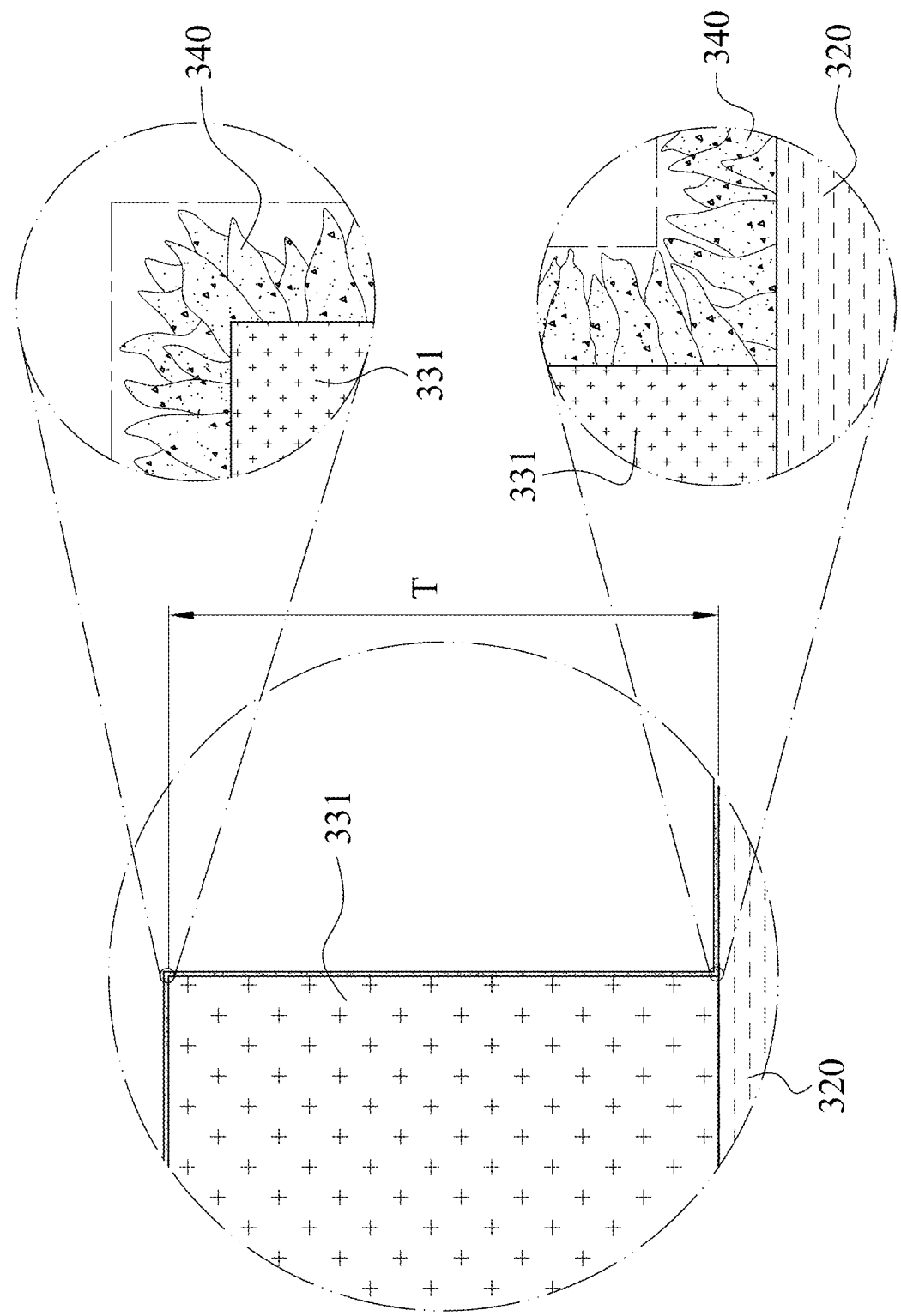
FIG. 3I is a partial enlarged view of the light folding element according to the 1st example of the 3rd embodiment in FIG. 3H.

FIG. 3I is a partial enlarged view of the light folding element 320 according to the 1st example of the 3rd embodiment in FIG. 3H. In FIG. 3I, the light blocking structure 330 includes a main light blocking portion 331, wherein the main light blocking portion 331 is located on a peripheral portion closest to the optical axis on a cross section passing through the optical axis, and the main light blocking portion 331 of the light blocking structure 330 surrounds the optical axis to define a light through area.

Moreover, the nanostructure layer 340 is continuously distributed over the incident surface 322 and the exit surface 323 of the light folding element 320 and the main light blocking portion 331 of the light blocking structure 330, and the nanostructure layer 340 has a plurality of irregular ridged convexs. Hence, the reflection of the light on the main light blocking portion 331 can be reduced by disposing the nanostructure layer 340 on the main light blocking portion 331 of the light blocking structure 330 so as to keep the image clear. In particular, a surface of the nanostructure layer 340 has a plurality of pore structures, and a portion of the light folding element 320 or a portion of the light blocking structure 330 is exposed via the pore structures, wherein the portion of the light folding element 320 or the portion of the light blocking structure 330, which is exposed, is contacted with the air.

In FIG. 3I, a peripheral thickness T of the main light blocking portion 331 is 23 um.

Figure 3J:
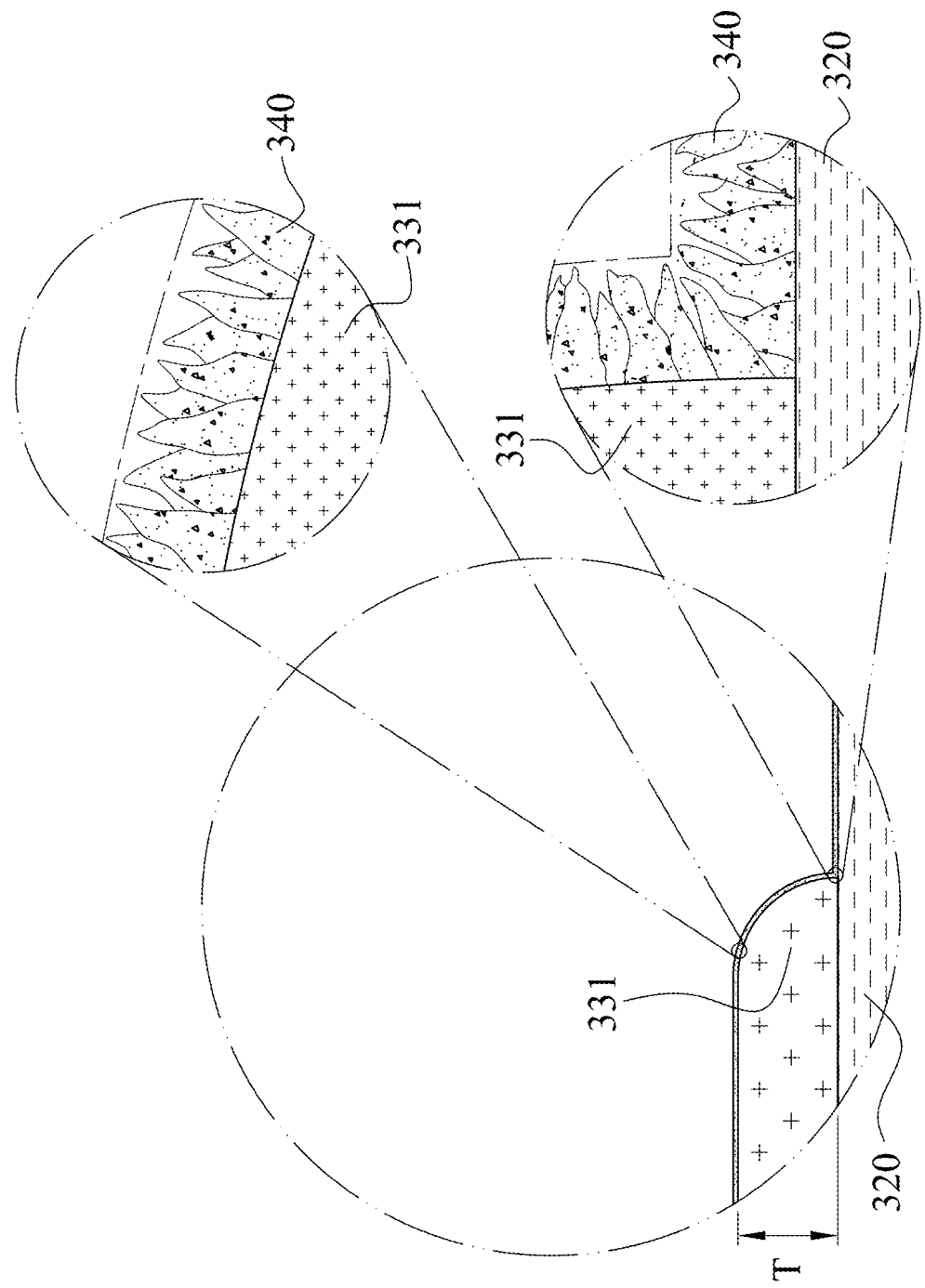
FIG. 3J is a partial enlarged view of the light folding element according to the 2nd example of the 3rd embodiment in FIG. 3H.

FIG. 3J is a partial enlarged view of the light folding element 320 according to the 2nd example of the 3rd embodiment in FIG. 3H. In FIG. 3J, a periphery of the light blocking structure 330 is arc-shaped, and a peripheral thickness T of the main light blocking portion 331 is 4 um.

Figure 3K:
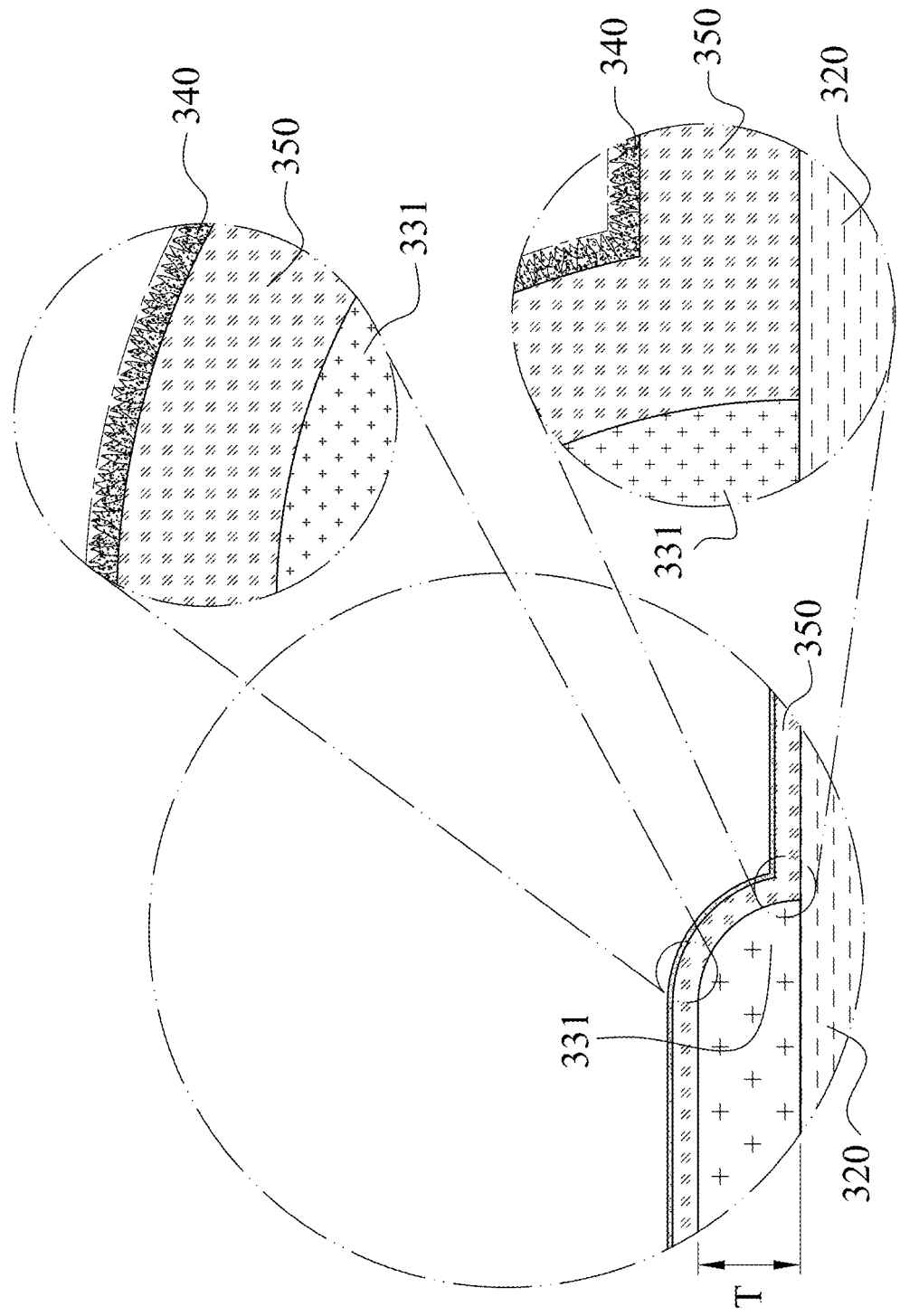
FIG. 3K is a partial enlarged view of the light folding element according to the 3rd example of the 3rd embodiment in FIG. 3H.

FIG. 3K is a partial enlarged view of the light folding element 320 according to the 3rd example of the 3rd embodiment in FIG. 3H. In FIG. 3K, the light folding element 320 can further include a connecting structure layer 350, wherein the connecting structure layer 350 is disposed between the nanostructure layer 340 and the incident surface 322 of the light folding element 320, and the connecting structure layer 350 is further disposed between the nanostructure layer 340 and the light blocking structure 330. In particular, the light folding element 320 can be tightly connected to the nanostructure layer 340 via the connecting structure layer 350, and the light blocking structure 330 can be tightly connected to the nanostructure layer 340 via the connecting structure layer 350 so as to obtain the higher structural stability. Furthermore, the nanostructure layer 340 can be disposed on the topmost of the connecting structure layer 350. A portion of the connecting structure layer 350 is exposed via the pore structures of the surface of the nanostructure layer 340, wherein the portion of the connecting structure layer 350, which is exposed, is contacted with the air.

In FIG. 3K, a periphery of the light blocking structure 330 is arc-shaped, and a peripheral thickness T of the main light blocking portion 331 is 4 um.

Figure 3L:
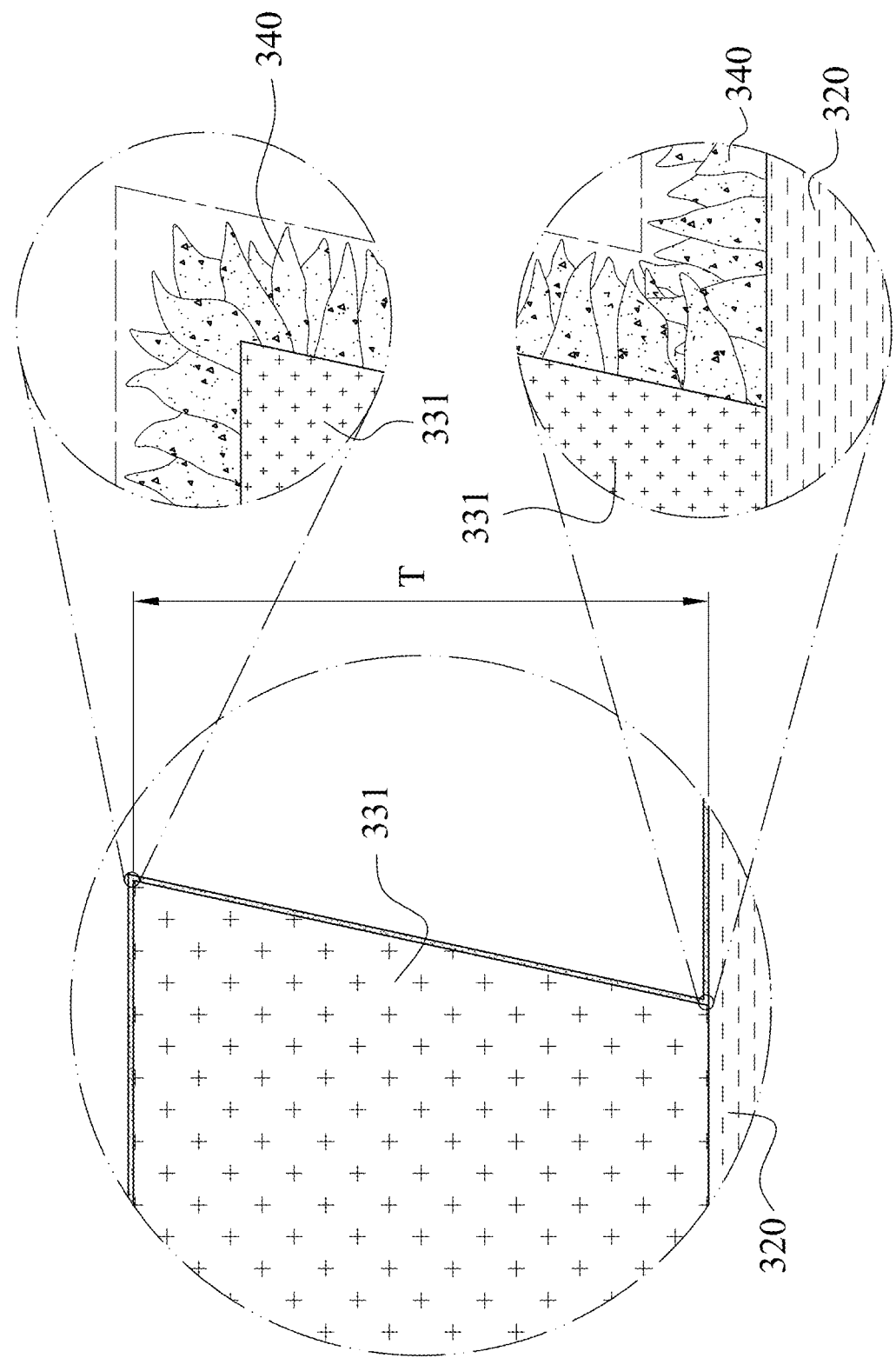
FIG. 3L is a partial enlarged view of the light folding element according to the 4th example of the 3rd embodiment in FIG. 3H.

FIG. 3L is a partial enlarged view of the light folding element 320 according to the 4th example of the 3rd embodiment in FIG. 3H. In FIG. 3L, a peripheral thickness T of the main light blocking portion 331 is 23 um.

It should be mentioned that the cross-shaped pattern and the dot pattern in FIGS. 3B to 3C and 3E to 3L are configured to indicate the range of the light blocking structure 330 and the range of the nanostructure layer 340, respectively.

4th Embodiment

Figure 4A:
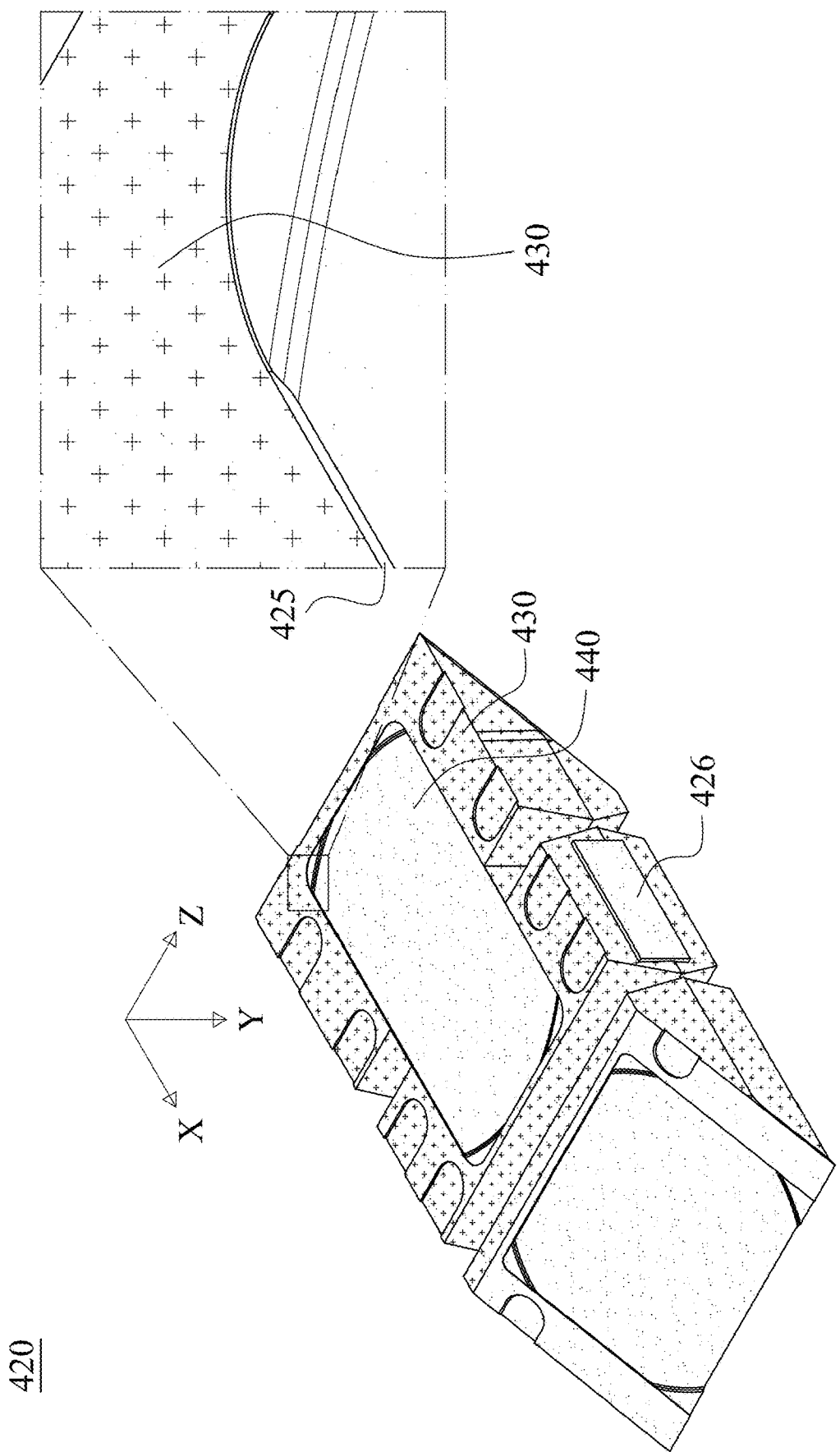
FIG. 4A is a three dimensional view of a light folding element according to the 4th embodiment of the present disclosure.
Figure 4B:
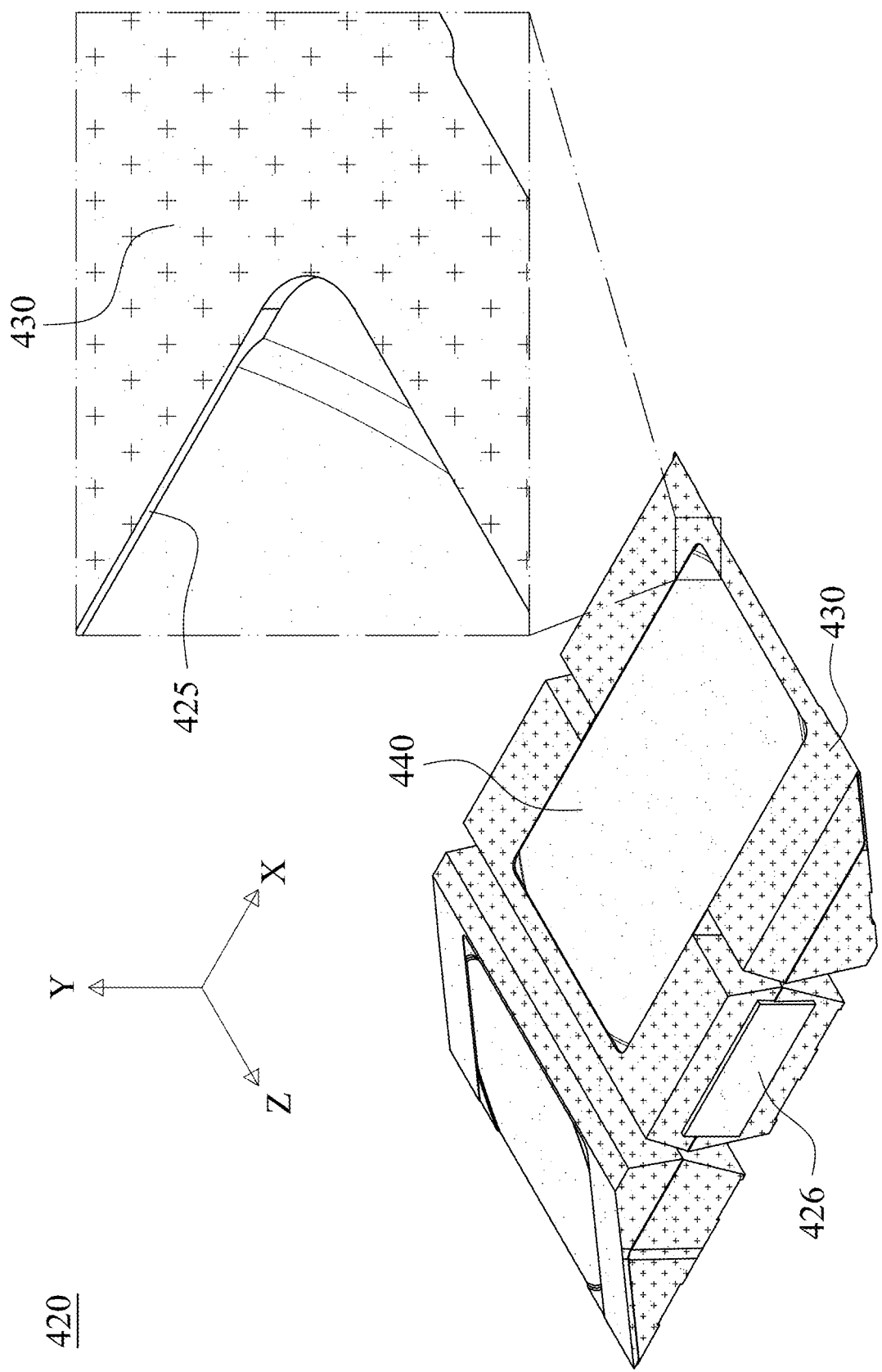
FIG. 4B is another three dimensional view of the light folding element according to the 4th embodiment in FIG. 4A.
Figure 4C:
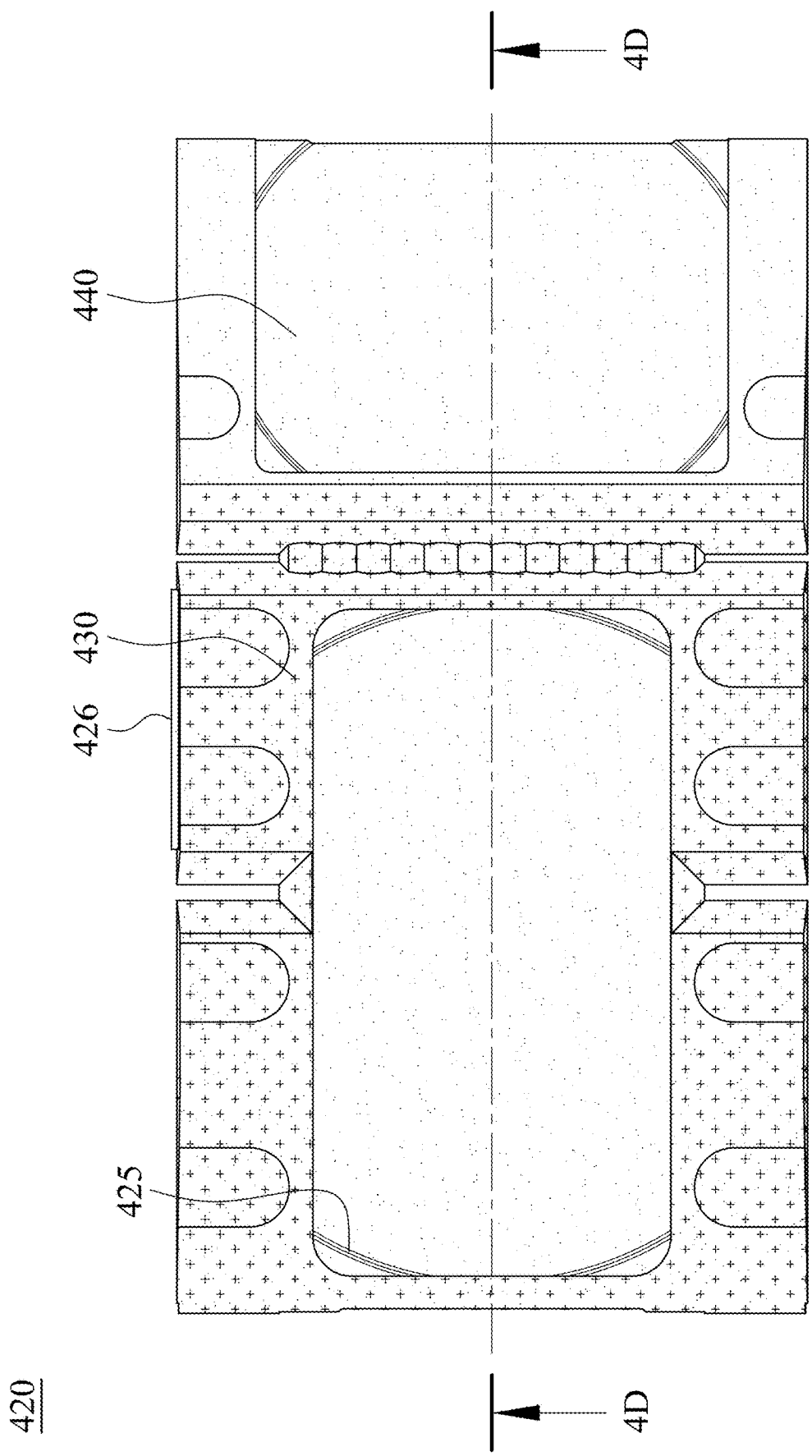
FIG. 4C is a top view of the light folding element according to the 4th embodiment in FIG. 4A.
Figure 4D:
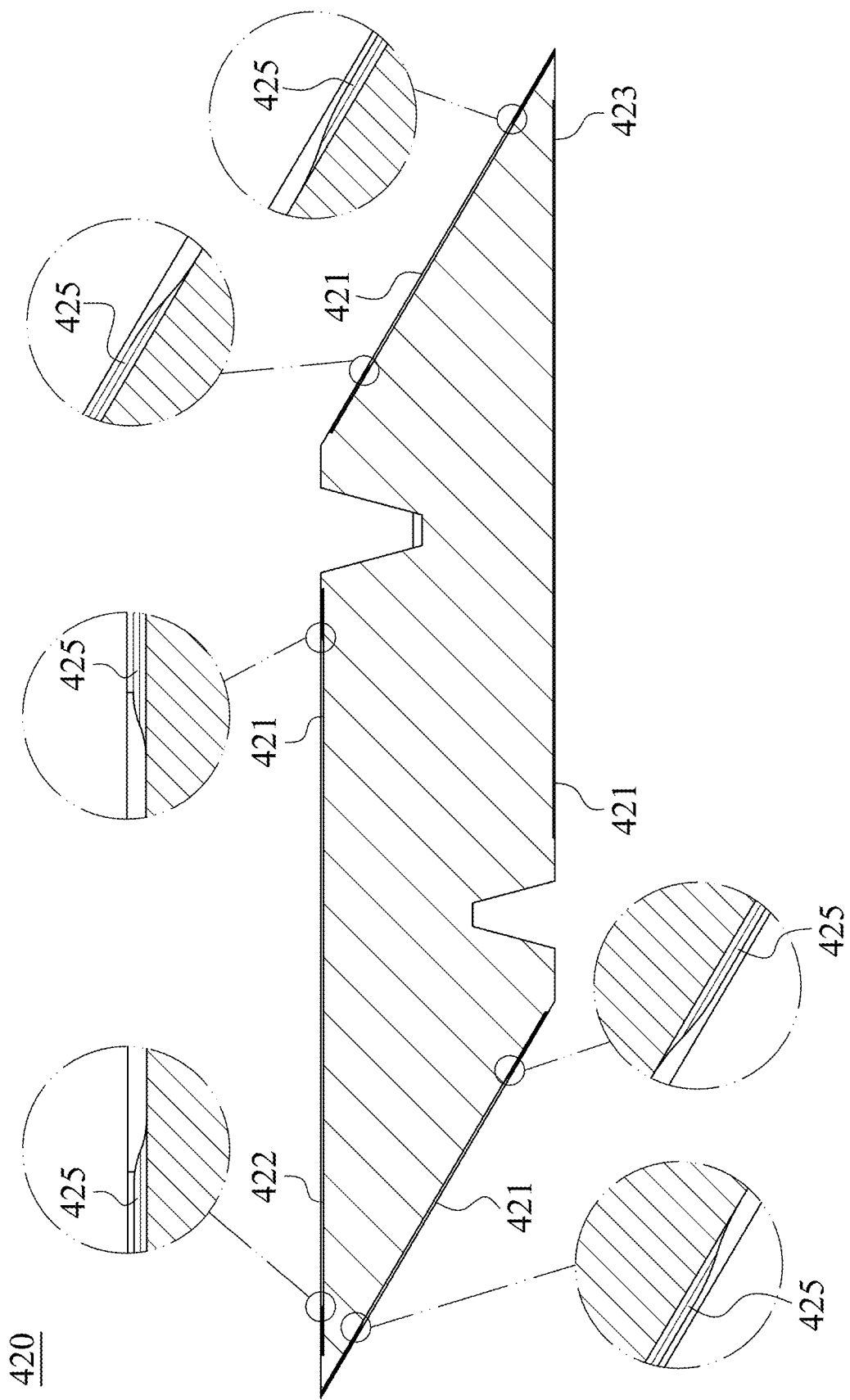
FIG. 4D is a cross-sectional view of the light folding element along a 4D-4D line in FIG. 4C.
Figure 4E:
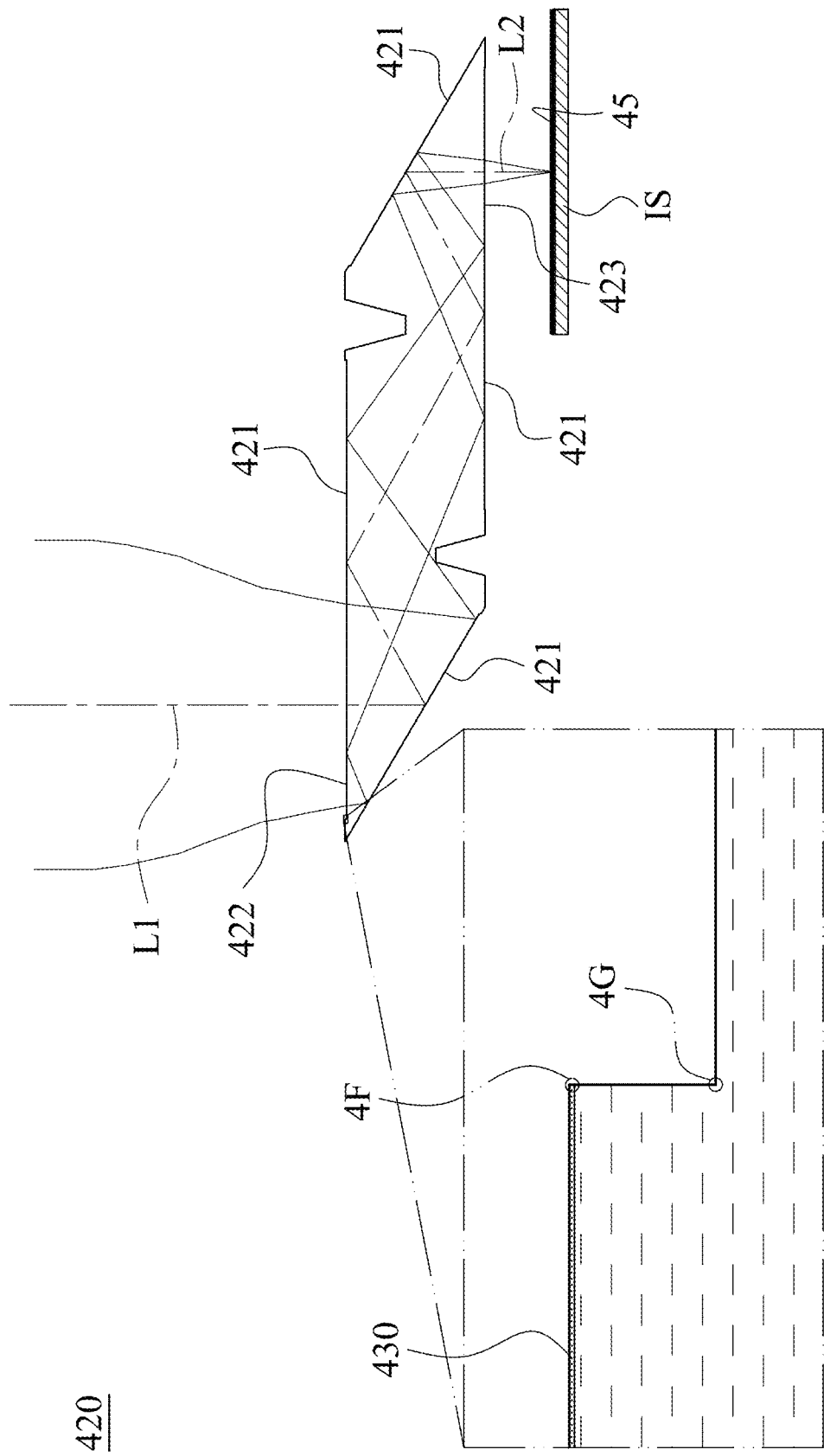
FIG. 4E is a schematic view of the light folding element according to the 4th embodiment in FIG. 4A.

FIG. 4A is a three dimensional view of a light folding element 420 according to the 4th embodiment of the present disclosure. FIG. 4B is another three dimensional view of the light folding element 420 according to the 4th embodiment in FIG. 4A. FIG. 4C is a top view of the light folding element 420 according to the 4th embodiment in FIG. 4A. FIG. 4D is a cross-sectional view of the light folding element 420 along a 4D-4D line in FIG. 4C. FIG. 4E is a schematic view of the light folding element 420 according to the 4th embodiment in FIG. 4A. In FIGS. 4A to 4E, the light folding element 420 includes a plurality of reflecting surfaces 421, an incident surface 422, an exit surface 423 and a plurality of connecting surfaces (their reference numerals are omitted). The reflecting surfaces 421 are configured to fold an incident light path L1 of the light folding element 420 towards an exit light path L2; the incident surface 422 is disposed on an object side of one of the reflecting surfaces 421, and the incident light path L1 passes through the incident surface 422; the exit surface 423 is disposed on an image side of one of the reflecting surfaces 421, and the exit light path L2 passes through the exit surface 423; the connecting surfaces are connected to the reflecting surfaces 421, the incident surface 422 and the exit surface 423, and the surfaces except for the reflecting surfaces 421, the incident surface 422 and the exit surface 423 can be defined as the connecting surfaces.

By choosing the light folding element 420 with the proper refractive index, the plurality of reflecting surfaces 421 can totally reflect the imaging light inside the light folding element 420. Further, the optical axis is parallel to the incident light path L1 of the light folding element 420. It should be mentioned that the light folding element 420 according to the 4th embodiment can be applied to the camera module 30 according to the 3rd embodiment, and an image sensor IS is disposed on an image surface (its reference numeral is omitted).

In detail, the light folding element 420 can be composed by bonding or assembling the plurality of light folding elements. Furthermore, the connecting surfaces can be composed by bonding or assembling the plurality of light folding elements, but the present disclosure is not limited thereto.

In FIGS. 4A to 4D, the light folding element 420 can further include a step structure 425, and the connecting surface of the light folding element 420 includes at least one gate trace 426, wherein the step structure 425 is disposed on the reflecting surfaces 421, the incident surface 422 and the exit surface 423. Therefore, the aforementioned structure is favorable for recognizing the border range of the light through area and the light blocking area. Moreover, the light through area near the step structure 425 can be recessed or protruding relative to the light blocking area, but the present disclosure is not limited thereto.

Figure 4F:
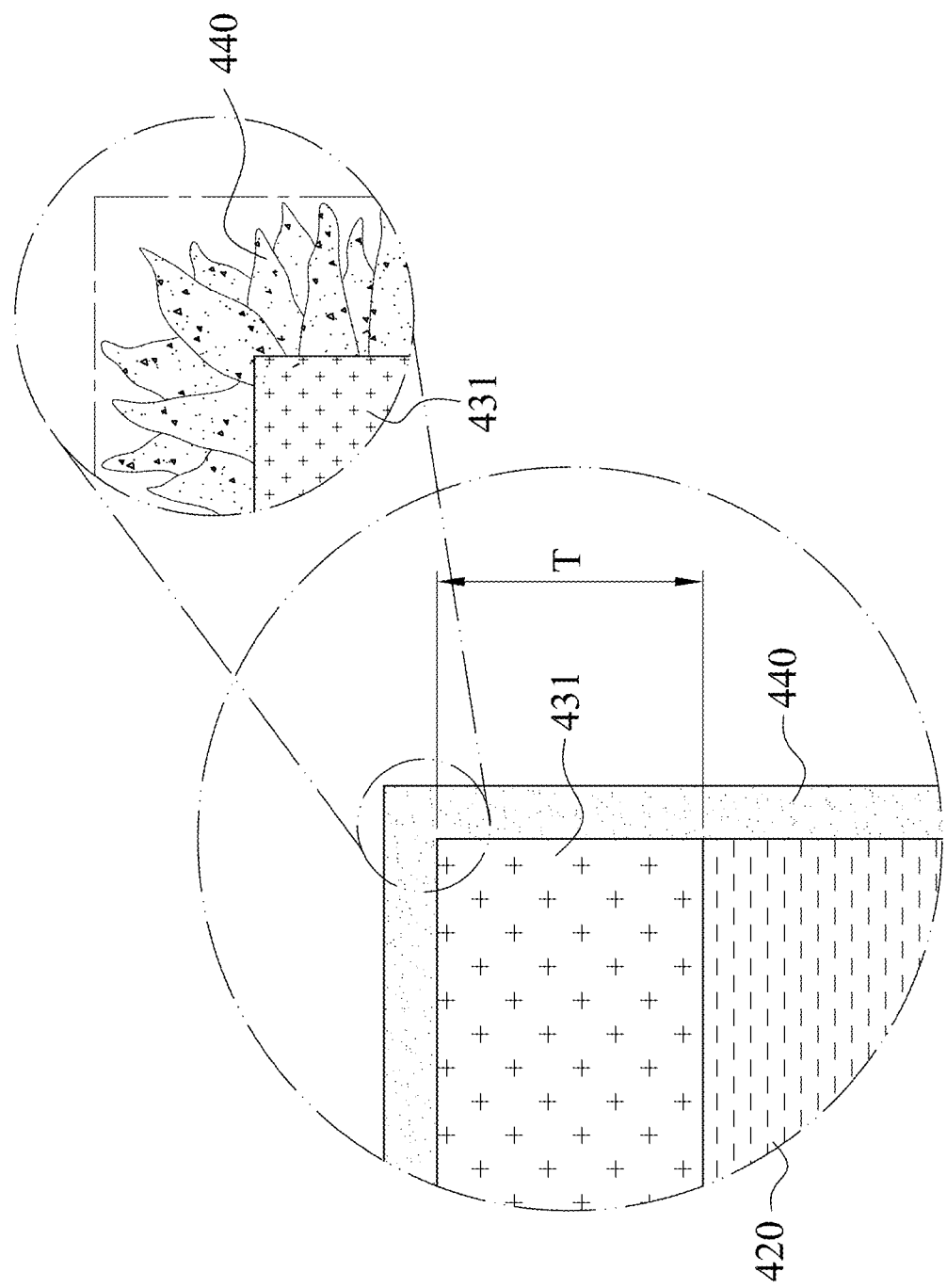
FIG. 4F is a partial enlarged view of the light folding element according to the 1st example of the 4th embodiment in FIG. 4E.
Figure 4G:
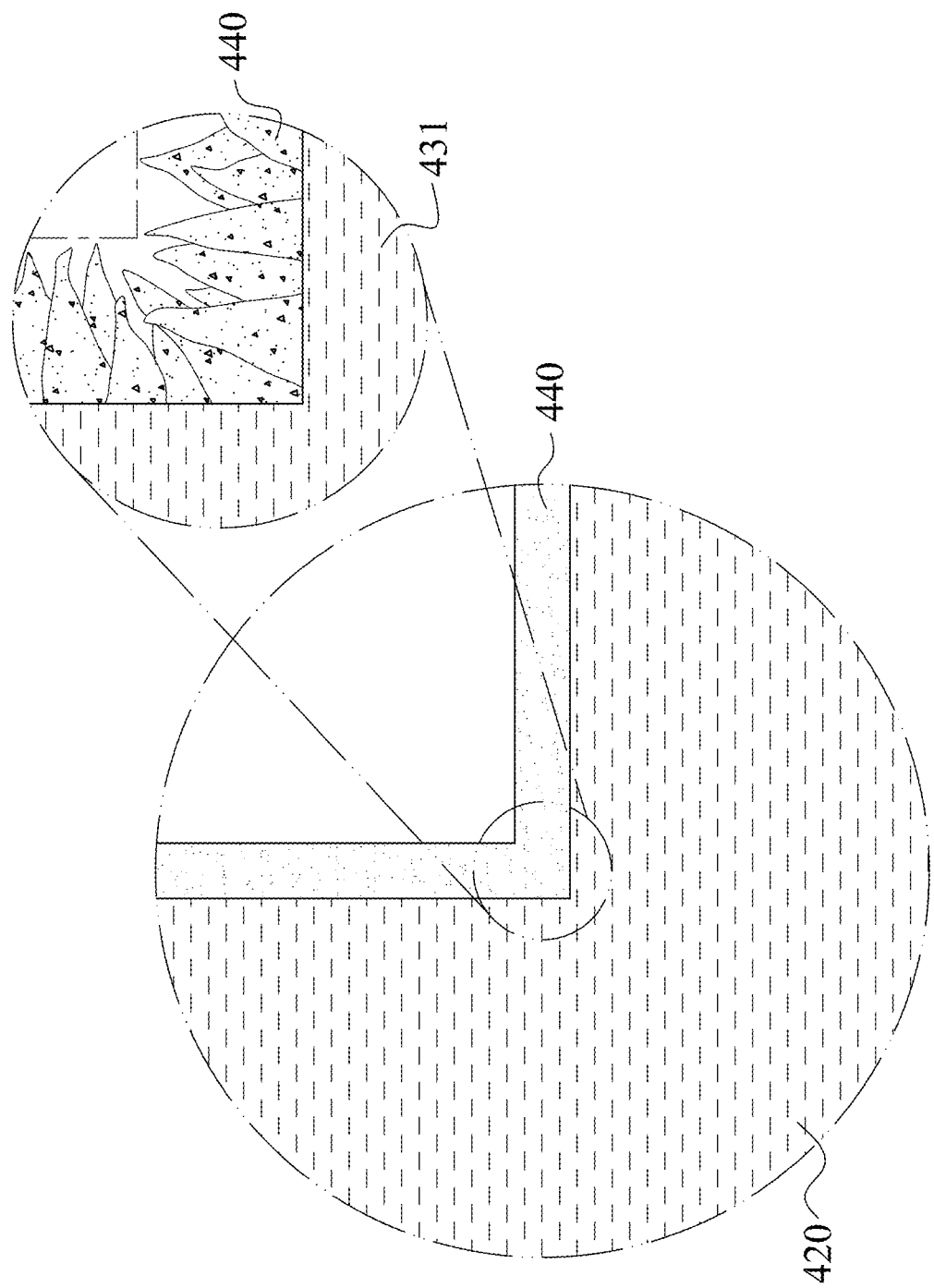
FIG. 4G is another partial enlarged view of the light folding element according to the 1st example of the 4th embodiment in FIG. 4E.

FIG. 4F is a partial enlarged view of the light folding element 420 according to the 1st example of the 4th embodiment in FIG. 4E. FIG. 4G is another partial enlarged view of the light folding element 420 according to the 1st example of the 4th embodiment in FIG. 4E. In FIGS. 4F and 4G, the light blocking structure 430 includes a main light blocking portion 431, wherein the main light blocking portion 431 is located on a peripheral portion closest to the optical axis on a cross section passing through the optical axis, and the main light blocking portion 431 of the light blocking structure 430 surrounds the optical axis to define a light through area.

Moreover, the nanostructure layer 440 is continuously distributed over the incident surface 422 and the exit surface 423 of the light folding element 420 and the main light blocking portion 431 of the light blocking structure 430, and the nanostructure layer 440 has a plurality of irregular ridged convexs. Hence, the reflection of the light on the main light blocking portion 431 can be reduced by disposing the nanostructure layer 440 on the main light blocking portion 431 of the light blocking structure 430 so as to keep the image clear. In particular, a surface of the nanostructure layer 440 has a plurality of pore structures, and a portion of the light folding element 420 or a portion of the light blocking structure 430 is exposed via the pore structures, wherein the portion of the light folding element 420 or the portion of the light blocking structure 430, which is exposed, is contacted with the air.

In FIG. 4F, a peripheral thickness T of the main light blocking portion 431 is 1 um.

Figure 4H:
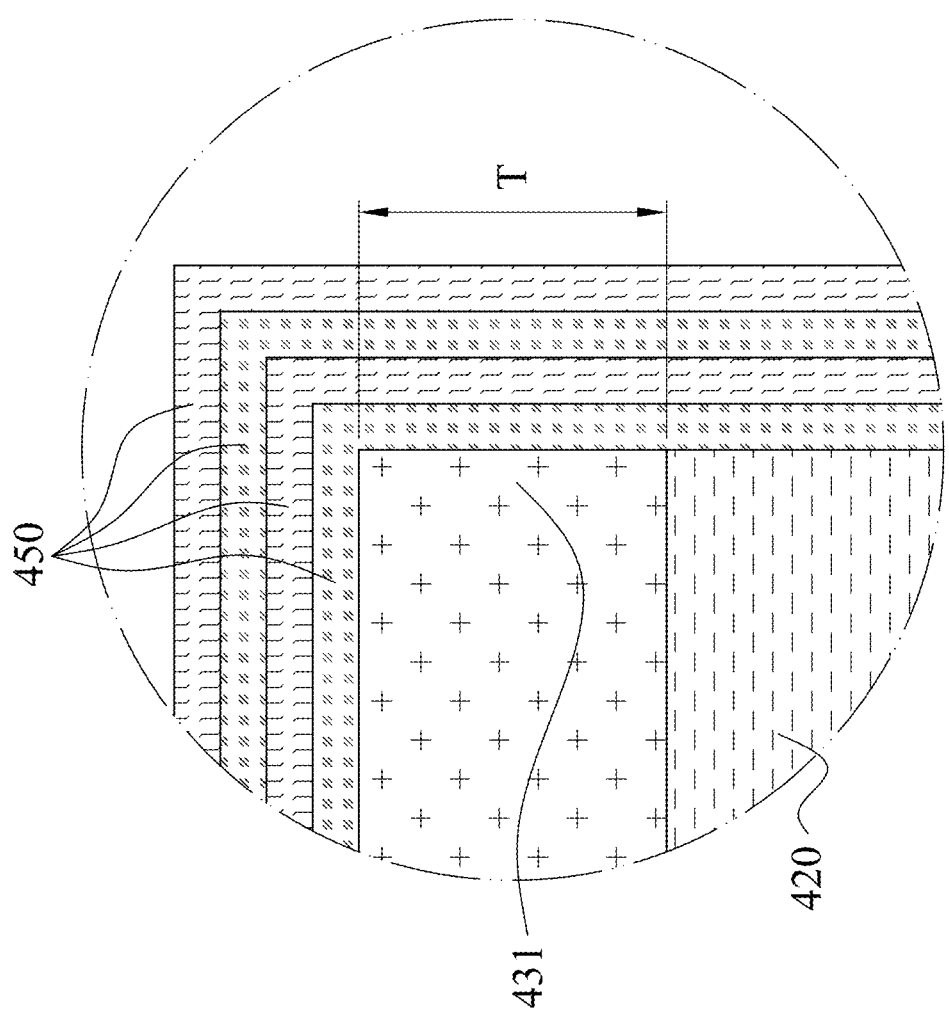
FIG. 4H is a partial enlarged view of the light folding element according to the 2nd example of the 4th embodiment in FIG. 4E.

FIG. 4H is a partial enlarged view of the light folding element 420 according to the 2nd example of the 4th embodiment in FIG. 4E. In FIG. 4H, the light folding element 420 can further include a connecting structure layer 450, wherein the connecting structure layer 450 is disposed on the incident surface 422 of the light folding element 420, and the connecting structure layer 450 is further disposed on the light blocking structure 430. In particular, the connecting structure layer 450 can be disposed on the incident surface 422 of the light folding element 420 and the light blocking structure 430 under the condition that the nanostructure layer 440 is not disposed on.

Further, the connecting structure layer 450 is composed of a plurality of film layers, which are alternately stacked, with different refractive indexes, wherein the connecting structure layer 450 can include at least one silicon oxide film or at least one titanium oxide film.

In FIG. 4H, a peripheral thickness T of the main light blocking portion 431 is 1 um.

It should be mentioned that the cross-shaped pattern and the dot pattern in FIGS. 4A to 4C and 4F to 4H are configured to indicate the range of the light blocking structure 430 and the range of the nanostructure layer 440, respectively.

5th Embodiment

Figure 5A:
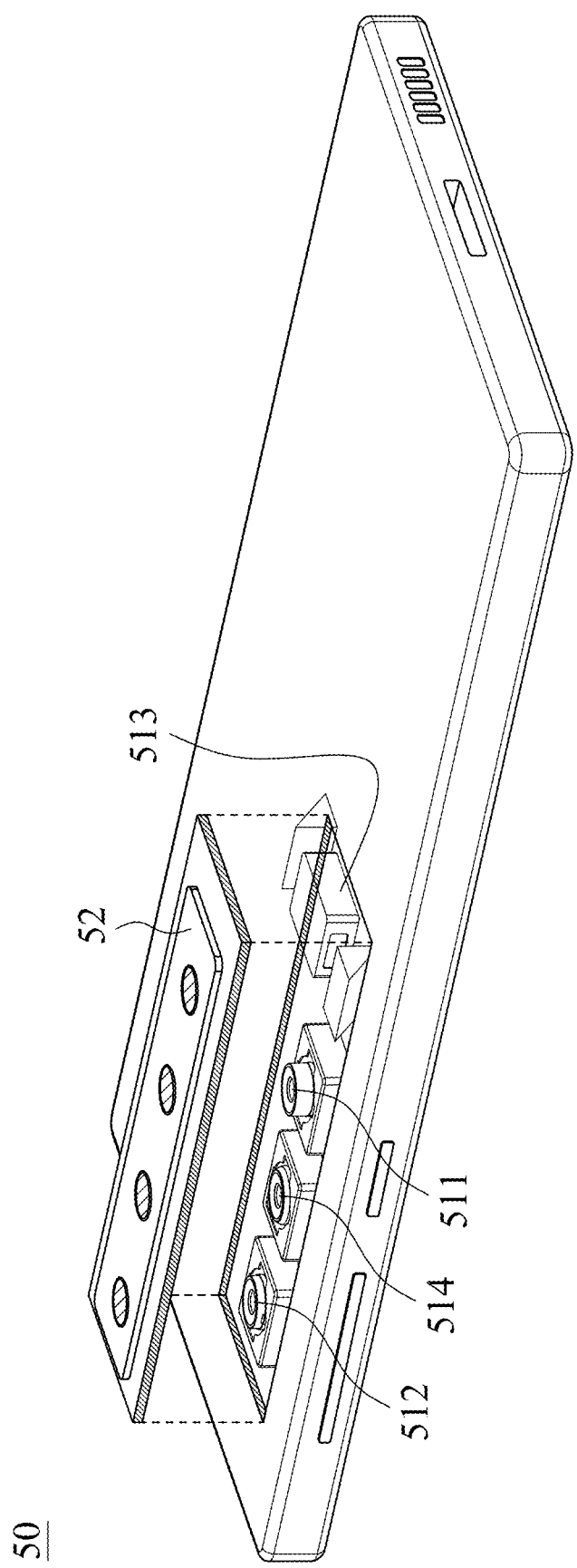
FIG. 5A is a schematic view of an electronic device according to the 5th embodiment of the present disclosure.
Figure 5B:
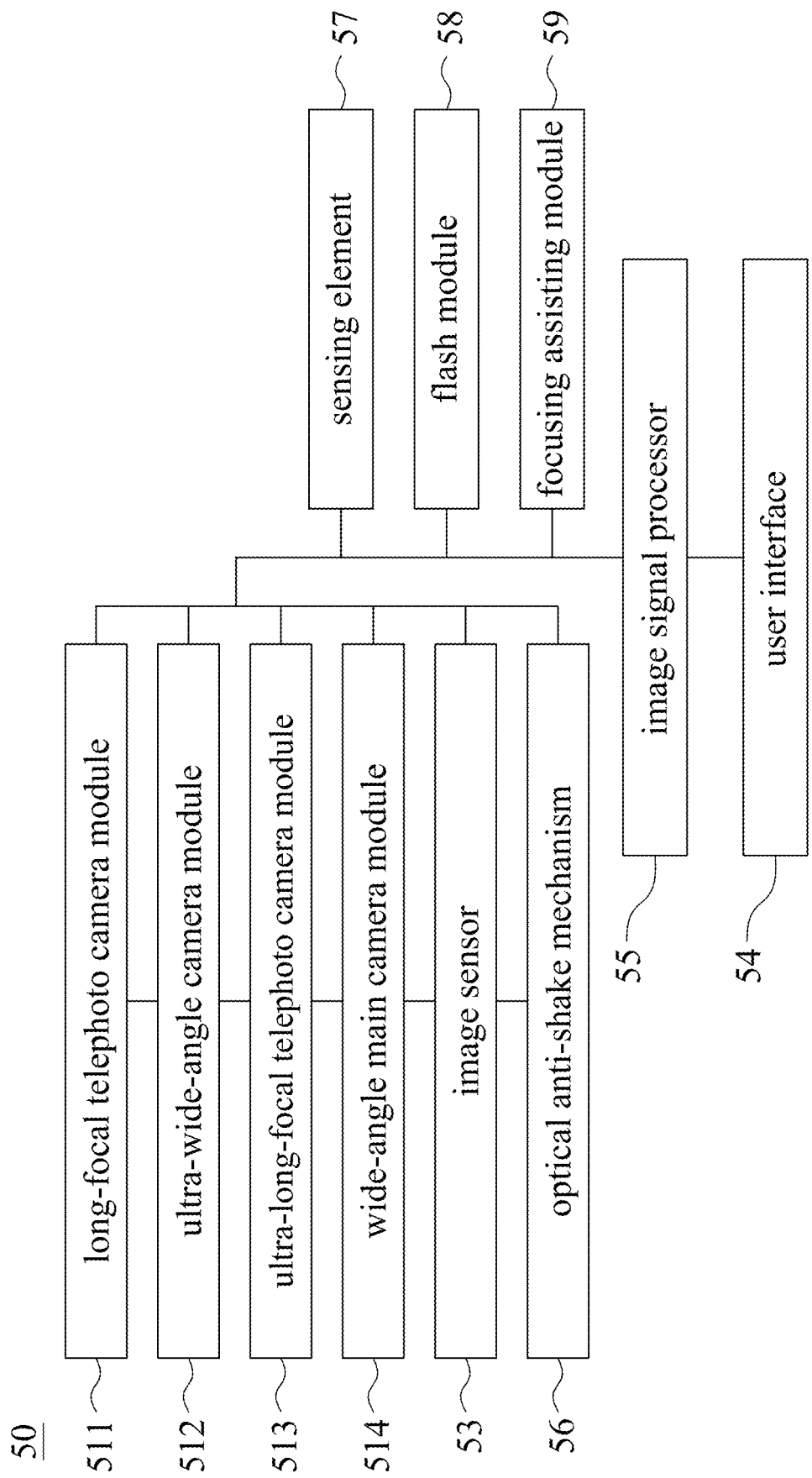
FIG. 5B is a block diagram of the electronic device according to the 5th embodiment in FIG. 5A.

FIG. 5A is a schematic view of an electronic device 50 according to the 5th embodiment of the present disclosure. FIG. 5B is a block diagram of the electronic device 50 according to the 5th embodiment in FIG. 5A. In FIGS. 5A and 5B, the electronic device 50 is a smart phone, and includes four camera modules and an image sensor 53, wherein the image sensor 53 is disposed on an image surface of each of the camera modules, and the camera modules are a long-focal telephoto camera module 511, an ultra-wide-angle camera module 512, an ultra-long-focal telephoto camera module 513 and a wide-angle main camera module 514. Moreover, each of the camera modules includes an imaging lens assembly (not shown), and the imaging lens assembly includes a plurality of optical elements (not shown) and a light path folding mechanism (not shown), wherein the light path folding mechanism is disposed on an optical axis to fold the optical axis at least once, and the light path folding mechanism includes a light folding element (not shown).

In detail, function of optical zoom of the electronic device 50 can be obtained by switching the camera modules with the different visual angles. It should be mentioned that a lens cover 52 is only configured to indicate the long-focal telephoto camera module 511, the ultra-wide-angle camera module 512, the ultra-long-focal telephoto camera module 513 and the wide-angle main camera module 514 disposed in the electronic device 50, and the schematic view is not configured to mean that the lens cover 52 is removable. In particular, the light folding element according to the 5th embodiment can be the light folding element according to the aforementioned 1st embodiment to the 4th embodiment, but the present disclosure is not limited thereto.

The electronic device 50 further includes a user interface 54, wherein the user interface 54 can be a touch screen or a display screen, but the present disclosure is not limited thereto.

Moreover, users enter a shooting mode via the user interface 54 of the electronic device 50. At this moment, the imaging light is gathered on the image sensor 53 via the long-focal telephoto camera module 511, the ultra-wide-angle camera module 512, the ultra-long-focal telephoto camera module 513 and the wide-angle main camera module 514, and an electronic signal about an image is output to an image signal processor (ISP) 55.

To meet a specification of the electronic device 50, the electronic device 50 can further include an optical anti-shake mechanism 56, which can be an optical image stabilization (01S). Furthermore, the electronic device 50 can further include at least one auxiliary optical element (its reference numeral is omitted) and at least one sensing element 57. According to the 5th embodiment, the auxiliary optical element is a flash module 58 and a focusing assisting module 59. The flash module 58 can be for compensating a color temperature, and the focusing assisting module 59 can be an infrared distance measurement component, a laser focus module, etc. The sensing element 57 can have functions for sensing physical momentum and kinetic energy, such as an accelerator, a gyroscope, a Hall Effect Element, to sense shaking or jitters applied by hands of the user or external environments. Accordingly, an auto-focusing mechanism and the optical anti-shake mechanism 56 disposed on the camera module (that is, the long-focal telephoto camera module 511, the ultra-wide-angle camera module 512, the ultra-long-focal telephoto camera module 513, the wide-angle main camera module 514) of the electronic device 50 can be enhanced to achieve the superior image quality. Furthermore, the electronic device 50 according to the present disclosure can have a capturing function with multiple modes, such as taking optimized selfies, high dynamic range (HDR) under a low light condition, 4K resolution recording, etc. Furthermore, the users can visually see a captured image of the camera through the touch screen and manually operate the view finding range on the touch screen to achieve the autofocus function of what you see is what you get.

Furthermore, the electronic device 50 can further include, but not be limited to, a display, a control unit, a storage unit, a random access memory (RAM), a read-only memory (ROM), or the combination thereof.

The foregoing description, for purpose of explanation, has been described with reference to specific examples. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, comprising:
a plurality of optical elements, an optical axis passing through the optical elements; and
a light path folding mechanism disposed on the optical axis to fold the optical axis at least once, and comprising:
at least one light folding element, comprising:
a reflecting surface configured to fold an incident light path of the at least one light folding element towards an exit light path;
an incident surface disposed on an object side of the reflecting surface, and the incident light path passing through the incident surface; and
an exit surface disposed on an image side of the reflecting surface, and the exit light path passing through the exit surface;
a light blocking structure disposed on at least one of the incident surface and the exit surface of the at least one light folding element, and the light blocking structure comprising:
a main light blocking portion located on a peripheral portion closest to the optical axis on a cross section passing through the optical axis; and
a nanostructure layer continuously distributed over the at least one of the incident surface and the exit surface of the at least one light folding element and the main light blocking portion of the light blocking structure, and the nanostructure layer having a plurality of irregular ridged convexs;
wherein the main light blocking portion of the light blocking structure surrounds the optical axis to define a light through area;
wherein an average height of the nanostructure layer is between 90 nm and 350 nm.

2. The imaging lens assembly of claim 1, wherein the light blocking structure is disposed on both of the incident surface and the exit surface of the at least one light folding element.

3. The imaging lens assembly of claim 1, wherein a peripheral thickness of the main light blocking portion is between 0.4 um and 50 um.

4. The imaging lens assembly of claim 1, wherein the average height of the nanostructure layer is between 125 nm and 300 nm.

5. The imaging lens assembly of claim 4, wherein the average height of the nanostructure layer is between 195 nm and 255 nm.

6. The imaging lens assembly of claim 1, wherein the at least one light folding element further comprises a connecting structure layer, the connecting structure layer is disposed between the nanostructure layer and the at least one of the incident surface and the exit surface of the at least one light folding element.

7. The imaging lens assembly of claim 6, wherein the connecting structure layer is further disposed between the nanostructure layer and the light blocking structure.

8. The imaging lens assembly of claim 1, wherein a number of the at least one light folding element is two, and the light path folding mechanism is configured to fold the optical axis twice.

9. The imaging lens assembly of claim 8, wherein the two reflecting surfaces of the two light folding elements are parallel to each other.

10. The imaging lens assembly of claim 1, wherein a number of the at least one light folding element is three, and the light path folding mechanism is configured to fold the optical axis three times.

11. The imaging lens assembly of claim 10, wherein two of the reflecting surfaces of the three light folding elements are vertical to each other.

12. The imaging lens assembly of claim 1, wherein the at least one light folding element further comprises a connecting surface, and the connecting surface is connected to the reflecting surface, the incident surface and the exit surface.

13. The imaging lens assembly of claim 1, wherein the at least one light folding element is made of a plastic material.

14. The imaging lens assembly of claim 1, wherein the at least one light folding element is made of a glass material.

15. The imaging lens assembly of claim 1, wherein an abbe number of the at least one light folding element is between 40 and 65.

16. A camera module, comprising:
the imaging lens assembly of claim 1.

17. An electronic device, comprising:
the camera module of claim 16; and
an image sensor disposed on an image surface of the camera module.

18. An imaging lens assembly, comprising:
a plurality of optical elements, an optical axis passing through the optical elements; and
a light path folding mechanism disposed on the optical axis to fold the optical axis at least once, and comprising:
a light folding element, comprising:
at least two reflecting surfaces configured to fold an incident light path of the light folding element towards an exit light path;
an incident surface disposed on an object side of one of the at least two reflecting surfaces, and the incident light path passing through the incident surface; and
an exit surface disposed on an image side of the other one of the at least two reflecting surfaces, and the exit light path passing through the exit surface;
a light blocking structure disposed on at least one of the incident surface and the exit surface of the light folding element, and the light blocking structure comprising:
a main light blocking portion located on a peripheral portion closest to the optical axis on a cross section passing through the optical axis; and
a nanostructure layer continuously distributed over the at least one of the incident surface and the exit surface of the light folding element and the main light blocking portion of the light blocking structure, and the nanostructure layer having a plurality of irregular ridged convexs;
wherein the main light blocking portion of the light blocking structure surrounds the optical axis to define a light through area;
wherein an average height of the nanostructure layer is between 90 nm and 350 nm.

19. The imaging lens assembly of claim 18, wherein the light blocking structure is disposed on both of the incident surface and the exit surface of the light folding element.

20. The imaging lens assembly of claim 18, wherein a peripheral thickness of the main light blocking portion is between 0.4 um and 50 um.

21. The imaging lens assembly of claim 18, wherein the average height of the nanostructure layer is between 125 nm and 300 nm.

22. The imaging lens assembly of claim 21, wherein the average height of the nanostructure layer is between 195 nm and 255 nm.

23. The imaging lens assembly of claim 18, wherein the light folding element further comprises a connecting structure layer, the connecting structure layer is disposed between the nanostructure layer and the at least one of the incident surface and the exit surface of the light folding element.

24. The imaging lens assembly of claim 23, wherein the connecting structure layer is further disposed between the nanostructure layer and the light blocking structure.

25. The imaging lens assembly of claim 18, wherein the light path folding mechanism is configured to fold the optical axis at least four times.

26. The imaging lens assembly of claim 25, wherein a number of the at least two reflecting surfaces is four, and two of the four reflecting surfaces of the light folding element are parallel to each other.

27. The imaging lens assembly of claim 26, wherein another two of the four reflecting surfaces of the light folding element are configured to make the optical axis totally reflect inside the light folding element.

28. The imaging lens assembly of claim 18, wherein the light folding element further comprises a connecting surface, and the connecting surface is connected to the at least two reflecting surfaces, the incident surface and the exit surface.

29. The imaging lens assembly of claim 28, wherein the connecting surface of the light folding element comprises at least one gate trace.

30. The imaging lens assembly of claim 29, wherein the light folding element further comprises a step structure.

31. The imaging lens assembly of claim 30, wherein the light folding element is made of a plastic material.

32. The imaging lens assembly of claim 18, wherein the light folding element is made of a glass material.

33. The imaging lens assembly of claim 18, wherein an abbe number of the light folding element is between 40 and 65.

* * * * *